United States Patent [19]
Cseri

[11] Patent Number: 5,883,623
[45] Date of Patent: *Mar. 16, 1999

[54] SYSTEM AND METHODS FOR BUILDING SPREADSHEET APPLICATIONS

[75] Inventor: Istvan Cseri, Scotts Valley, Calif.

[73] Assignee: Borland International, Inc., Scotts Valley, Calif.

[ * ] Notice: The term of this patent shall not extend beyond the expiration date of Pat. No. 5,623,591.

[21] Appl. No.: 841,480

[22] Filed: Apr. 21, 1997

Related U.S. Application Data

[63] Continuation of Ser. No. 120,329, Sep. 10, 1993, Pat. No. 5,623,591, which is a continuation-in-part of Ser. No. 866,658, Apr. 8, 1992, Pat. No. 5,416,895.

[51] Int. Cl.$^6$ ................................................ G06F 17/00
[52] U.S. Cl. ........................................ 345/335; 707/503
[58] Field of Search ................................ 707/500, 501, 707/503, 504, 904; 345/333, 334, 335, 346, 347, 354

[56] References Cited

U.S. PATENT DOCUMENTS

| | | | |
|---|---|---|---|
| 5,255,363 | 10/1993 | Seyler | 395/164 |
| 5,546,519 | 8/1996 | Berry | 345/326 |
| 5,566,330 | 10/1996 | Sheffield | 395/600 |
| 5,623,591 | 4/1997 | Cseri | 395/326 |
| 5,634,019 | 5/1997 | Koppolu et al. | 345/339 X |

OTHER PUBLICATIONS

Microsoft Visual Basic Programmer's Guide, pp. 3–12, 37–43, 48–55, 58–76, 1991.

*Primary Examiner*—Joseph H. Field
*Attorney, Agent, or Firm*—John A. Smart

[57] ABSTRACT

An electronic spreadsheet system of the present invention includes a notebook interface having a plurality of notebook pages, each of which may contain a spread of information cells, or other desired page type (e.g., Graphs page). The system includes a spreadsheet application development module having a user interface (UI) builder. The UI builder provides "live" links between system objects. In particular, link commands are provided as statements a developer may attach to a control to indicate what should happen when an end-user activates or changes the control. Link commands usually specify three things: an event, an action, and an object. The event indicates what occurrence should trigger the link command; the action indicates what should happen. The object is what should be acted upon. One control can have many link commands. In operation, a link command can send a value to a cell in the notebook, run a macro, close a dialog box, change the zoom factor in the notebook, or the like.

19 Claims, 55 Drawing Sheets

— 496 — ABSOLUTE REFERENCE TO ROW 1

@PMT(B$1,A2/12,30*12)

|   | A | B |
|---|---|---|
| 1 | Loan Amt | $202,300 |
| 2 | 9.00% | $1,628 |
| 3 | 8.50% | $1,556 |
| 4 | 8.00% | $1,484 |

COPIED REFERENCES TO ROW 1

@PMT(B$1,A7/12,30*12)

|   | A | B |
|---|---|---|
| 1 | Loan Amt | $202,300 |
| 2 | 9.00% | $1,628 |
| 3 | 8.50% | $1,556 |
| 4 | 8.00% | $1,484 |
| 5 |   |   |
| 6 | Loan Amt | $150,000 |
| 7 | 9.00% | $1,628 |
| 8 | 8.50% | $1,556 |
| 9 | 8.00% | $1,484 |

NON-MODEL COPY:

FORMULAS STILL REFER TO ROW 1

@PMT(B$6,A7/12,30*12)

|   | A | B |
|---|---|---|
| 1 | Loan Amt | $202,300 |
| 2 | 9.00% | $1,628 |
| 3 | 8.50% | $1,556 |
| 4 | 8.00% | $1,484 |
| 5 |   |   |
| 6 | Loan Amt | $150,000 |
| 7 | 9.00% | $1,207 |
| 8 | 8.50% | $1,153 |
| 9 | 8.00% | $1,101 |

USING MODEL COPY:

FORMULAS REFER TO ROW 6

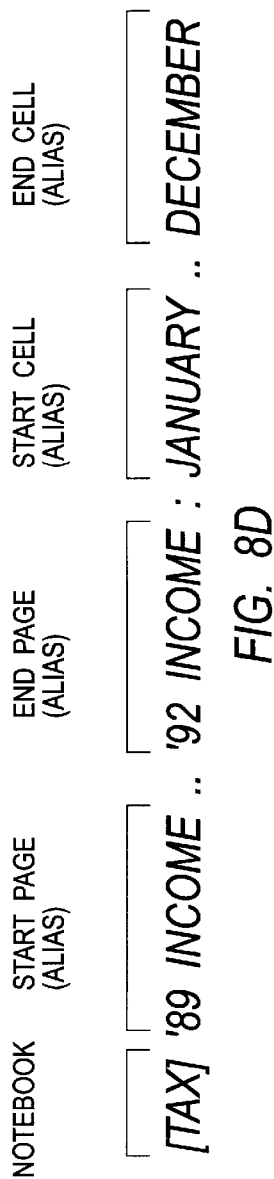
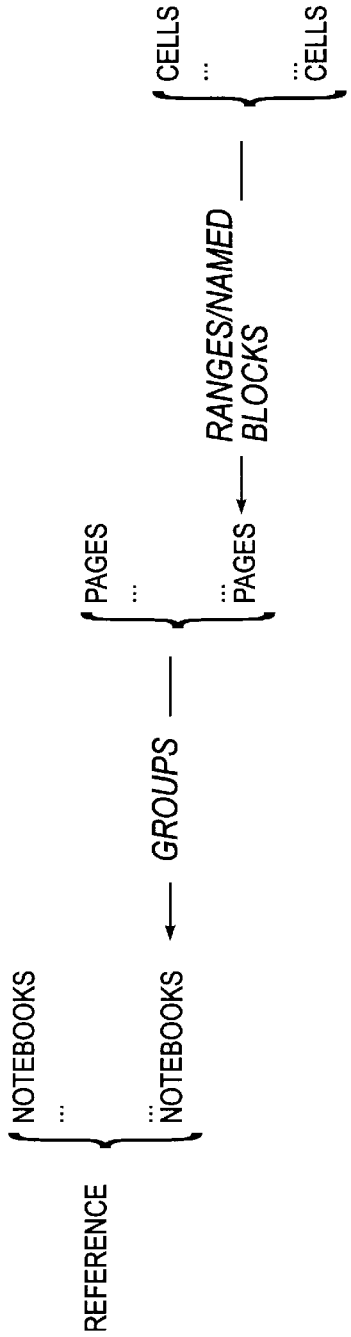
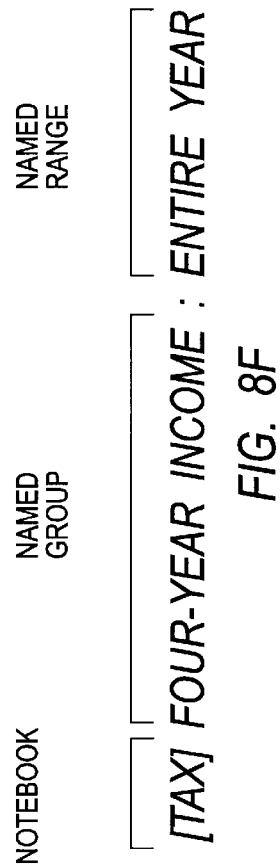
FIG. 8D
FIG. 8E
FIG. 8F

FIG. 11G

NAME OF THE DIALOG BOX — CELL WHICH WILL INDICATE HOW THE DIALOG BOX WAS CLOSED — BLOCK CONTAINING INITIAL VALUES FOR DIALOG BOX CONTROLS

{DODIALOG [NOTEBK1]Dialog1, Close, Block}

NAME OF THE NOTEBOOK CONTAINING THE DIALOG BOX

FIG. 11I

Enter Loan Data - TEST MODE — 1170

Payments Due:
- ○ 1st of month
- ● 15th of month

Loan Amount: 23000

Term: 5

[OK]  [Cancel]

| | A | B | C |
|---|---|---|---|
| 1 | | | |
| 2 | Amount | 20000 | |
| 3 | Term | 4 | |
| 4 | Due Date | 15th of month | |
| 5 | | | |
| 6 | Payment | $531.60 | |
| 7 | | | |
| 8 | {DODIALOG "LOANDB",A1,B2..B4} | | |

| | A | B | C | D | E | F | G | H |
|---|---|---|---|---|---|---|---|---|
| | | | LOANPMT.WB1 | | | | | |
| 1 | Pay Every | Month | calc_payment | {LET Pay_Every,"Month"} | | | | |
| 2 | Loan Amount | 100000 | | {LET Loan_Amount,100000} | | | | |
| 3 | Int Rate | 12.5 | | {LET Term,30} | | | | |
| 4 | Term | 60 | | {LET Int_Rate,12.5} | | | | |
| 5 | End Of Period | No | | {LET End_Of_Period,"No"} | | | | |
| 6 | | | | {DODIALOG "LoanData",Result,B1..B5} | | | | |
| 7 | Result | 1 | | {IF Result=0}{QUIT} | | | | |
| 8 | Term Divisor | 12 | | {IF Pay_Every = "Month"}{LET Term_Divisor,12} | | | | |
| 9 | End_Period | 0 | | {IF Pay_Every = "Quarter"}{LET Term_Divisor,4} | | | | |
| 10 | | | | {IF Pay_Every = "Half-Year"}{LET Term_Divisor,2} | | | | |
| 11 | | | | {IF Pay_Every = "Year"}{LET Term_Divisor,1} | | | | |
| 12 | | | Calc Payment | {IF End_Of_Period = "No"}{LET End_Period, 0} | | | | |
| 13 | | | | {IF End_Of_Period = "Yes"}{LET End_Period, 1} | | | | |
| 14 | | | | | | | | |
| 15 | | | Close Notebook | {Application.Macro "None,No,Menu Bar"} | | | | |
| 16 | | | | {CALC}{MESSAGE Message:B2..C5,20,12,0} | | | | |
| 17 | | | | | | | | |

FIG. 13

SYSTEM AND METHODS FOR BUILDING SPREADSHEET APPLICATIONS

The present application is a continuation of application Ser. No. 08/120,329, filed Sep. 10, 1993, U.S. Pat. No. 5,623,591, which in turn is a continuation-in-part of application Ser. No. 07/866,658, filed Apr. 8, 1992, now U.S. Pat. No. 5,416,895, issued May 16, 1995, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of information processing by digital computers and, more particularly, to the processing and presentation of information by program applications, particularly electronic spreadsheets.

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what wordprocessors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, and a letter to each column. To reference a location at column A and row 1 (i.e., the upper-lefthand corner), for example, the user types in "A1". In this manner, the spreadsheet defines an addressable storage location or "cell" at each intersection of a row with a column.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. In this fashion, cell references can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-Osborne/McGraw-Hill, 1990; and LeBlond, G. and Cobb, D., *Using* 1-2-3, Que Corp., 1985. The disclosures of each of the foregoing references are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what if" scenarios. After a set of mathematical relationships has been entered into a worksheet, the spread of information can be recalculated using different sets of assumptions, with the results of each recalculation appearing almost instantaneously. Performing this operation manually, with paper and pencil, would require recalculating every relationship in the model with each change made.

While electronic spreadsheets offer significant productivity gains in the task of complex data modeling, none has been as intuitive to use as ordinary paper and pencil—objects already familiar to the user. Instead, the user must master many complex and arbitrary operations. To find the proper command for a task at hand, for example, the user must hunt through a complex menuing system, with the desired choice often buried under several menus. Even simple tasks can pose a significant challenge to the user. To change the punctuation format of a number in one prior art spreadsheet, for example, the user must traverse several nodes of a menu tree, carefully selecting among cryptic menu choices along the way. A mistake at any one of the nodes can lead to harsh consequences, including the loss of valuable data.

Finding this approach to be unworkable, many users memorize frequently-needed commands instead. To accomplish the foregoing task, for example, the user would memorize the command: /Worksheet Global Default Other International. As one can only memorize just so many arbitrary commands, however, the user typically masters only a very small subset of available commands and features. And without constant practice, these commands tend to be quickly forgotten. Moreover, many useful and needed commands are sufficiently hidden in layers of menus that they are never discovered by the user. All told, the non-intuitive interfaces of prior art spreadsheets have led to steep learning curves for users. Even after mastering a particular spreadsheet interface, the user typically only knows a fraction of available commands and features, most of which are easily forgotten.

Even with advances in computer and software technology, electronic spreadsheets have not necessarily become easier to use. Instead, technological advances have been largely employed to build more complex functions and modeling features into spreadsheets, often with more complicated menu trees; or worse yet, a staggering array of icons which leave the user even more bewildered. Thus, while prior art spreadsheets have continued to increase in functionality, they have also greatly increased in complexity for the user.

Three dimensionality is one such example. Three-dimensional spreadsheets allow the user to create a worksheet having cells arranged in a 3-D grid. In this manner, the user can manipulate multi-dimensional ranges, i.e., solid blocks of cells. This feature has distinct advantages. For example, the user can build a worksheet consisting of multiple two-dimensional spreads, define 3-D ranges that span these spreads, and copy a range of rows and columns into each of many 2-D spreads at once. This feature eases difficult choirs, such as consolidation of multiple spreads.

Despite its advantages, three-dimensionality, as presently implemented, is an advanced feature beyond the grasp of many spreadsheet users. This is not a necessary result of a three-dimensional model per se but, instead, has resulted from poor implementations of the model in prior art spreadsheet programs. One popular implementation of the model in the prior art, for example, requires the user to manipulate each additional spread of a three-dimensional spreadsheet as a separate window in a graphical windowing environment. This approach is far from intuitive, however. In particular, this approach requires the user to master actions which have no counterpart in everyday activities. While three-dimensional spreadsheets provide additional functionality, they serve to illustrate how non-intuitive implementations of new technology greatly add to the complexity of the user interface.

Another disadvantage of prior art spreadsheet systems is the lack of tools for building application programs which operate in a spreadsheet environment. More particularly, it is desirable to create spreadsheets which include user interface components (e.g., dialog boxes, screen buttons, and the like) which are customized for a particular spreadsheet task at hand, thus providing a custom application with the look and feel of the underlying spreadsheet system. Moreover, conventional systems lack the ability to connect or link spreadsheet cells to user interface objects, so that a cell may be updated dynamically with a change to a user interface object.

SUMMARY OF THE INVENTION

Application software, such as electronic spreadsheets, have found wide application in the processing and presentation of information. Despite their computational power, however, these programs require users to master complex interfaces, adopting abstract representation models which are beyond the grasp of ordinary users. As a result, much of the computational power of these applications goes un-utilized by end users.

The present invention, in contrast, provides system and methods having a highly intuitive interface for users. More particularly, the present invention provides interface objects which are familiar to the user. In an exemplary embodiment of the present invention, an electronic spreadsheet system includes a notebook interface having a plurality of notebook pages, each of which contains a spread of information cells, or other desired page type (e.g., Graphs page).

Methods are provided for rapidly accessing and processing information on the different pages, including, for example, displaying a plurality of page identifiers for selecting individual pages. Additional methods are provided for editing cells and blocks of cells. In this fashion, the spreadsheet notebook of the present invention provides a convenient means for organizing and presenting information. Moreover, the spreadsheet notebook of the present invention readily accommodates complex data (e.g., consolidation across multiple spreads); yet, at the same time provides the user with a highly intuitive interface, one which employs interface objects which are familiar to the user.

The present invention also includes system and methods for conveniently inspecting and setting the properties of objects. A method for accessing an object's property, in accordance with the present invention, includes receiving a request from the user for inspection of an object; accessing properties for the object; and displaying the properties to the user. From the displayed properties, the user may alter the characteristics of the object, as desired.

The present invention also includes a spreadsheet application development module having a user interface (UI) builder for building custom applications operative in an electronic spreadsheet. An application is a combination of components which work together to simplify an end user's task. When building an application using the system of the present invention, the user (in a role as developer) can create custom components, including dialog boxes, toolbars, menus, and the like. After creating these components, the user can assemble them into an integrated application notebook which comprises all of the programming logic and user interface components for the spreadsheet application.

The UI builder provides "live" links between system objects (e.g., a dynamic link between a spreadsheet cell and a scroll bar). In particular, link commands are provided which a developer may attach to a control to indicate what should happen when an end-user activates or changes the control. Link commands usually specify three things: an event, an action, and an object. The event indicates what occurrence should trigger the link command; the action indicates what should happen. The object is what should be acted upon. One control can have many link commands. In operation, a link command can send a value to a cell in the notebook, run a macro, close a dialog box, change the zoom factor in the notebook, or the like.

BRIEF DESCRIPTION OF THE DRAWINGS

FIGS. 4H–J are a series of screen bitmaps illustrating the model copy method of the present invention.

FIG. 4L–M are screen bitmaps illustrating the presentation of information in a notebook of the present invention.

FIG. 5A is a screen bitmap illustrating exemplary objects of the spreadsheet notebook of the present invention.

FIGS. 8D–F illustrate the referencing of information in the spreadsheet notebook of the present invention.

FIGS. 11B–D are bitmap screenshots illustrating organization of the spreadsheet application within a notebook, with each major module occupying a single notebook page.

FIG. 11G illustrates two views of a dialog box: an editable (developer) form and a runtime (user) form.

FIG. 11I illustrates arguments of the DODIALOG command.

FIG. 11J is a bitmap screenshot illustrating a completed dialog box (in test mode).

FIG. 11K is a bitmap screenshot illustrating entry of a macro command in a notebook for displaying a dialog box.

FIG. 13 is a bitmap screenshot illustrating a macro in a notebook that displays the dialog box of FIG. 11E (and uses the settings within the dialog box to calculate a loan payment).

DETAILED DESCRIPTION OF A PREFERRED EMBODIMENT

System Hardware

Figure 1A:
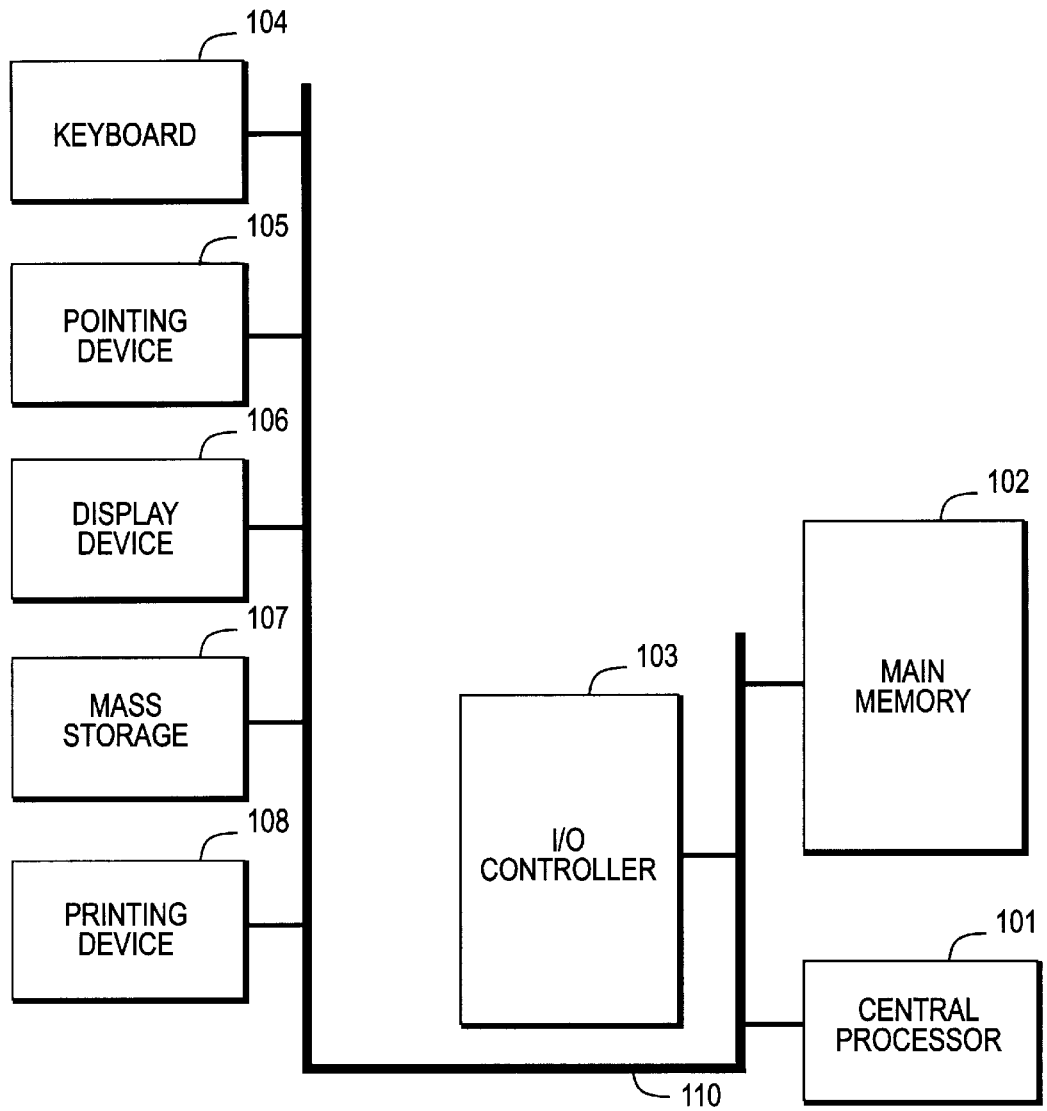
FIG. 1A is a block diagram of a computer system in which the present invention may be embodied.

As shown in FIG. 1A, the present invention may be embodied on a computer system such as the system 100, which comprises a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including IBM of Armonk, N.Y.).

Figure 1B:
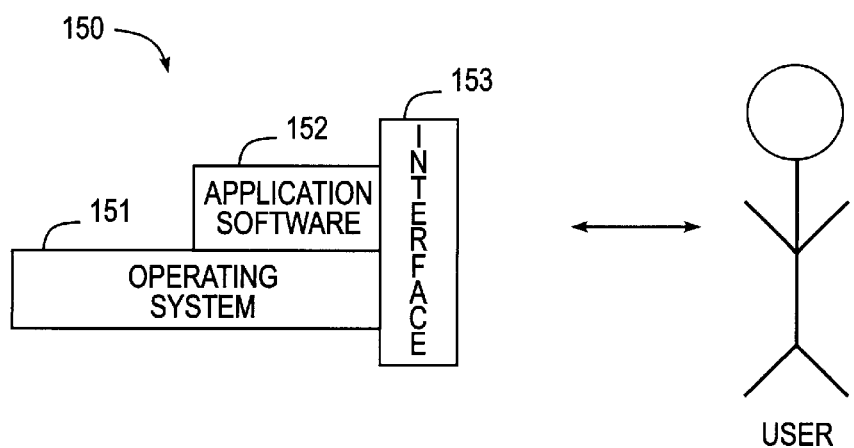
FIG. 1B is a block diagram of a software system of the present invention, which includes operating system, application software, and user interface components.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as spreadsheet module 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 is MS-DOS, and interface 153 is Microsoft® Windows; both are available from Microsoft Corporation of Redmond, Wash. Spreadsheet module 152, on the other hand, includes Quattro® Pro for Windows, available from Borland International of Scotts Valley, Calif.

Interface: User-familiar Objects

A. Introduction

The following description will focus on the presently preferred embodiments of the present invention, which are embodied in spreadsheet applications operative in the Microsoft Windows environment. The present invention, however, is not limited to any particular application or any particular environment. Instead, those skilled in the art will find that the system and methods of the present invention may be advantageously applied to a variety of system and application software, including database management systems, wordprocessors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
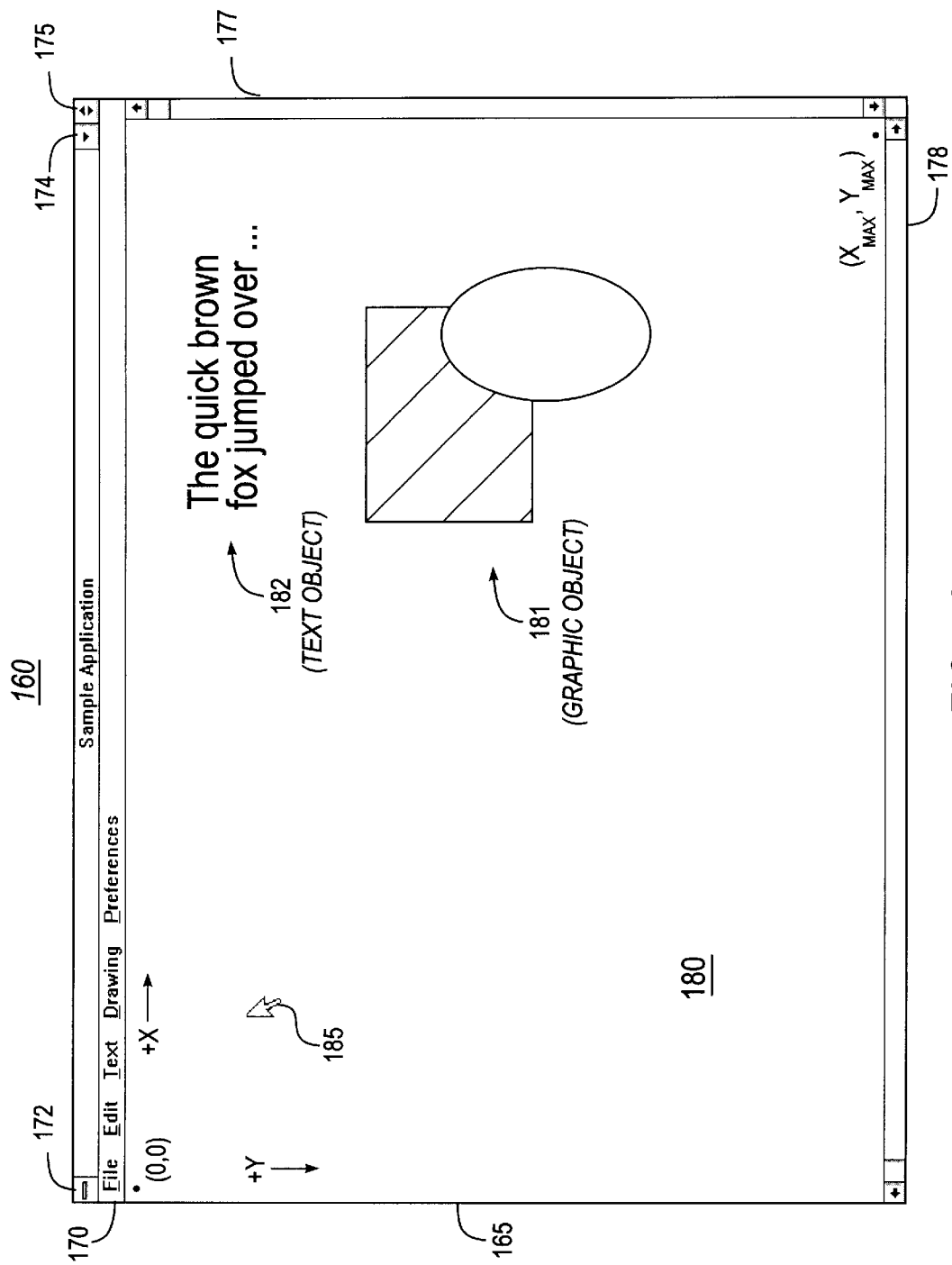
FIG. 1C is bitmap screen shots illustrating the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, resized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons." Programming techniques and operations for mouse devices are well documented in the programming and hardware literature; see e.g., *Microsoft Mouse Programmer's Reference*, Microsoft Press, 1989, the disclosure of which is hereby incorporated by reference.

B. Spreadsheet Notebooks

In contrast to conventional applications, even those operative in a windowing environment, the present invention includes user-familiar objects, i.e., paradigms of real-world objects which the user already knows how to use. In an exemplary embodiment, system 100 includes a spreadsheet notebook interface, with such user-familiar objects as pages and tabs. In this manner, complexities of the system are hidden under ordinary, everyday object metaphors. By drawing upon skills which the user has already mastered, the present invention provides a highly intuitive interface—one in which advanced features (e.g., three-dimensionality) are easily learned.

1. General Interface

Figure 2A:
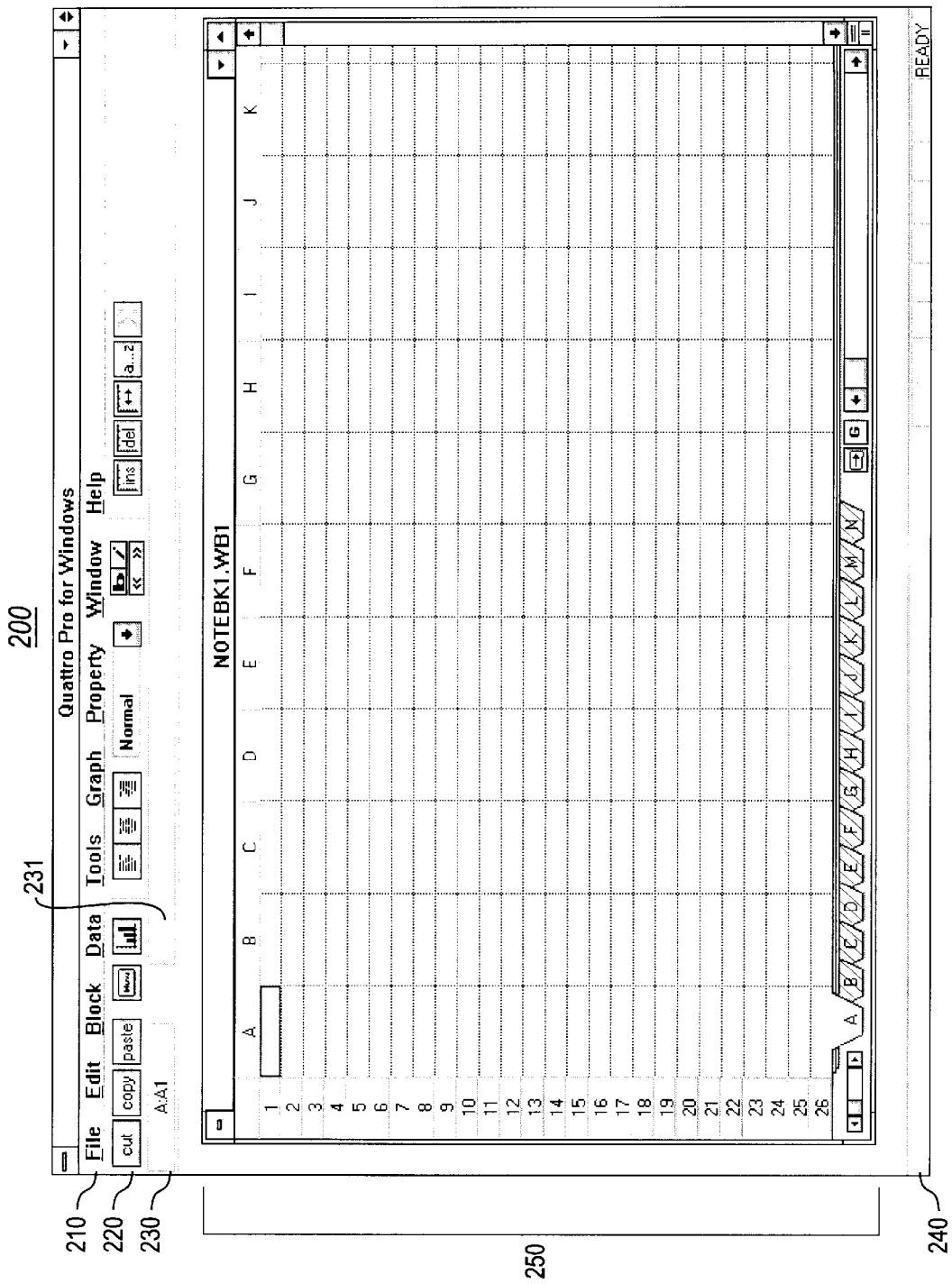
FIG. 2A is a screen bitmap illustrating a spreadsheet notebook of the present invention.

Shown in FIG. 2A, spreadsheet module 152 includes a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a tool bar 220, a current cell indicator 230, an input line 231, a status line 240, and a notebook window 250. The menu bar 210 displays and invokes, in response to user inputs, a main level of user commands. Menu 210 also invokes additional pulldown menus, as is known in windowing applications. Input line 231 accepts user commands and information for the entry and editing of cell contents, which may include data, formulas, macros, and the like. Indicator 230 displays an address for the current cursor (i.e., active cell) position. At the status line 240, system 100 displays information about the current state of the workbook; for example, a "READY" indicator means that the system is ready for the user to select another task to be performed.

Figure 2B:
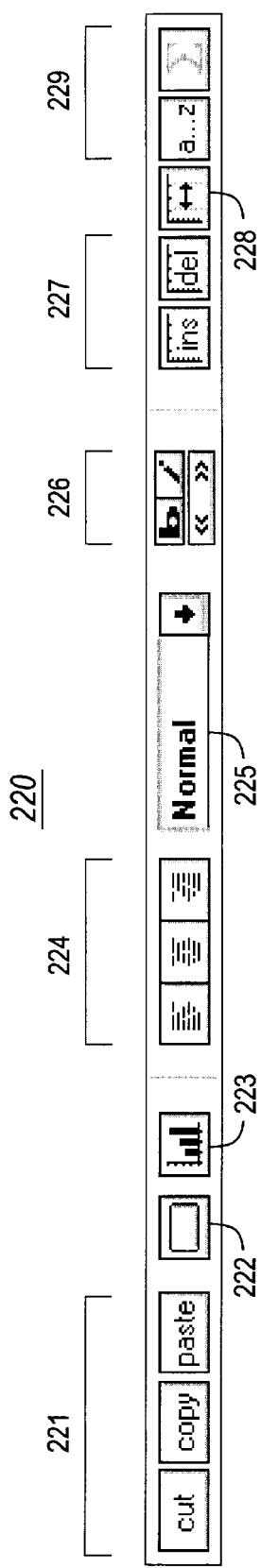
FIG. 2B is a bitmap of a tool bar component of the spreadsheet of the present invention.

The tool bar 220, shown in further detail in FIG. 2B, comprises a row or palette of tools which provide a quick way for the user to choose commonly-used menu commands or properties. In an exemplary embodiment, tool bar 220 includes cut, copy, and paste buttons 221, a power button tool 222, a graph tool 223, alignment buttons 224, a style list 225, font buttons 226, insert/delete buttons 227, a fit button 228, and action buttons 229. Buttons 221 cut, copy and paste data and objects to and from Windows clipboard. The same actions are also available as corresponding commands in the Edit menu (available from menu bar 210). Tool 220 creates "powerbuttons" which allow a user to run spreadsheet macros; in a specific embodiment, powerbuttons appear as floating objects in a layer above spreadsheet cells. In a similar fashion, the graph tool 223 creates floating graphs that appear above spreadsheet cells.

Other tools are available for formatting cells. Alignment buttons 224 place cell entries flush left, centered, or flush right, as desired. The style list 225 specifies the style for the active block and may be selected from a plurality of predefined styles (e.g., normal, currency, fixed, percent, and the like). The font buttons 226 effect font changes, including toggling bold and italic fonts, as well as increasing and decreasing font (point) size. The insert and delete buttons 227 permit the user to insert or delete blocks, rows, columns, and pages (described in further detail hereinbelow), as desired. The fit button 228 allows the user to quickly tailor a column's width to match its widest cell entry. Action buttons 229 provide automated spreadsheet operations, including sorting and summing operations. For example, a Sort button, when invoked, performs a sort on data in a currently active block. A sum button, on the other hand, totals the values in any block of cells by generating an @SUM function, just outside a selected range of blocks.

2. Notebook and Pages

Figure 2D:
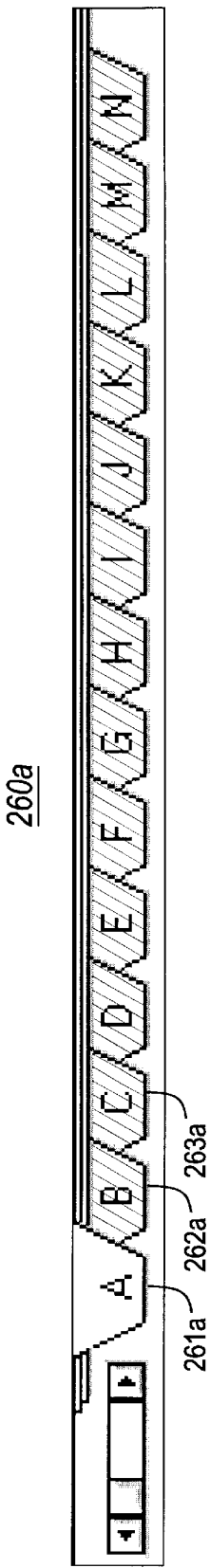
FIGS. 2D–E are bitmaps illustrating page identifiers for rapidly accessing and manipulating individual pages of the notebook of the present invention.
Figure 2E:
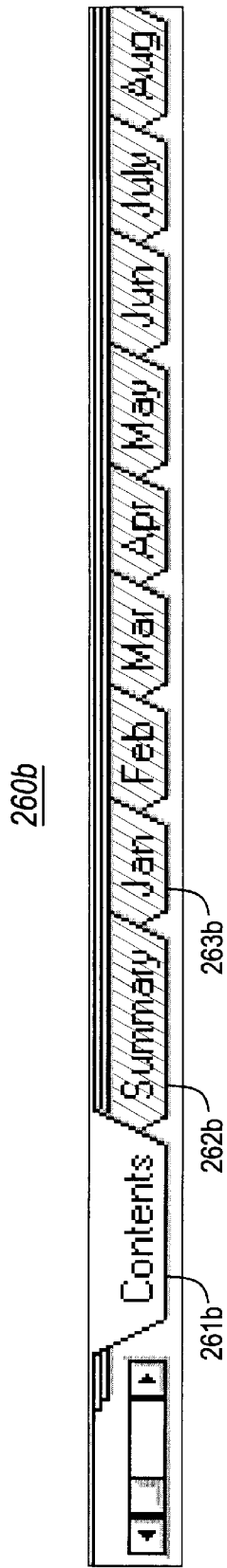
Figure 2C:
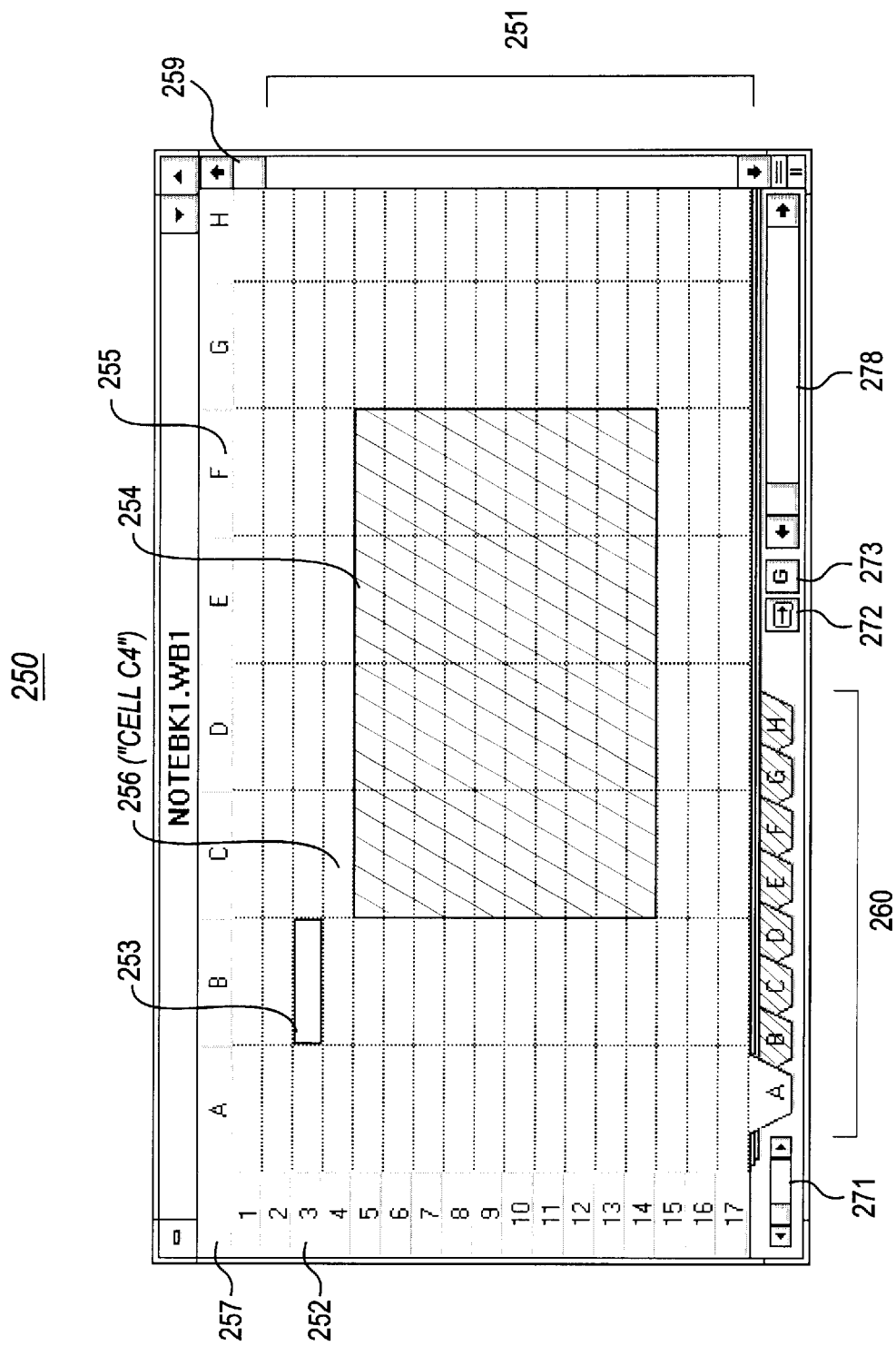
FIG. 2C is a screen bitmap illustrating a notebook window from the spreadsheet notebook of the present invention.

Notebook 250, shown in further detail in FIG. 2C, provides an interface for entering and displaying information of interest. The notebook 250 includes a plurality of spreadsheet pages, such as page 251 (Page A). Notebook 250 also includes a "Graphs page" for readily accessing all the graphs created for the notebook. Each page may include conventional windowing features and operations, such as moving, resizing, and deleting. In a preferred embodiment, the notebook 250 includes 256 spreadsheet pages and one Graphs page, all of which are saved as a single disk file on the mass storage 107. In accordance with the present invention, workspace 200 may display one or more notebooks, each sized and positioned (e.g., tiled, overlapping, and the like) according to user-specified constraints. When a single notebook is used, notebook 250 will typically occupy a majority of workspace 200.

Each spreadsheet page of a notebook includes a 2-D spread. For example, spreadsheet page 251 includes a grid in row and column format, such as row 252 (row 3) and column 255 (col. P). At each row/column intersection, a box or cell (e.g., cell C4) is provided for entering, processing, and displaying information in a conventional manner. Each cell is addressable, with a selector 253 being provided for indicating a currently active one (i.e., the cell that is currently selected).

As shown in FIGS. 2C–E, individual notebook pages are identified by page identifiers 260, preferably located along one edge of the notebook 250. In a preferred embodiment, each page identifier is in the form of a tab member (e.g., members 261a, 262a, 263a) situated along a bottom edge of the notebook. Each tab member may include representative indicia, such as textual or graphic labels, including user-selected titles representing the contents of a corresponding page. In FIG. 2D, the tab members 260 are set to their respective default names. For example, the first three tab members (members 261a, 262a, 263a) are respectively set to A, B, and C. In a preferred embodiment, however, tab members are typically given descriptive names provided by the user. As shown in FIG. 2E, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers aid in the entry of spreadsheet formulas. For example, when entering a formula referring to cells on another page, the user may simply use the descriptive page name in the formula itself (as described hereinbelow), thus making it easier for the user to understand the relationship of the cell(s) or information being referenced.

3. Navigation in a Notebook

Figure 3A:
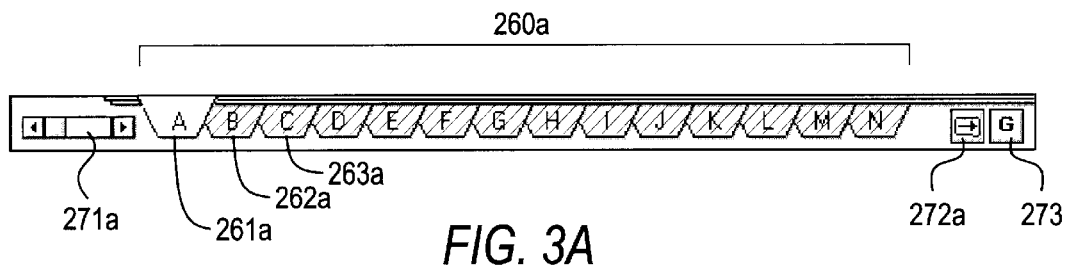
FIGS. 3A–C illustrate navigation (i.e., access of desired information) in the spreadsheet notebook of the present invention.
Figure 3B:
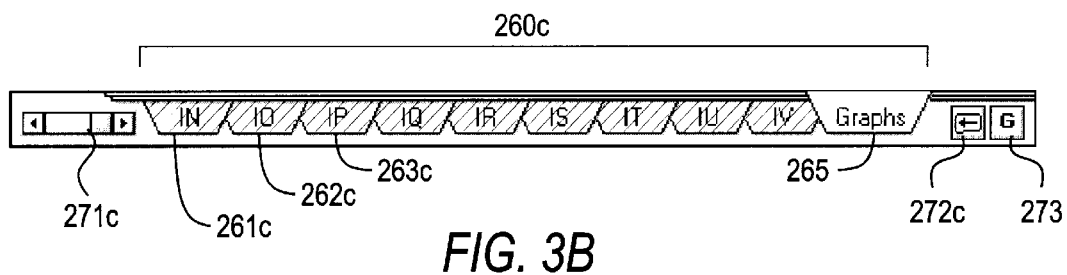
Figure 3C:
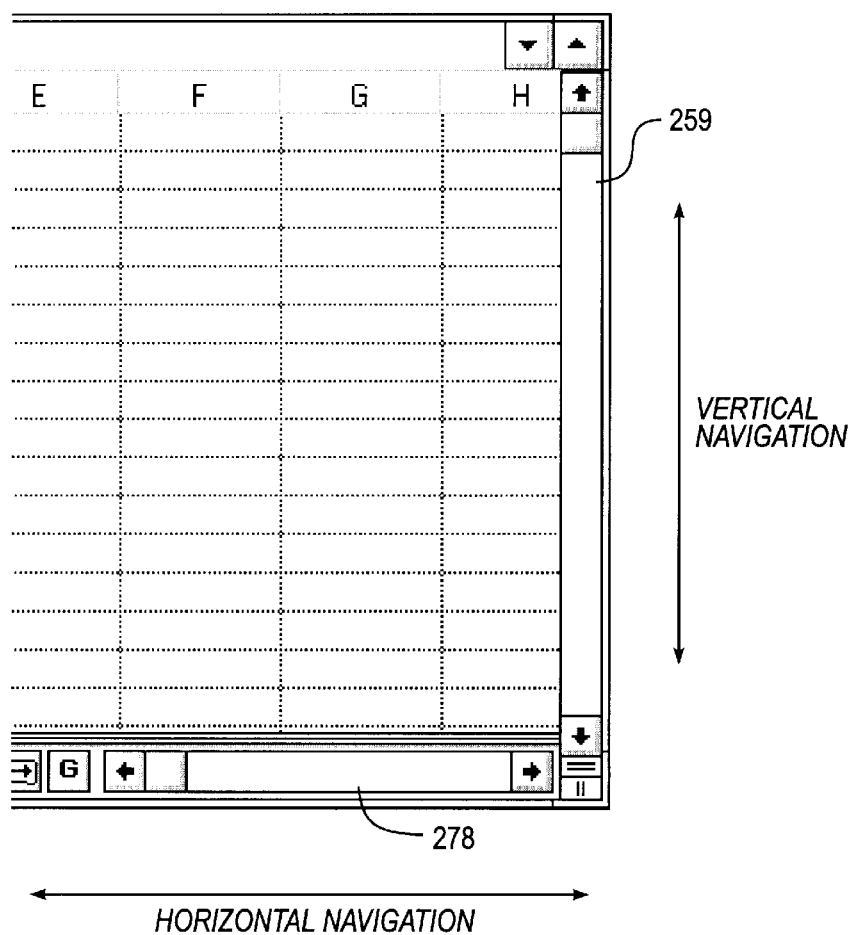

Referring now to FIGS. 3A–C, movement (i.e., location of desired information cells) within a spreadsheet notebook of the present invention is illustrated. To move to different pages in the notebook, the user simply selects the corresponding tab from tabs 260. To move to Page B, for example, the user selects (e.g., with keyboard 104 or pointing device 105) tab 262a; similarly, Page C is reached by selecting tab 263a. Continuing the example, the user may return to Page A by selecting tab 261a. Thus instead of finding information by scrolling different parts of a large spreadsheet, or by invoking multiple windows of a conventional three-dimensional spreadsheet, the present invention allows the user to simply and conveniently "flip through" several pages of the notebook to rapidly locate information of interest.

Notebook 250 also includes supplemental tools for navigation between pages, including a tab scroller 271 and a fast-forward button 272. The tab scroller (shown in two different states: 271a and 271b) permits access to identifiers for pages which are not currently visible on the screen device 106. If a desired identifier or tab is not currently in view, the user simply activates the tab scroller 271 to reveal additional tabs. The fast-forward button 272, on the other hand, provides immediate access to the last pages of the notebook, including the Graphs page. As shown in FIGS. 3A and B, after invoking the fast-forward button 272a, the page identifiers for the last pages (e.g., tabs 261c, 262c, 263c, 265) are accessible. To switch back to the previously active spreadsheet page, the user may select or click the fast-forward button 272c again. For navigation within a spreadsheet page, horizontal and vertical scrollbars 278, 259 are provided; general features and operations of basic scroller or sliders are described in Windows user and programming literature, including Microsoft's Windows Software Development Kit.

4. Selections and Aggregate Operations within a Notebook

The selection of desired information cells in the notebook of the present invention is now described. For selecting a plurality of information cells, both 2-D blocks (e.g., block 254 of FIG. 2C) and 3-D blocks of cells may be defined. A 2-D block is a rectangular group of one or more cells and is identified by block coordinates, such as the cell addresses of its upper-left and bottom-right corners. Similarly, a 3-D block represents a solid block (e.g., cube) of cells.

A 2-D block is specified by selecting, with mouse 105 or keyboard 104, opposing corners. In FIG. 2C, for example, the block 254 is defined by corner cells C5 and F14. Additional selection examples are illustrated in FIGS. 4A–E. For example, column B (col. 411) is selected by clicking column heading 410; similarly, row 3 (row 421) is chosen by clicking row heading 420. Selection may be additive (i.e., additional selections are appended to the current ones), as shown by selection of a row 420 and a column 410 in FIG. 4C. To facilitate the selection of all cell members (e.g., block 431), a select-all button 430 is also provided. In addition to these "contiguous" blocks, non-contiguous block selection (e.g., selection of blocks 441, 442) is provided by use of a status key (e.g., CTRL-, ALT-, or SHIFT-) plus a mouse event (e.g., click and drag operations).

Selection of 3-D cell blocks, i.e., cell ranges spanning more than one page, occurs in a similar fashion. To extend the block 254 (of FIG. 2C) into a 3-D block, the user specifies an additional or third dimension by selecting an appropriate page identifier. If the user selects the D tab while the block 254 is selected (e.g., with a SHIFT or other status key), the 2-D block is extended into a 3-D block spanning from Pages A to D. Additional 3-D operations may be performed by utilizing a method of the present invention for grouping pages, which will now be described.

Figure 4A:
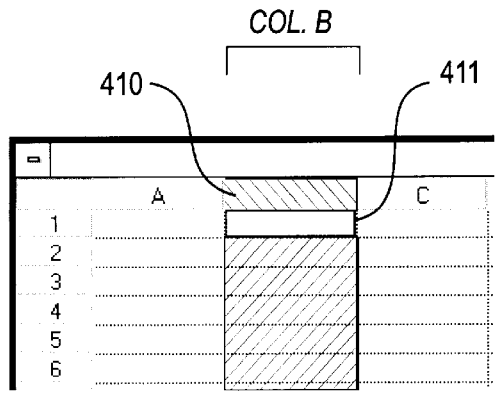
FIGS. 4A–E are screen bitmaps illustrating the selection of information cells in the spreadsheet notebook of the present invention.
Figure 4B:
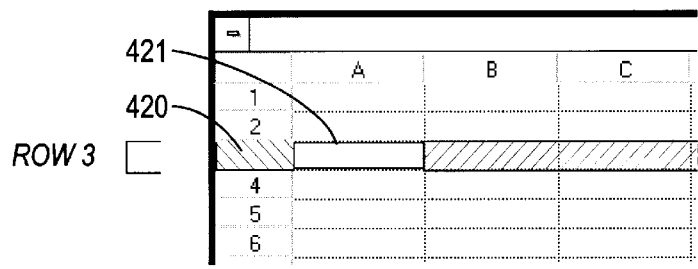
Figure 4C:
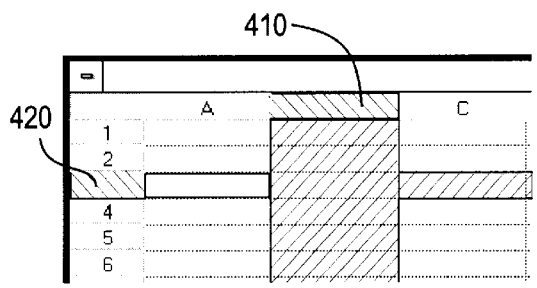
Figure 4D:
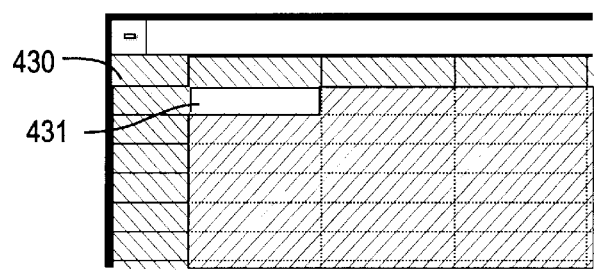
Figure 4E:
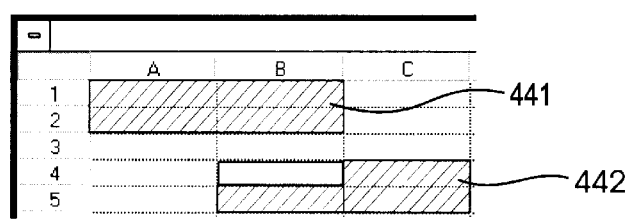
Figure 4F:
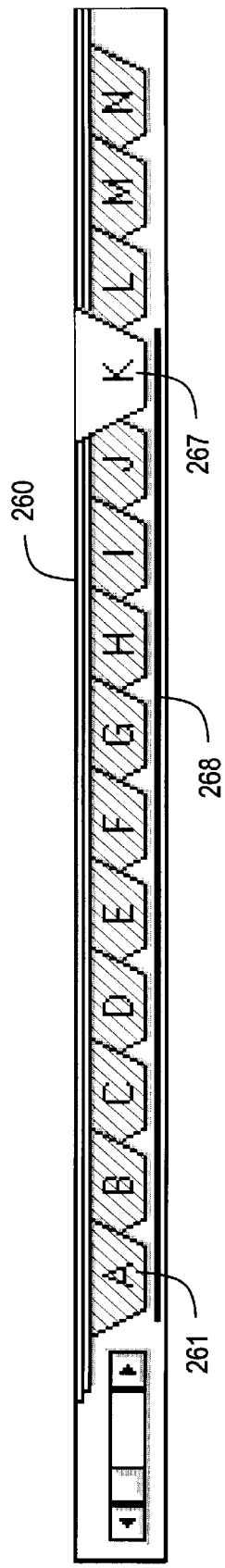
FIG. 4F is a screen bitmap illustrating the operation of grouping one or more desired pages in the spreadsheet notebook of the present invention.

Pages may be selected or grouped together, thereby providing a means for changing multiple pages simultaneously. In much the same manner as cells from a spread are grouped into 2-D blocks, a range of pages are grouped by specifying beginning and ending members. As shown in FIG. 4F, a range from Page A to Page K may be achieved by selecting tabs A (261) and K (267) from identifiers 260, for example, while depressing a key (e.g., status key). A grouping indicator 268 is displayed for indicating members of a group; groupings may also be annotated with user-specified labels. Once grouped, a page of the group may have its operations (e.g., selection, data entry, and the like) percolate to the other members of the group, as desired. A non-contiguous selection of pages may also be selected (even across different pages); for example, a selection of Pages A and D, but not B and C, may be achieved by selecting tabs A and D while depressing a second key (e.g., CTRL- key). Furthermore, groups may overlap (i.e., a page can be in more than one group), as desired. By selectively activating a group mode (e.g., by toggling group button 273), groupings may be temporarily turned off, in which case events are not percolated to other members of the group.

With group mode active, an activity in a page which is a member of a group can also affect similarly situated cells of the other pages of the group. For example, information entered in a cell on one page of the group can also propagate to the same (relative) cell in other pages of the group; data entry may be "drilled" (propagated) to other group pages by concluding data entry, for example, with a "Ctrl-Enter" keystroke (instead of a "Enter" command). For instance, an entry into cell C4 of Page A may also conveniently and automatically appear in cell C4 of pages B, C, D, E, F, G, H, I, J, and K, for an A–K grouping. Similarly, block or aggregate operations may propagate across member pages. For example, a block operation (e.g., Block Fill) for cells A1 to C4 in Page A in an A–D grouping would also operate (in this case, fill information) in the same cells (i.e., from A1 to C4) for Page B to Page D.

Employing the user-specified page identifiers of the present invention, a simple nomenclature is available for specifying these solid blocks of information. In a preferred embodiment, a solid block is specified by:

<<First Page>> . . . <<Last Page>>:<<First Cell>> . . . <<Last Cell>>

For example, a solid block may be defined as A . . . D:A1 . . . C4, in which case the block spans from cells A1 to C4, and spans across Pages A–D. By permitting alias names (i.e., user-supplied alternative labels), the present invention allows the block to be specified as 1989 Sales . . . 1992 Sales A1 . . . C4; or even 1989 Sales . . . 1992 Sales :First Quarter . . . Third Quarter. Additionally, the present invention readily accommodates notebook information as well, for example, [TAX]1989 Sales . . . 1992 Sales : First Quarter . . . Third Quarter, thus permitting information to be linked across various notebooks. Wildcard characters (e.g., * and ?) may also be employed for cell, page, and notebook identifiers, as desired. Thus, the spreadsheet notebook of the present invention provides a 3-D interface which readily accommodates real-world information in a format the user understands (instead of forcing the user to adapt his or her information to fit an arbitrary spreadsheet model).

5. Advanced Editing

Figure 4G:
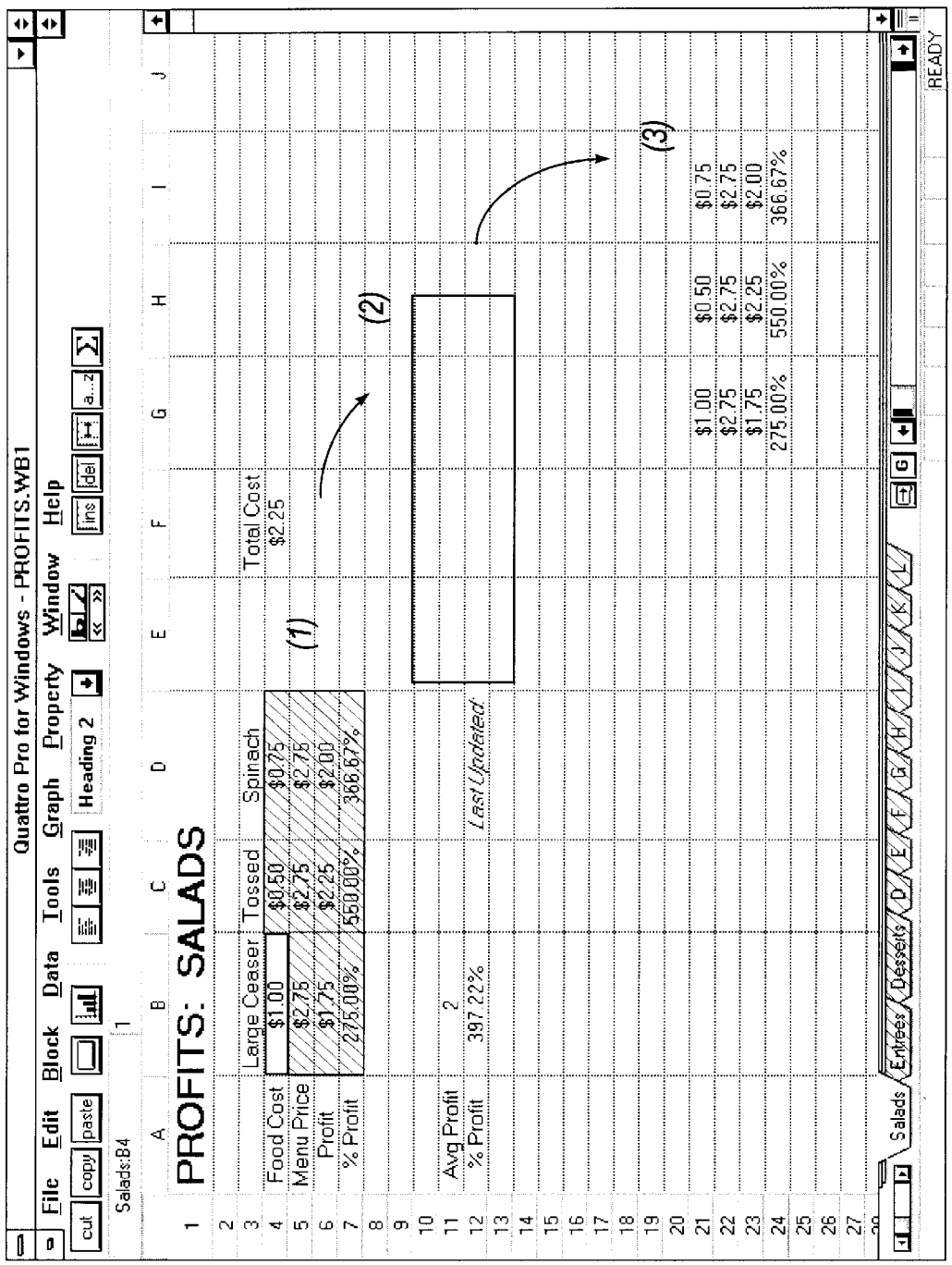
FIG. 4G is a screen bitmap illustrating drag-and-drop editing in the spreadsheet notebook of the present invention.

Whether 2-D or 3-D in nature, blocks of cells may be easily copied and cut (i.e., moved) using drag-and-drop editing techniques of the present invention. As shown in FIG. 4G for a 2-D block, for example, a method for copying a block of cells includes (1) selecting a source block by dragging a range of cells (e.g., mouse button-down events coupled with mouse movement across the range; close selection with a button-up event), (2) dragging the block (e.g., click within block, followed by repeated mouse button-down events), and (3) dropping the block (e.g., mouse button-up event at desired target location). In a similar fashion, 3-D blocks may be dragged and dropped.

In typical cut and copy operations, relative and absolute cell addressing is employed, as is known in the art (see e.g., Using 1-2-3). According to the present invention, however, a "model copy" technique for copying blocks is also provided. Model copying, illustrated in FIGS. 4H–J, is useful when the user is copying a block that contains absolute references to cells within the copied block. In FIG. 4H, a small spread model 496 is shown which contains a formula to figure the monthly payment for a 30-year loan at different interest rates; a reference to the loan amount was entered as absolute so that when the formula is copied, it continues to refer to cell B1. The user may want to calculate (at the same time) monthly payments for different loan amounts and, thus, might copy the model, with the loan amount changed (shown in FIG. 4I as spread 497). However, in this approach the absolute reference still refers to row 1; to correct this, the user would typically manually edit each formula to refer to B6 instead of B1.

With model copying of the present invention enabled (e.g., by default or through a user dialog), however, the problem is solved. In particular, absolute references adjust to the new location of the referenced cell, as shown by spread 498 in FIG. 4J; however, absolute references remain absolute to make future copies absolute. For instance, should the user make more copies of the formula, the reference to cell B6 is still absolute. In this manner, model copying of the present invention saves the user time-consuming and error-prone editing of formulas.

Figure 4K:
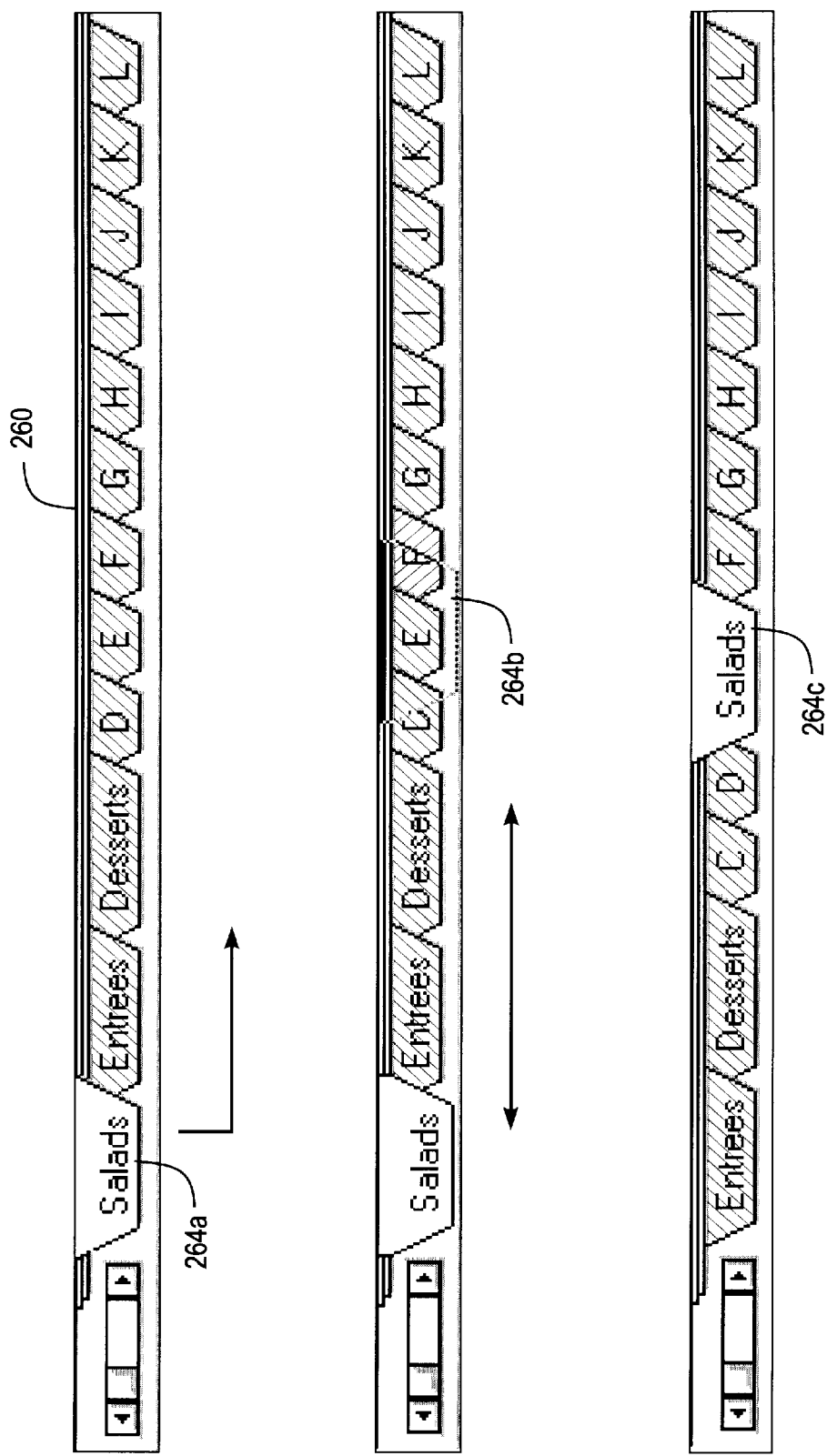
FIG. 4K is a set of bitmaps illustrating the operation of moving and copying a notebook page.

As shown in FIG. 4K, notebook pages may be copied or moved using the drag-and-drop editing techniques of the present invention (a dialog box is also provided as an alternative). As shown, for example, the "Salads" page is moved by selecting its tab identifier 264a from the identifiers 260; in a preferred method, the identifier is selected by dragging it downward (mouse button-down plus downward movement) with the mouse cursor. Next, the identifier is dragged to a desired new position (mouse button-down plus left and right movement). Once positioned at a desired location (as indicated by in-transit tab identifier 264b), the page is then "dropped" (mouse button-up) into position. Similarly, a "copy" operation may be effected by coupling the above operation with a status key (e.g., CTRL-); in a preferred method of copying, only the page information (not its tab identifier) is copied to a target location.

Additional editing operations may be easily accomplish using the page identifiers of the present invention. For example, an additional page may be inserted by selecting a desired tab and entering "INS" (keyboard or mouse). Similarly, a notebook page may be deleted by coupling the selection of a corresponding page tab to a delete command.

6. Advantages

Figures 4L, 4M:
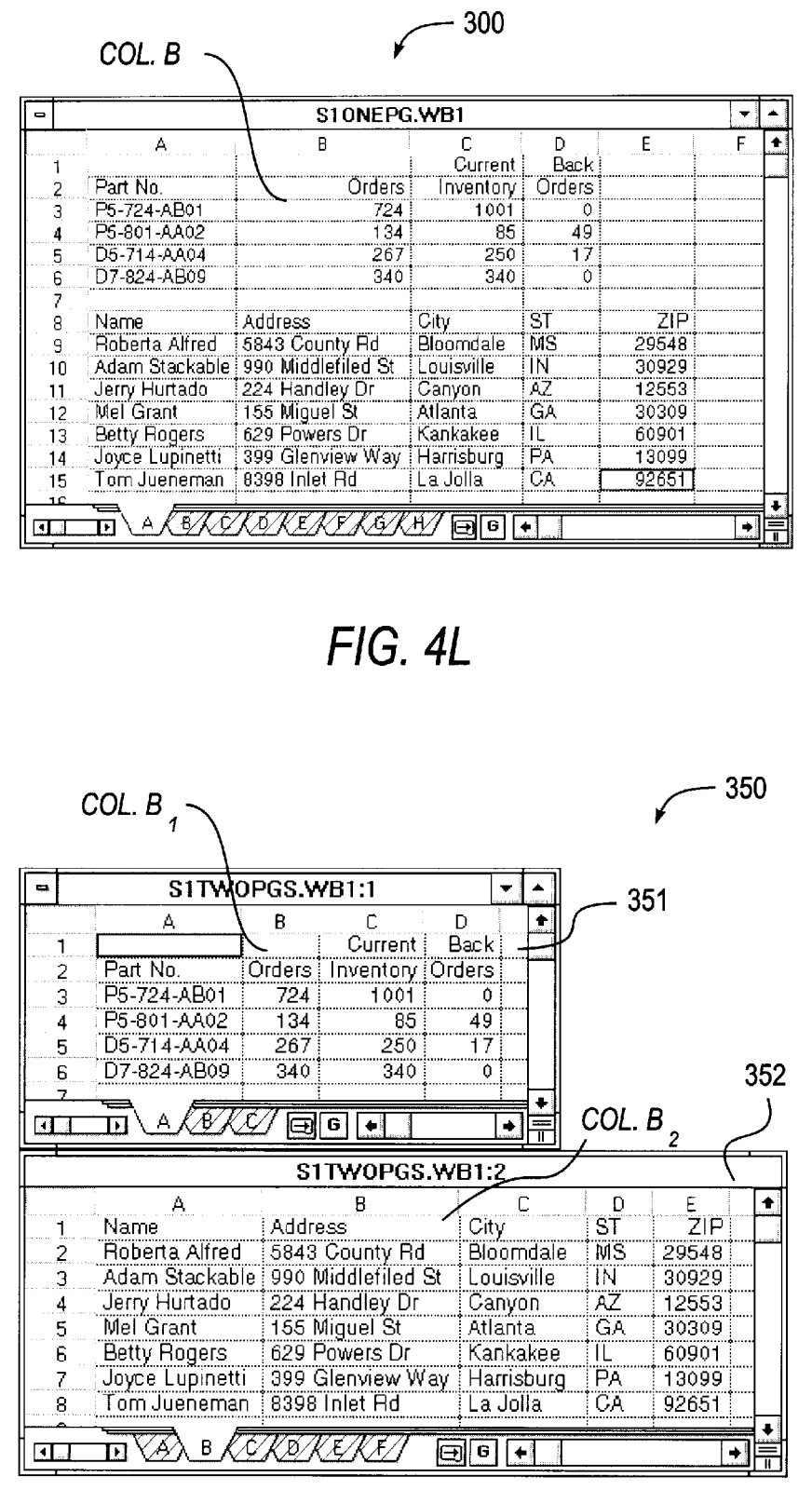

In contrast to prior art spreadsheet implementations, use of the spreadsheet notebook of the present invention is easily ascertained by the user. The notebook interface of the present invention provides a convenient means for organizing many spreadsheets together into one file. This permits the user to load (into memory 102) all related information with a single command, without having to remember a variety of different file names. Moreover, the notebook interface 250 encourages a user to spread data out among multiple pages, thus better organizing one's data. In FIG. 4L, for example, spreadsheet page 300 illustrates the conventional method for grouping unrelated information onto a single spreadsheet. As shown in column B, the incorporation of unrelated information into a single spread leads to unnecessary whitespace padding of information. In FIG. 4M, in contrast, related information is grouped on separate pages 351, 352 (e.g., with their own columns, Col. $B_1$ and Col. $B_2$) of notebook 350. Not only does this eliminate grouping of disparate information, with its disadvantages (e.g., padding data entries), but it also encourages better organization of information.

Inspecting and Setting the Properties of Objects

A. Disadvantages of Prior Techniques

Standard windowing interfaces depend heavily on a clunky system of pull-down menus. While pull-down menus are an improvement over command-line (e.g., MS-DOS) interfaces, they are non-metaphoric or non-analogous to ordinary objects, i.e., ones familiar to the user. Thus, prior art windowing GUIs are no more intuitive or useful to the user than other menuing systems.

Perhaps the biggest weakness of pull-down menus is the requirement that the user must know beforehand which menu contains the item or function of interest. If the user does not know which pull-down menu, submenu, or dialog box contains the item he or she is seeking, the user will spend an inordinate amount of time checking the contents of each in an effort to hunt down the needed item. And often the search is in vain. Moreover, since functions for a given object (e.g., text object) are often scattered over several disparate menus, the user is discouraged from interacting and experimenting with the object.

One approach to overcoming this problem has been the implementation of "smart icons." This interface technique employs screen buttons painted with icons which are supposed to tell the user what the buttons do. This approach, however, often makes the interface problem even worse because the meaning of the icons are not easily grasped. Thus, the approach is often no more helpful than hiding the desired function deep inside a menuing system. Worse, some button images are so small or so numerous that it is hard to see the icons well enough to discern what they mean.

B. Property Inspectors

1. Introduction

Overcoming this problem, the present invention provides "property inspectors" for inspecting and setting the properties of objects. Property inspectors of the present invention examine an object of interest to the user and tell the user what can be done to it. In this manner, the present invention requires the system and its interface components (e.g., menus or dialog boxes), not the user, to know what functions are being sought or may be of immediate interest to the user. Moreover, property inspectors of the present invention require the program to present functions to the user when and where he or she requests them, rather than making the user hunt for them when they are needed. Thus, the user need only know which data item or object he or she wants to inspect or manipulate.

In the spreadsheet notebook, for example, there are many kinds of objects which one can use. Examples include cells, blocks of cells, pages, notebooks, graphs and their elements (including bars or axes), dialog boxes, and even the application program itself. Each of these objects has properties, which are characteristics of that particular object. For example, blocks of cells have a font property that can be set to bold, so that the text of entries in the block appear in boldface type. A property of a workbook page, on the other hand, is the name that appears on its tab. Each notebook has its own palette property for controlling available colors. Application properties, for instance, include system defaults, such as a default storage directory or file extension. Thus in any system, the user has a variety of objects available, each of which has its own set of properties.

Property inspection of the present invention provides the user with immediate access to an object's properties. If the object of interest is a spreadsheet cell, for example, the property inspector of the present invention produces a menu that includes font, color, border, size, and other display properties, along with formula properties which may be modified. If, on the other hand, the object is a graph, the property inspector will display a menu to change its color, shape, borders, and other features of a spreadsheet graph. Moreover, inspection menus are state or context-sensitive, i.e., constructed on-the-fly to reflect the current state of the object. If an object's properties change so that what a user can do to it also changes, the property inspector of the present invention will create a new and appropriate menu reflecting those changes.

A variety of user events, including keyboard and mouse events, may be employed to invoke property inspection and setting. In a preferred method of the present invention, however, an object is inspected by selecting the object with a screen cursor, i.e., clicking (generating a mouse event) on the object. Since, according to the present invention, property inspection may be available across different modes of operation (i.e., generally available at all times), the generated mouse event or signal is preferably one which does not launch or otherwise invoke routine object actions. Instead, the mouse signal should be one which the user will easily associate with inspection of an object. In a two or three mouse button embodiment of the present invention, therefore, the generated mouse signal is most preferably from the lesser-used or right mouse button (e.g., Windows' $WM_{13}$ RBUTTONDOWN). In this manner, the user associates object actions with left button signals and object inspection with right button signals.

2. Exemplary Embodiments

Figure 5A:
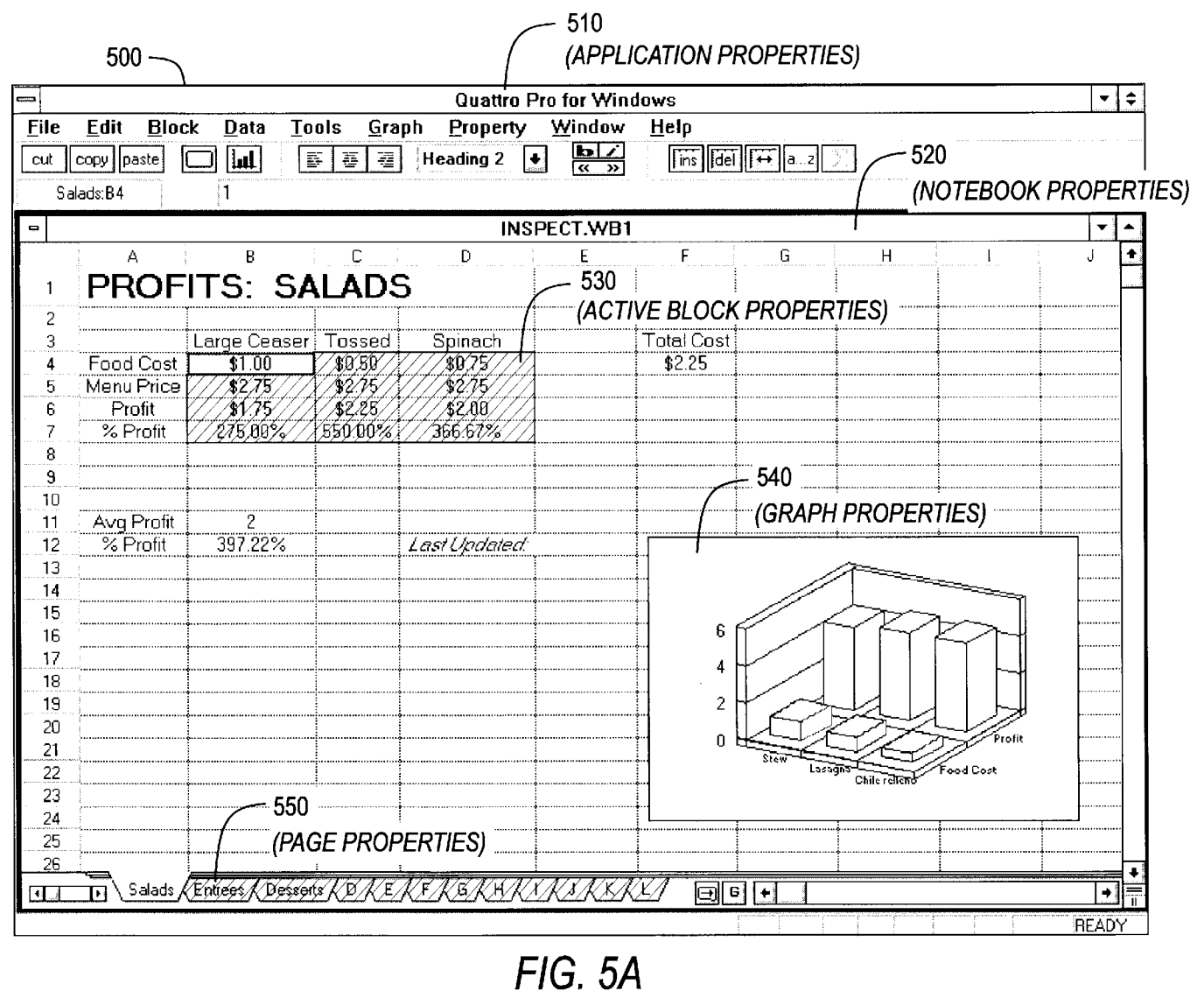
Figure 5B:
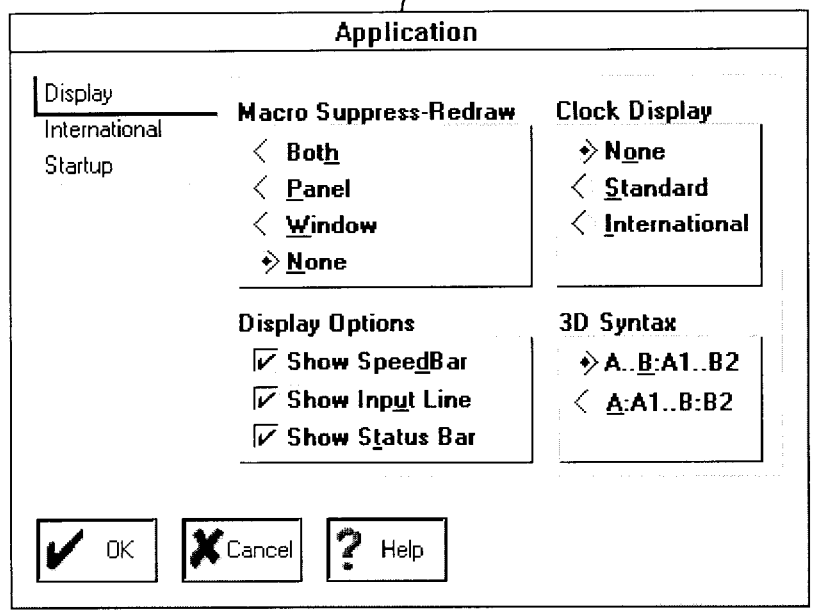
FIGS. 5B–E are bitmaps illustrating property inspectors of the present invention, for the objects of FIG. 5A.
Figure 5C:
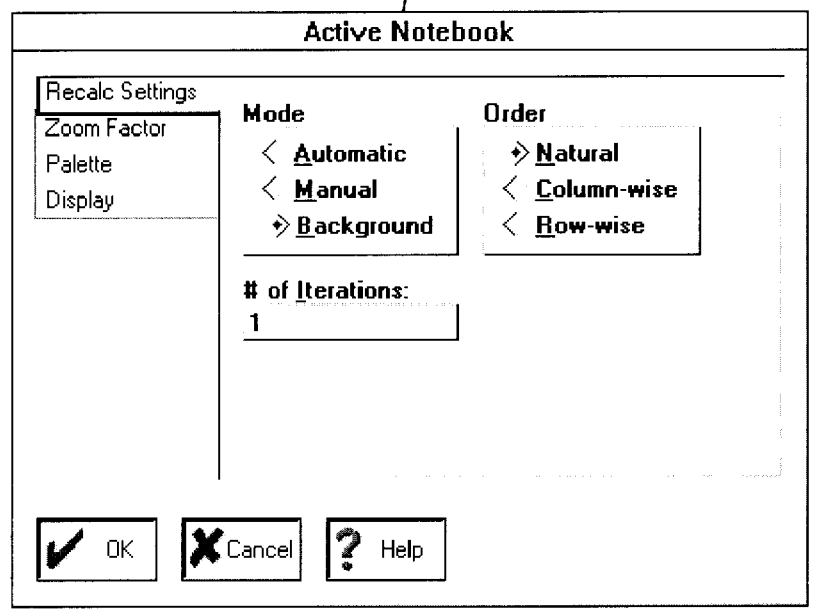

Referring now to FIGS. 5A–E, the inspecting and setting of object properties, in accordance with the present invention, is illustrated. In FIG. 5A, a notebook application window 500 is shown. Window 500 includes a variety of objects which may be inspected by the property inspector of the present invention. The top-most object is the application itself: application object 510. By selecting the application object (e.g., by right mouse clicking on the application title bar), various properties for the application may be inspected and set. As shown in FIG. 5B, inspection of the application object 510 invokes application inspector 515, which lists the various properties of the application object; the user may now inspect and set the properties of the object, as desired.

Referring back to FIG. 5A, the next level which may be inspected is the notebook object 520. User inspection of this object, e.g., by right mouse clicking on the notebook title bar, invokes the active notebook property inspector 525 of FIG. 5C. In a manner similar to the application property inspector, the notebook property inspector 525 includes all the properties and corresponding options which may be set for the notebook 520.

Figure 5D:
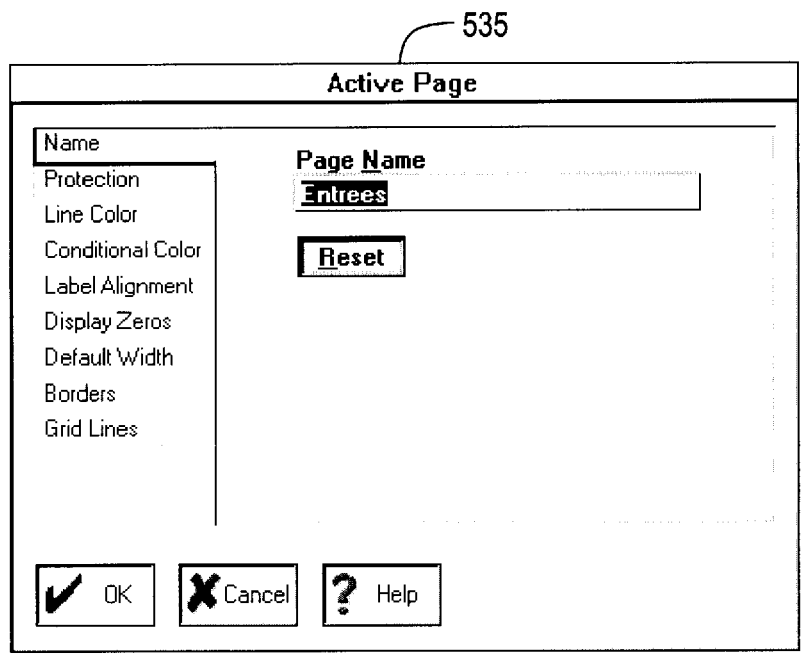

Notebook object 520 includes a plurality of page objects, which may themselves be inspected. To inspect the page object 550, for example, the user brings the page tab into view (if it is not already displayed), then right clicks the tab page. This action invokes the active page property inspector 535, as shown in FIG. 5D. With access to page properties, the user can control the page name, overall page protection, line color, colors in cells that meet certain conditions, default label alignment, whether zeroes are displayed, default column width, row and column borders, gridline display, and the like. To assign a more descriptive name to a page, for example, its tab is inspected and the option "NAME" is selected from the page property inspector (or, as shown, it is selected by default). After the user enters a new name, the new name appears on the page tab. Other page properties, most of which affect the appearance of data or screen elements, may be set in a similar manner.

Figure 5E:
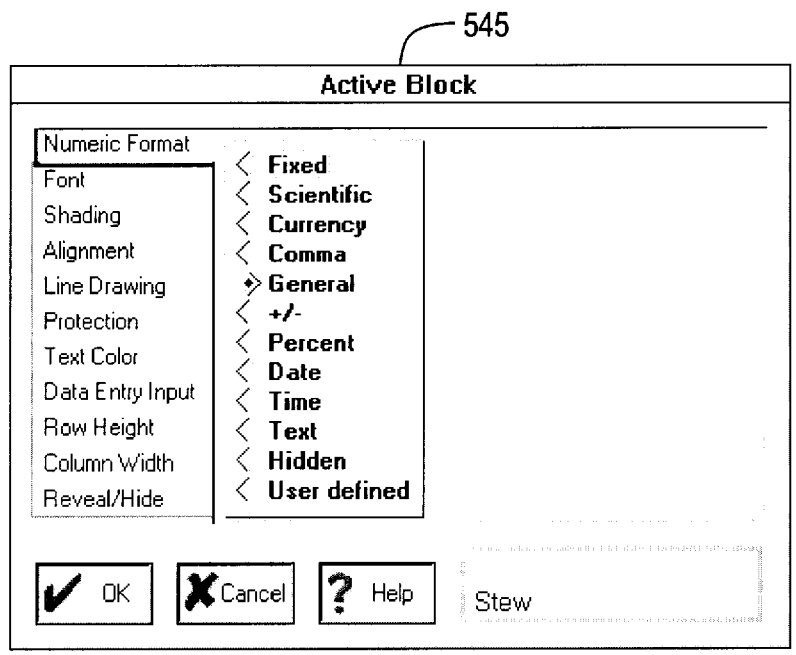
Figure 6A:
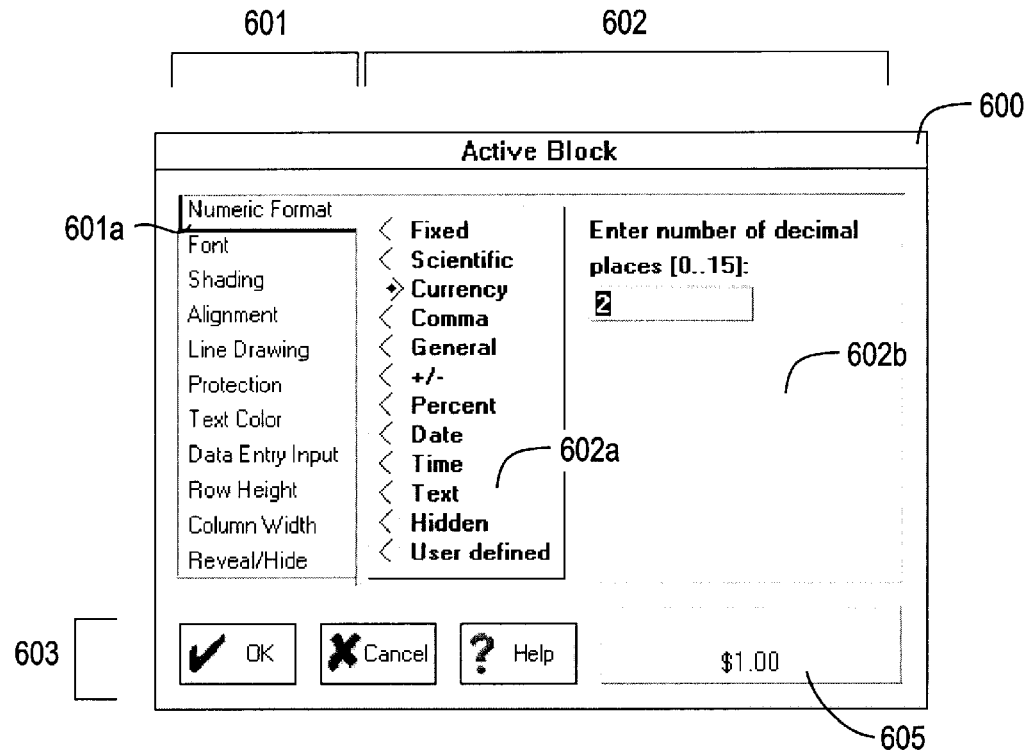
FIGS. 6A–K are bitmaps illustrating different states (and accompanying panes) for the property inspector of FIG. 5E, each state depending on a particular property of the object being inspected.
Figure 6B:
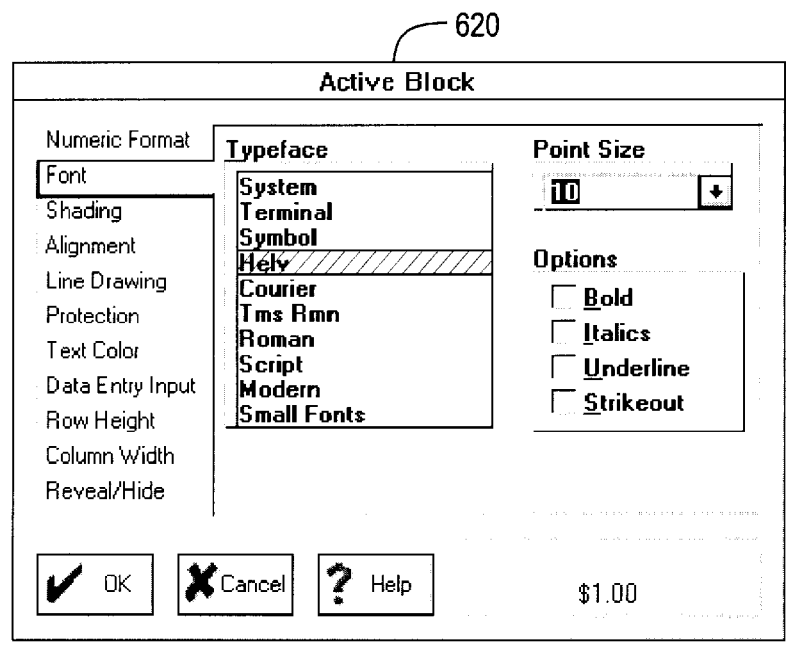
Figure 6C:
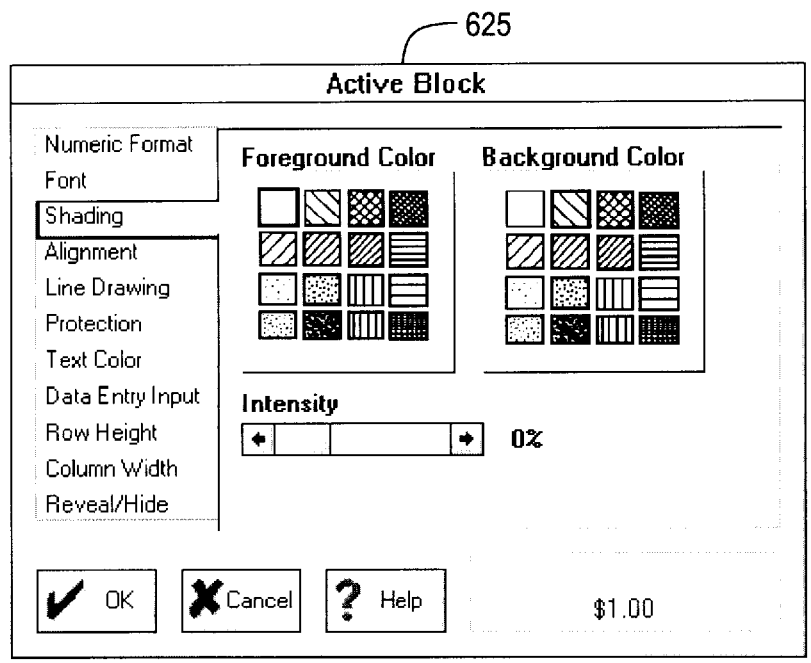
Figure 6D:
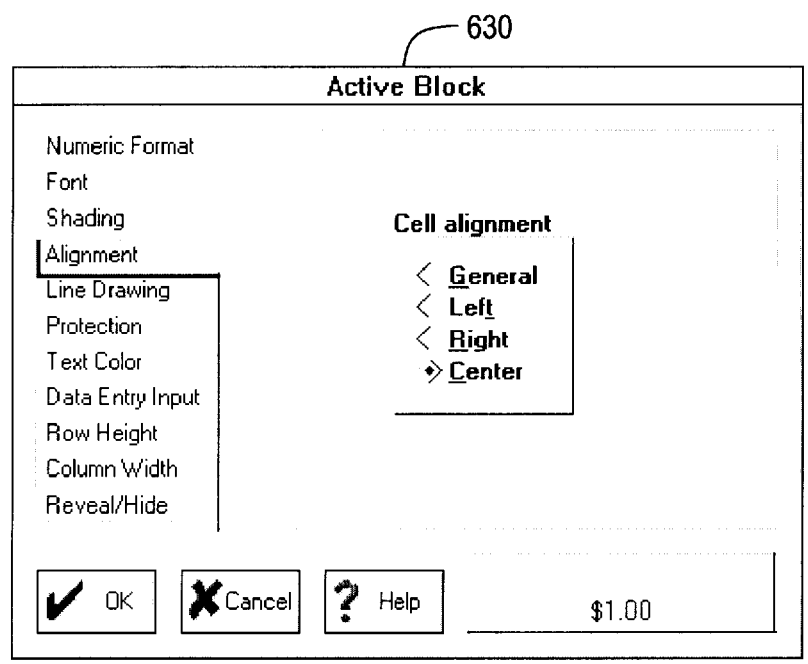
Figure 6E:
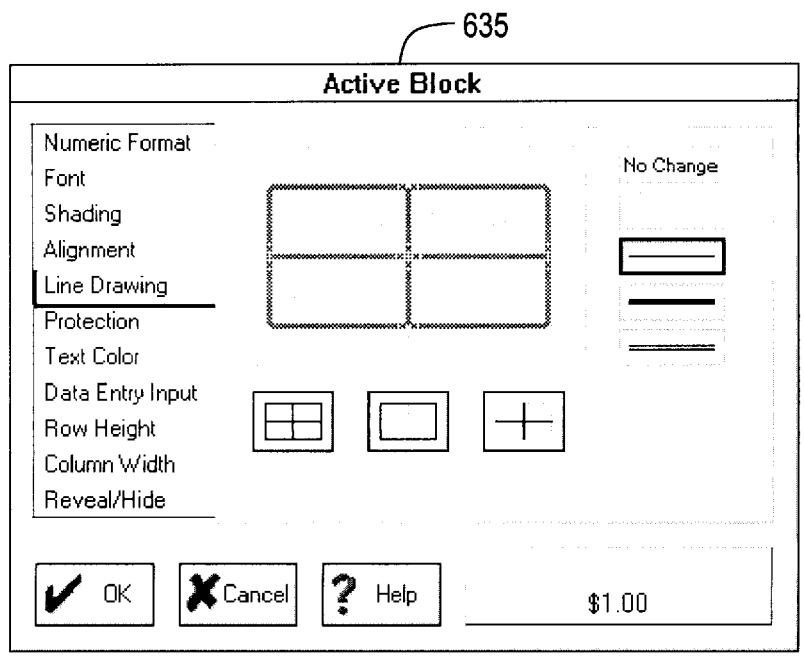
Figure 6F:
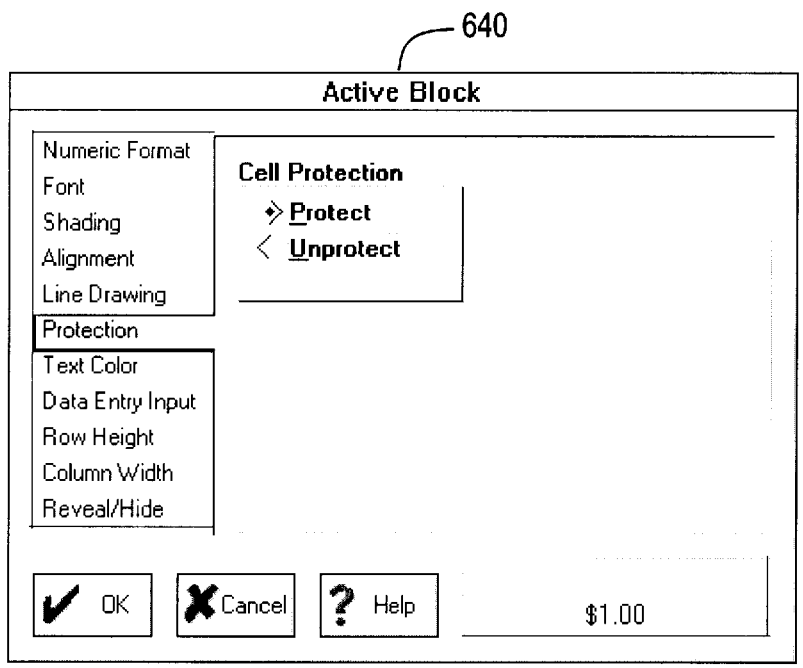
Figure 6G:
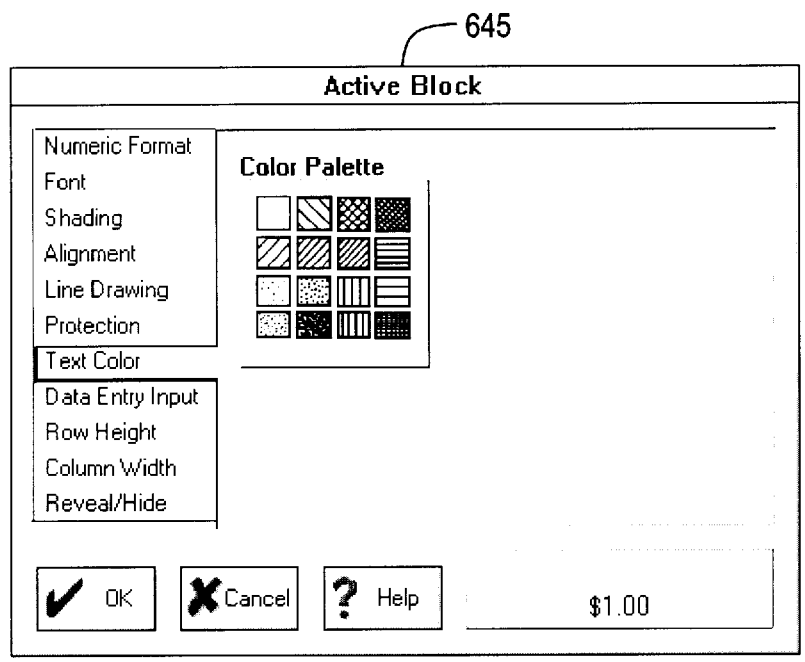
Figure 6H:
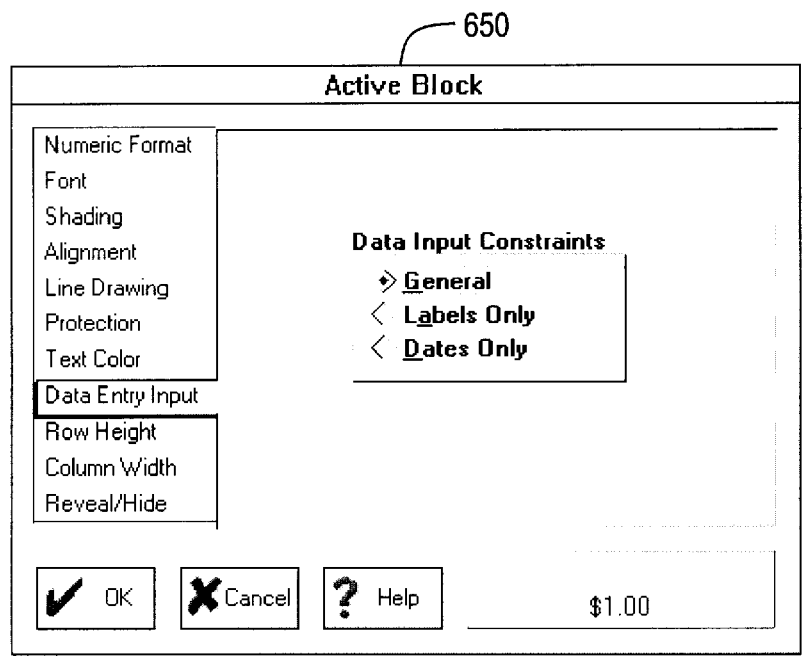
Figure 6I:
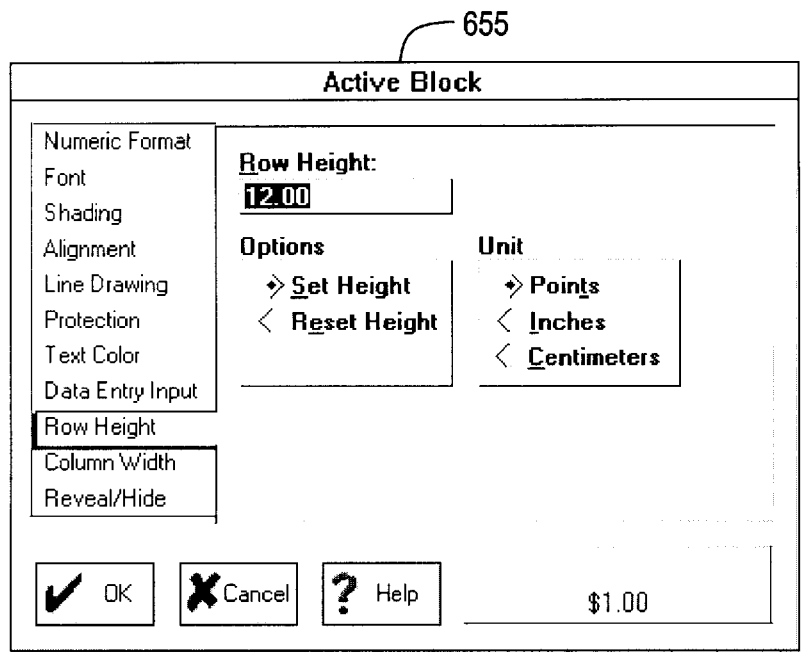
Figure 6J:
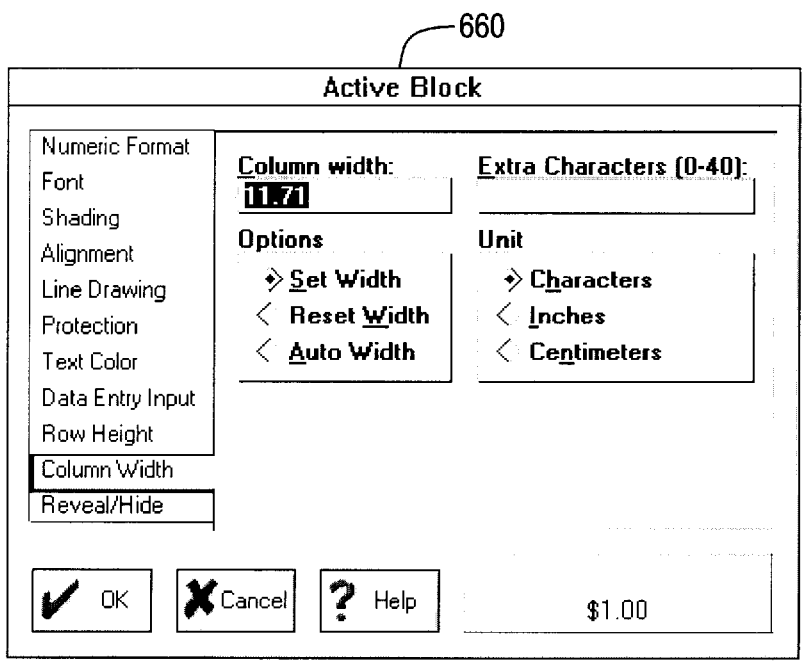
Figure 6K:
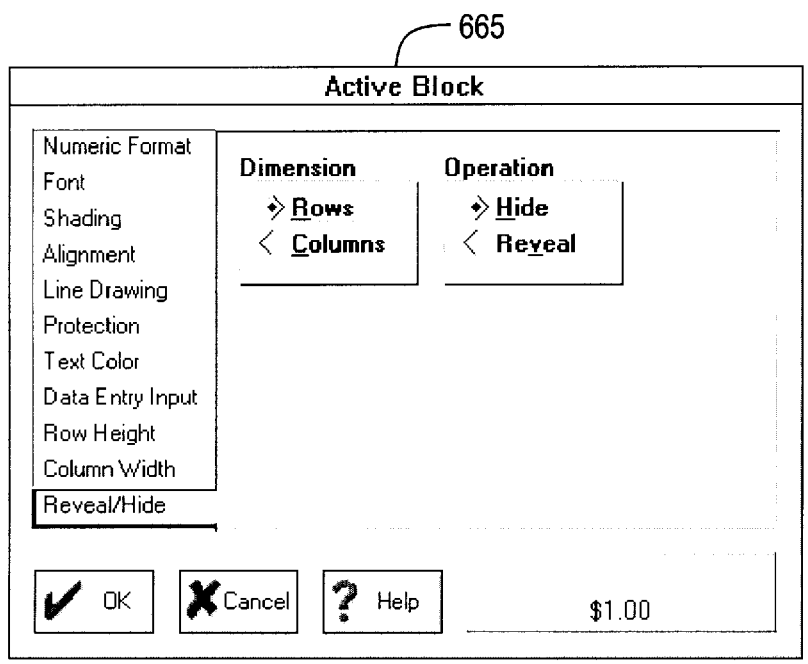
Figure 7A:
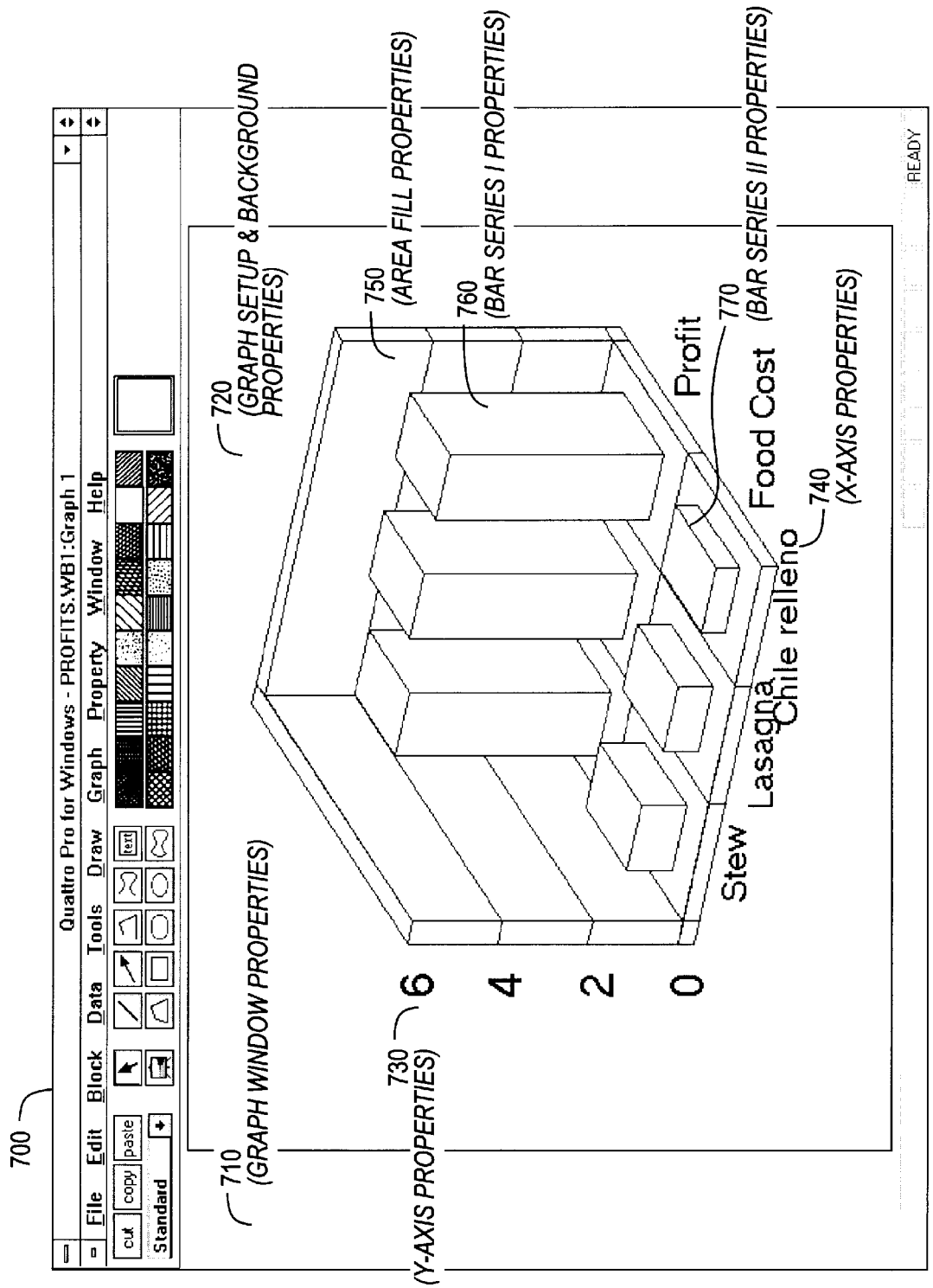
FIG. 7A is a screen bitmap illustrating a graph window of the present invention, with different graph objects available for property inspection.
Figure 7B:
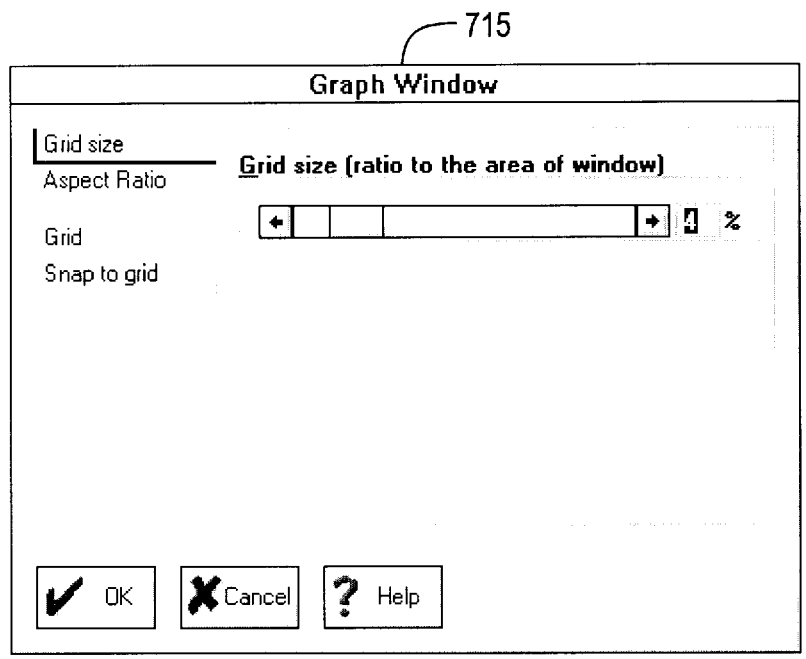
FIGS. 7B–H are bitmaps illustrating exemplary property inspectors of the present invention for the graph objects of FIG. 7A.
Figure 7C:
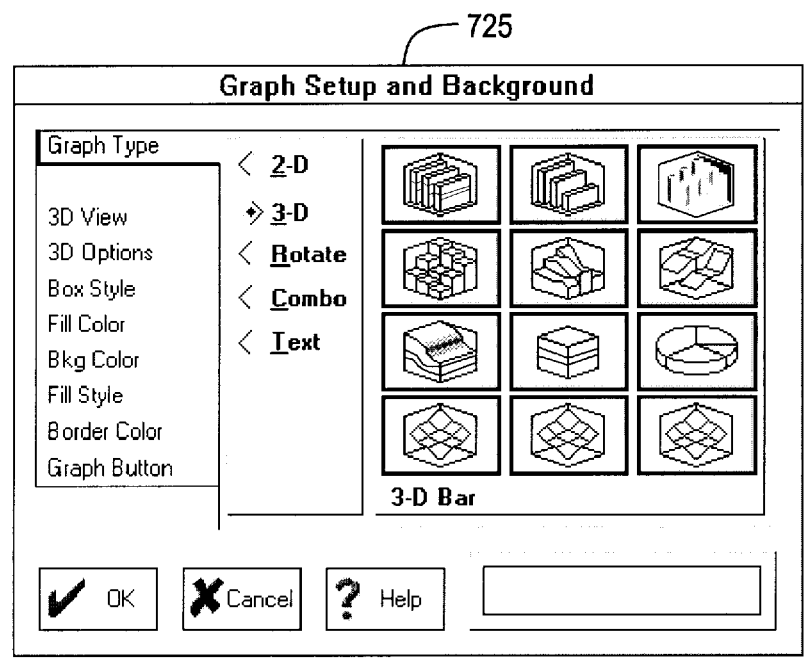
Figure 7D:
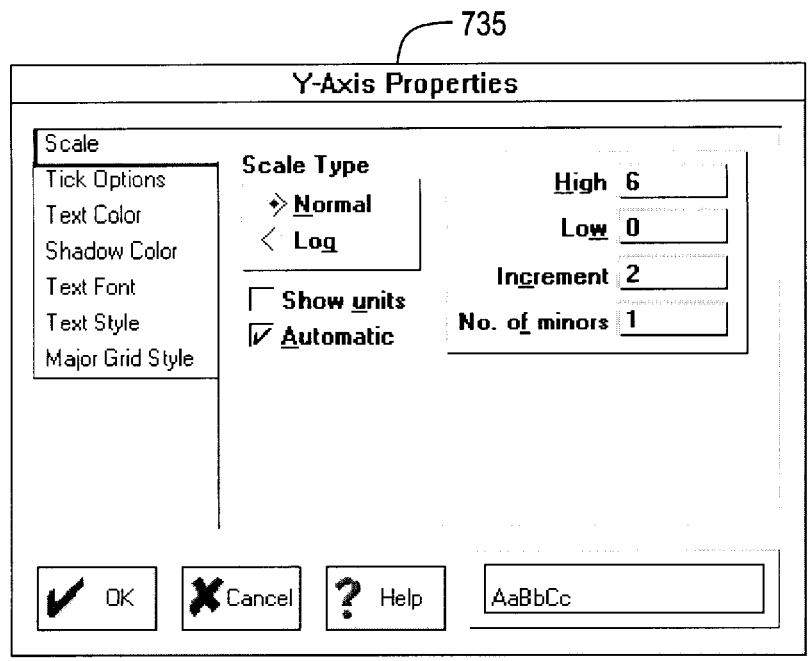
Figure 7E:
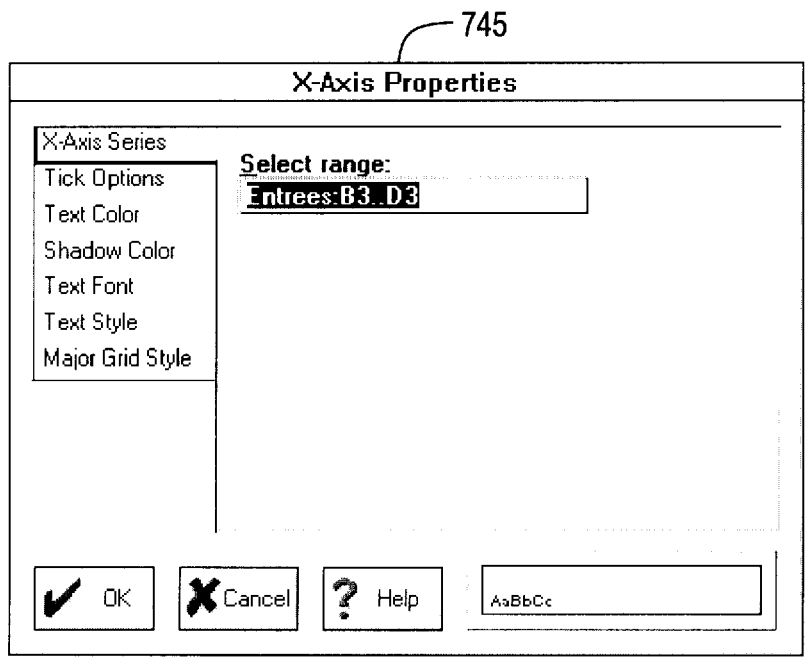
Figure 7F:
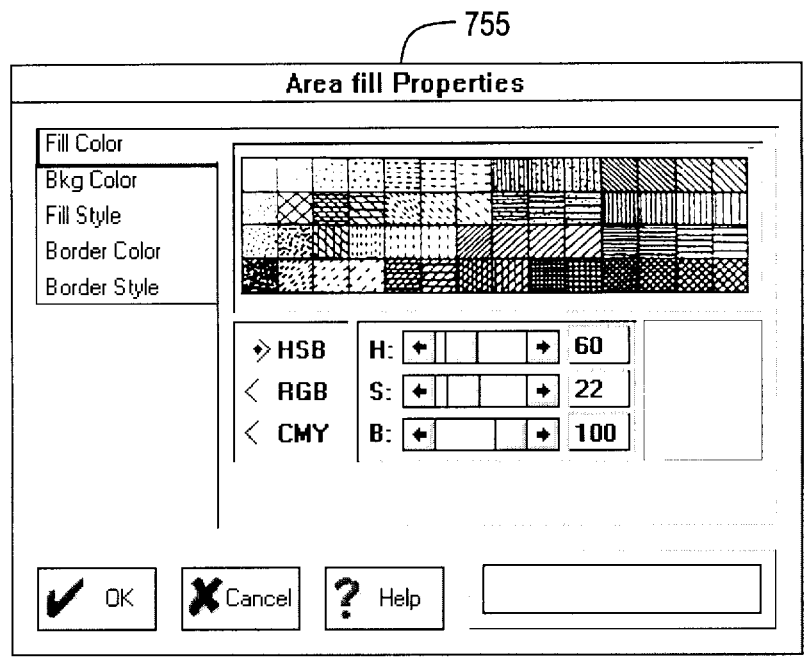
Figure 7G:
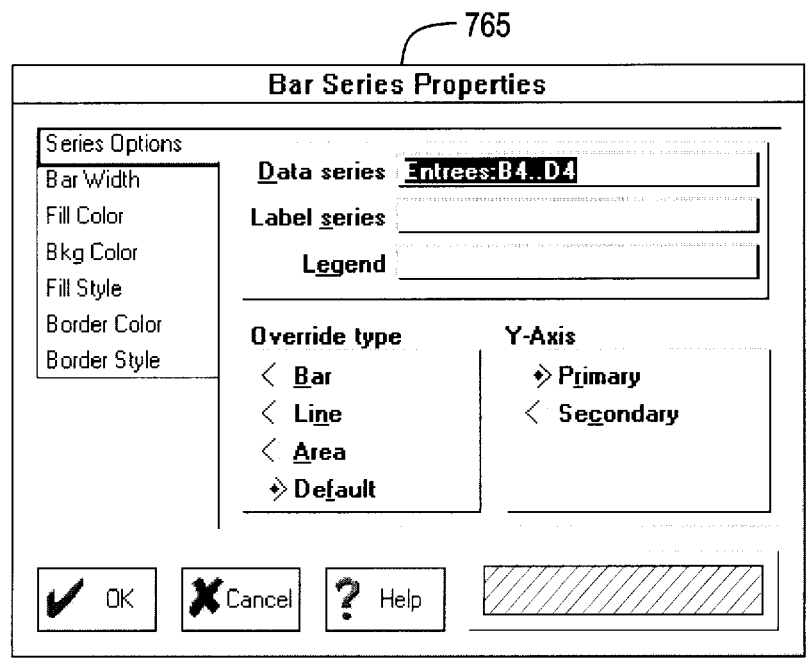
Figure 7H:
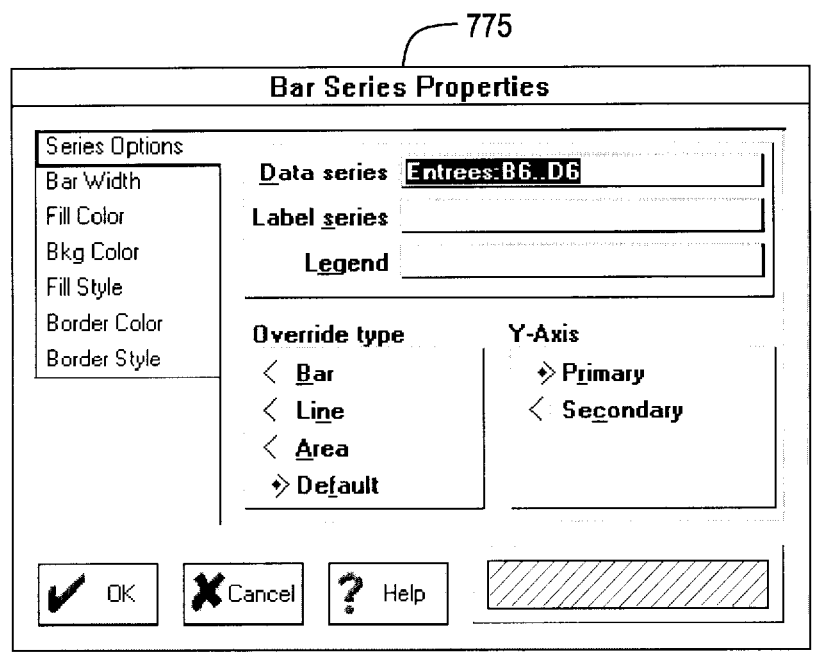

Each page object may also contain other objects, including cell, blocks of cells, graph objects, and the like, each of which may be inspected. By right clicking the active block 530, the active block property inspector 545 is opened as shown in FIG. 5E. With block properties, the user can change alignment of entries, numeric format of values, block protection, line drawing, shading, font, text color, types of data allowed in a cell, row height, column width, and whether columns or rows are revealed or hidden; inspection of a single cell occurs in a similar manner (i.e., active block is one cell). In this manner, the user may select block properties which affect the appearance of cell entries or of rows or columns; additionally, properties which affect the way data can be entered into blocks, such as protection and data entry input, may be made.

Upon invocation of property inspection, a dialog box or property inspector is displayed, preferably at or near the object of interest. A different property inspector appears depending on the type of object which is inspected. At this point, the user may then select the property that he or she wishes to change from a list of object properties. The contents of the right side of the inspector (i.e., a "pane" within the inspector) change to correspond to the property one chooses, as shown. Then, the user chooses settings for the current property. If desired, the user can then choose and set other properties for the current object. In a preferred embodiment, the property inspector includes an example box, which shows the display result of the property the user has just set, before they are applied to the actual object.

Referring now to FIGS. 6A–K, the construction and operation of a property inspector dialog box, in accordance with the present invention, is described. For purposes of illustration, the following description will present active block property inspector 600; other inspector dialogs may be implemented in a similar fashion. Shown in FIG. 6A, the active block property inspector 600 includes an object property list 601 and property settings pane 602. For an active block, for example, relevant properties include Numeric Format, Font, Shading, Alignment, Line Drawing, Protection, Text Color, Data Entry Input, Row Height, Column Width, and Reveal/Hide. Property settings pane 602 include the valid options or settings which a property may take. For the property of numeric format, for example, valid settings include fixed, scientific, currency, and the like. Property setting pane 602 may further include subproperties. For example, the currency setting 602a shown may also include a decimal place setting 602b. In this manner, property inspector dialog 600 presents a notebook dialog: property list 601 serves as notebook tabs (e.g., dialog tab 601a) and property settings panes 602 serves as different pages of the notebook dialog. Thus, the user may access numerous dialog options with the efficiency of a notebook.

Also shown, property inspector dialog 600 also includes an example window 605 and dialog controls 603. As new properties are selected and set, their net effect is shown. The example element in example window 605, for example, shows the effect of selecting a numeric format of currency with two decimal places. Thus, the user may experiment with changes before they are applied to the data object. After desired property changes are entered, control components 603 are invoked to either accept ("OK button") or reject ("CANCEL button") the new property settings; if desired, help may be requested.

As shown in FIGS. 6B–K, other properties of a cell block are accessed by selecting the desired property from the property list 601. Thus the active blocks property inspector 600 changes to inspector 620 for font properties, inspector 625 for shading properties, inspector 630 for alignment properties, inspector 635 for line drawing properties, inspector 640 for cell protection properties, inspector 645 for text color properties, inspector 650 for data entry input properties, inspector 655 for row height properties, inspector 660 for column width properties, and inspector 665 for reveal/hide properties. In each instance, a new pane (i.e., one having the attributes of interest) is displayed in the inspector window.

Referring now to FIGS. 7A–H, the inspection (and setting) of properties for graphs is illustrated. Graph window 700 includes a plurality of graph objects, each of which may be customized through use of a corresponding property inspector of the present invention. To display a corresponding property inspector, the user invokes the inspector (e.g., right-clicks) for the part (object) of the graph he or she wishes to change. A right-click on the graph window object 710, for example, will invoke the graph window inspector 715; at this point, the user may inspect and set various properties of the graph window object. In a similar manner, other objects of the graph window may be inspected. For example, inspection of graph background 720 invokes inspector 725, Y-axis object 730 invokes inspector 735, X-axis 740 invokes inspector 745, area fill object 750 invokes inspector 755, bar series object 760 invokes inspector 765, and bar series object 770 invokes inspector 775.

Internal Operations

A. Introduction

Internal operations of the system 100 will now be described in detail. In general, operation is driven by methods of the present invention, which are invoked by Windows' message dispatcher in response to system or user events. The general mechanism for dispatching messages in an event-based system, such as Windows, is known in the art; see, e.g., Petzold, C., *Programming Windows*, Second Edition, Microsoft Press, 1990. Additional information can be found in Microsoft's Window Software Development Kit, including: 1) *Guide to Programming,* 2) *Reference*, Vols. 1 and 2, and 3) *Tools*, all available from Microsoft Corp. of Redmond, Wash. Of particular interest to the present invention are class hierarchies and methods of the present invention, which are implemented in the C++ programming language; see e.g., Ellis, M. and Stroustrup, B., *The Annotated C++ Reference Manual*, Addison-Wesley, 1990. Additional information about object-oriented programming and C++ in particular can be found in Borland's C++ 3.0:1) User's Guide, 2) Programmer's Guide, and 3) Library Reference, all available from Borland International of Scotts Valley, Calif. The disclosures of each of the foregoing are hereby incorporated by reference.

B. Notebooks

Figure 8A:
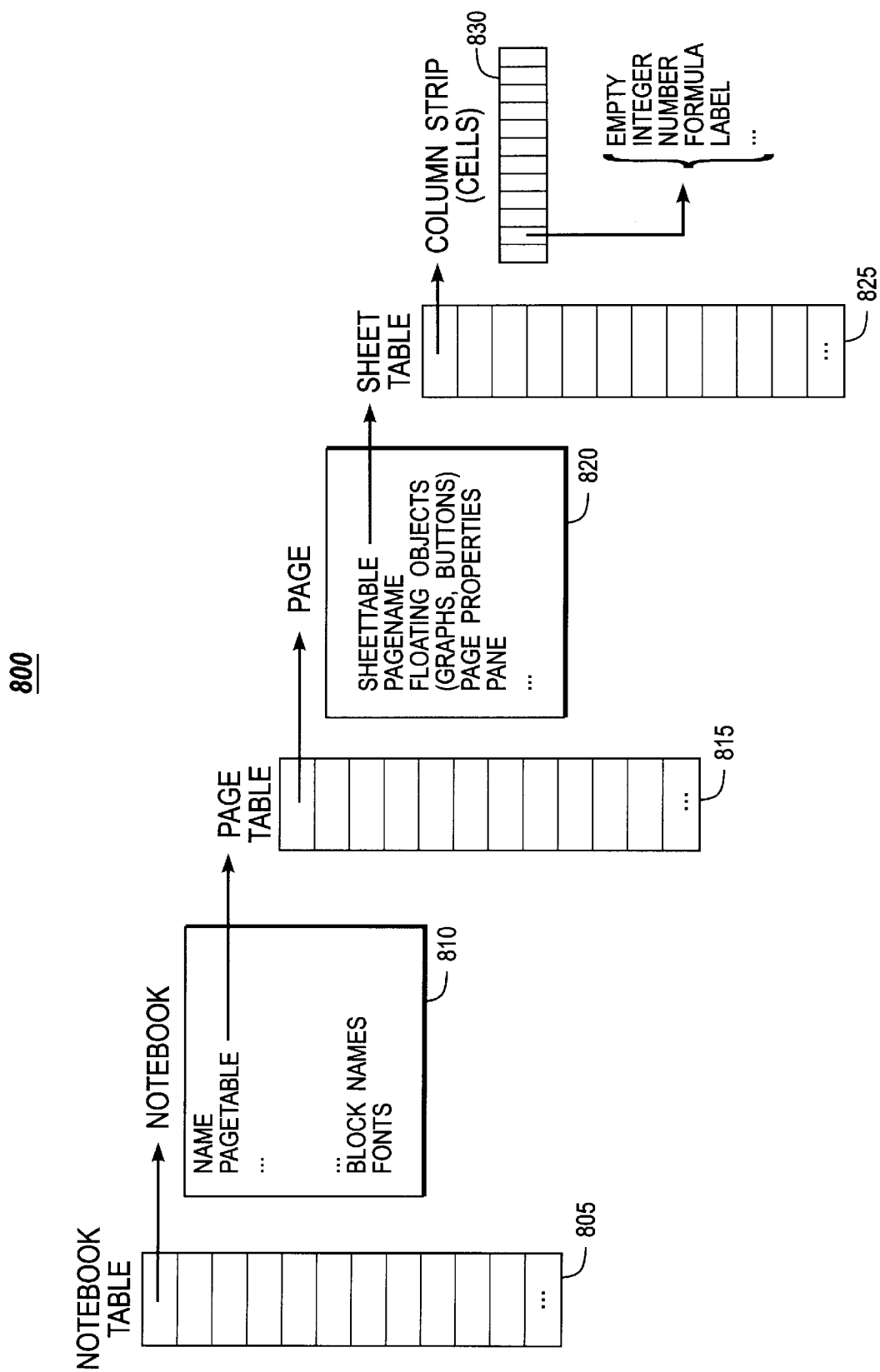
FIG. 8A is a block diagram illustrating the structure and operation of a spreadsheet notebook of the present invention.

Referring now to FIG. 8A, the internal structure and operation of spreadsheet notebooks of the present invention will be described. The spreadsheet notebook system of the present invention includes a system hierarchy 800, at the top level, having a notebook table 805 with entries or slots for accessing a plurality of notebooks. For example, the first slot addresses or points to notebook 810. In this manner, the system may track multiple notebooks.

Notebook structure 810, in turn, includes or accesses various data members for a particular notebook. For example, a "Name" field, stores the name assigned for the notebook. This name is displayed in the titlebar for the notebook and is used as the name for the corresponding disk file; the notebook name is also used to reference the notebook in formulas (e.g., contained in other notebooks). Notebook 810 also includes other data members, such as block names and fonts. Block names are text strings or labels which the user has defined for particular blocks of interest. Fonts, on the other hand, include font information (e.g., type and size) for the notebook. Other desired properties, specific to a notebook, may be included as desired. Additional description of the construction of a notebook structure (class) is set forth in commonly-owned application Ser. No. 07/866,658.

Of particular interest in the notebook structure 810 is the Pagetable field, which includes a pointer to a page table for the notebook. Pagetable 815 includes a plurality of slots or entries for accessing individual page structures of the notebook. Each page structure, in turn, contains or accesses information of interest to an individual page. As shown, for example, page 820 (pointed to by the first slot of the pagetable) includes or accesses: a sheet table (or Graphs page), a pagename, floating objects (e.g., graphs and buttons), page properties, pane, and the like.

The Sheettable field of the page 820 points to a sheet table 825. It, in turn, includes a plurality of the slots for accessing different column strips. As shown, for example, the first entry in the sheet table 825 accesses a column strip of cells 830. In turn, column strip 830 addresses individual information cells, each of which may have one of a variety of information types, including empty, integer, number (real), formula, label, and the like. In a preferred embodiment, column strip 830 may address up to 8,000 cells; those skilled in the art, however, will appreciate that column strip 830 may be set to any desired range (depending on the limits of one's target hardware).

Figures 8B, 8C:
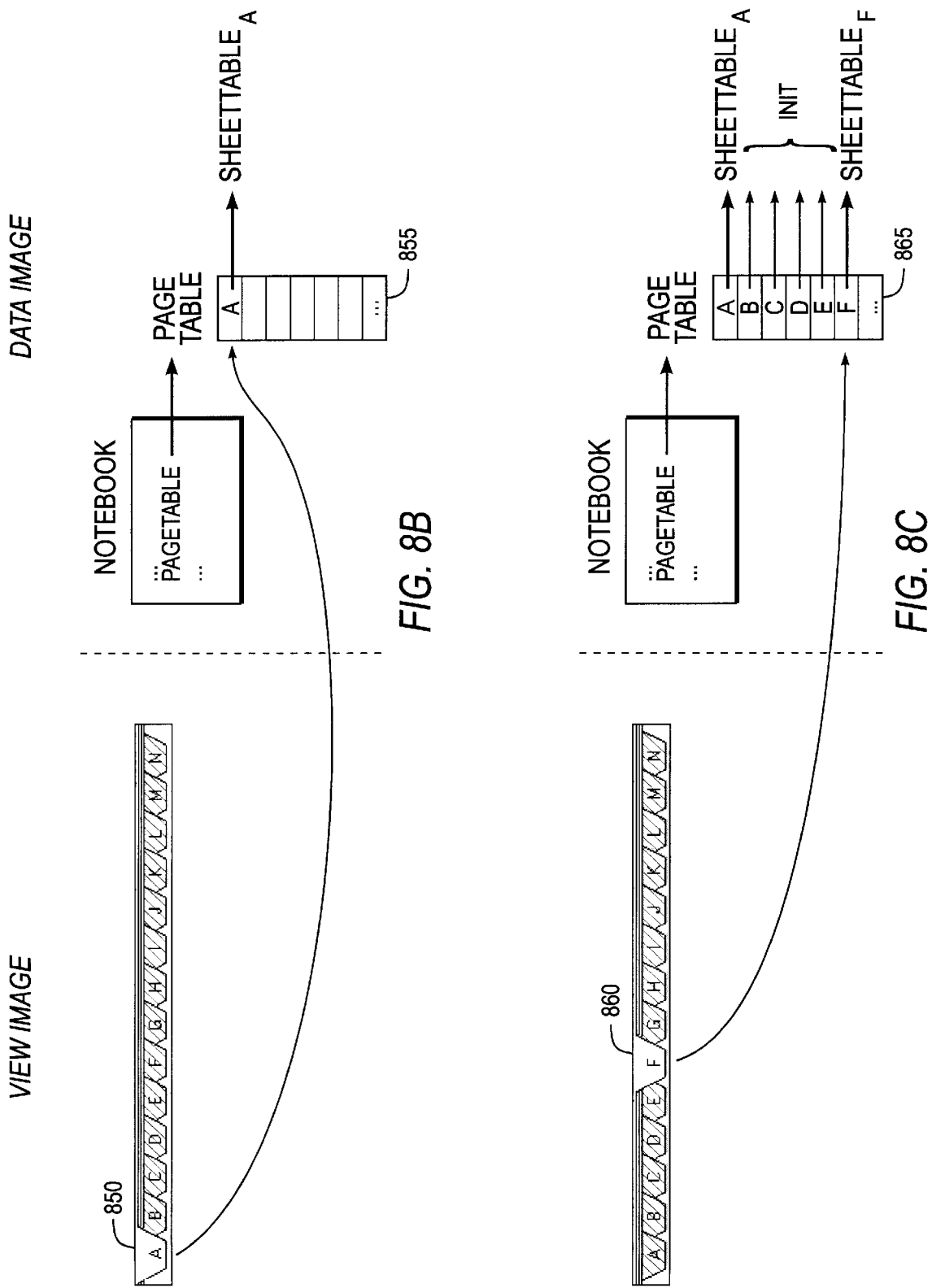
FIGS. 8B–C illustrate the correspondence between a page table data structure and pages which are displayed on the screen to the user.

Referring now to FIGS. 8B–C, the function of the page table of the present invention is illustrated. In FIG. 8B, two images are presented: a view image and a data image. The view image illustrates what the user sees on the screen 106; at startup, for example, only a single Page A (page 850) is active. As shown by the corresponding data image supporting this view image, pagetable 855 includes only a single reference, page A. In turn, page A references sheettable$_A$, which supports the information cells required (e.g., they are currently needed for display) for the page. Thus, at startup, only a single page entry exists in the pagetable 855, even though the screen displays multiple page tabs.

Upon selection of Page F (e.g., by clicking tab F 860), the data image changes, however. As shown in FIG. 8C, remaining Pages B–F are initialized into the page table 865. In this example, Page F must now exist as a view object. Thus, Page F references supporting data structures (e.g., sheettable$_F$). The intervening Pages (B–E), on the other hand, are initialized, but only to the extent that they can serve as place holders in the pagetable 865. In this manner, the underlying page table for a notebook instantiates underlying page data structures only as needed (e.g., for viewing or referencing by other pages), but, at the same time, provides on-demand access to pages.

A particular advantage of this design is the ease in which information may be referenced and presented. Even complex data models, such as those spanning multiple dimensions, may be represented in a clear fashion. Moreover, a syntax is provided by the present invention for intuitively referencing information.

Referring now to FIGS. 8D–F, the referencing of information in a spreadsheet notebook of the present invention is now described. Shown in FIG. 8D, a three-dimensional reference (i.e., identifier for a solid block of information cells) includes a notebook, starting page, ending page, starting cell and ending cell. As shown, the notebook (which is the same as the file name) is identified preferably by delimiters, such as brackets ([]). This is followed by page name(s), which may in fact be grouped. As shown, a range of pages has been defined from '89 Income to '92 Income; these are alias names which may correspond to pages A–D, for example.

Next, one or more cells of interest are identified. For example, a range from January to ( . . . ) December is shown, which serve as aliases for blocks A1 to A12, for example. The block or cell information is separated from group or page information, for example, by a colon (:) identifier.

The hierarchy of this nomenclature is shown in FIG. 8E. Specifically, a notebook references pages, which may be members of one or more user-defined groups. In turn, a page references cells, which may alternatively be referenced by alias identifiers. As shown in FIG. 8F, page and cell identifiers may be grouped to form even more succinct references. For example, Pages '89 Income to '92 Income may be renamed as Four-Year Income. Similarly, the cell range from January to December may be renamed Entire Year. In this manner, information ranges in the spreadsheet notebook of the present invention are easily named and easily visualized by the user.

Depending on the context of the system, certain identifiers may be assumed and, thus, eliminated from a reference. Unless otherwise specified, for example, the notebook identifier is assumed to be the currently active notebook. Similarly, the page identifier may be assumed to be the currently active page, unless the user specifies otherwise. Thus, a valid reference need only include as much information (identifiers) as is necessary to access the desired information.

Figure 9A:
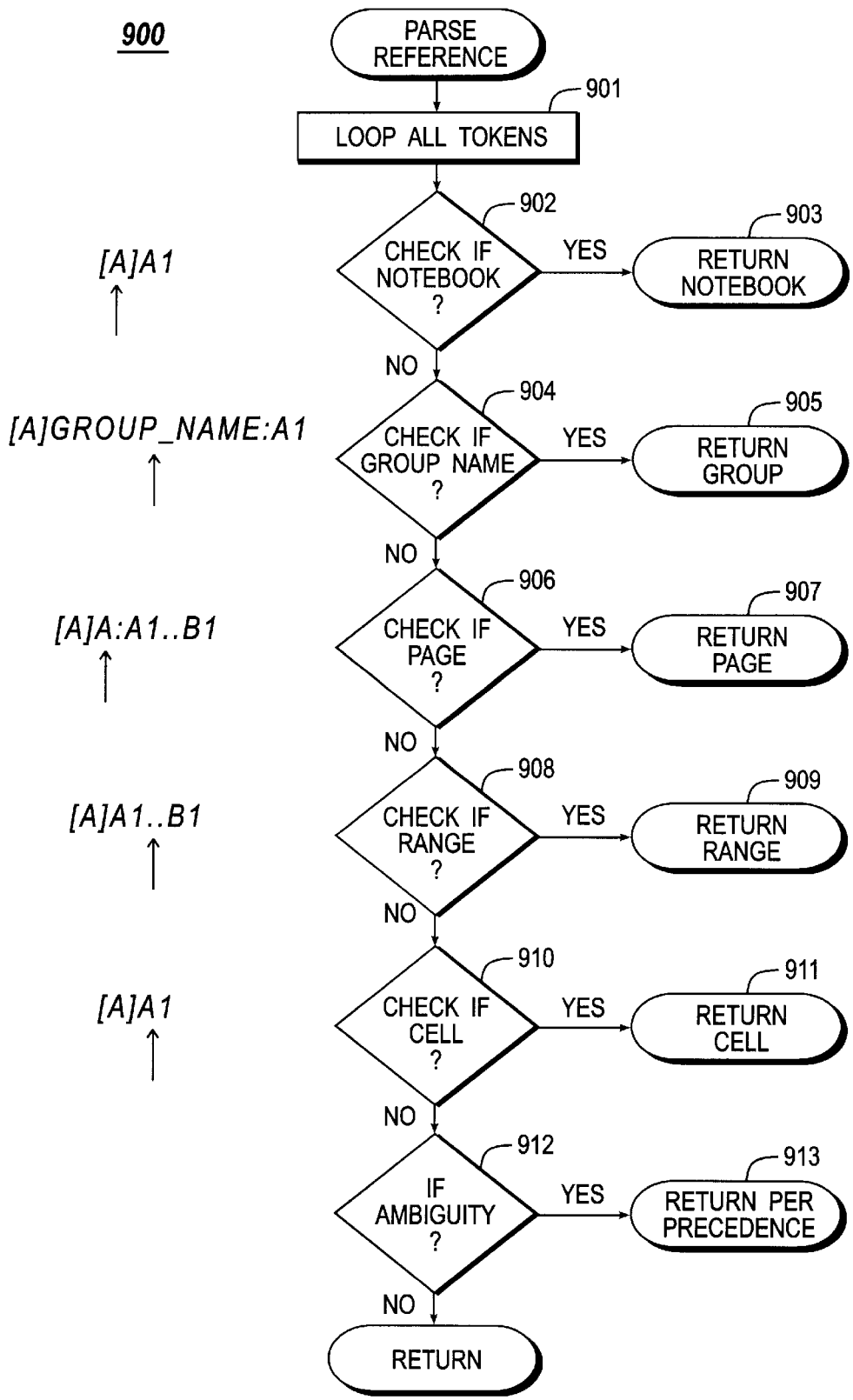
FIG. 9A is a flowchart illustrating a method of the present invention for interpreting information references.

Referring now to FIG. 9A, a method for interpreting or parsing an information reference, in accordance with the present invention, is shown. Upon receiving a reference (e.g., text string) to information in a spreadsheet notebook, the method proceeds as follows. In step 901, a loop is established to tokenize (i.e., parse) the string into individual identifiers, which may then be processed. Each token is examined as follows. In step 902, the token is checked to determine whether it is a notebook identifier. In a preferred method, a notebook identifier is delimited, for example, by bracket symbols; alternatively, a notebook identifier may be realized simply by the position of the identifier relative to other tokens in the string, or by its relationship to disk (notebook) files on mass storage 107. If the notebook is successfully identified, the notebook identifier is returned at step 903, and the method loops back to step 901 for any additional tokens.

If it is not a notebook (no at step 902), however, then in step 904 the token is examined to determine whether it is a group name. Group names may be determined by accessing group names listed for the notebook (e.g., by accessing a group name string pointer from notebook structure 810), and/or by the token's context (e.g., preceding a ":" delimiter). If a group name is identified, it is returned at step 905, and the method loops for any remaining tokens. Otherwise (no at step 904), the token is examined to determine whether it is a page. In a manner similar to that for checking group names, a page may be identified by examining a notebook's page table, with corresponding page name accessed (dereferenced). The page is returned at step 907, with the method looping back to step 901 for remaining tokens.

If a page is not found (no at step 906), however, then at step 908 the token is examined to determine whether it defines a range. A range may include a named block of cells (e.g., "entire year") or, simply, two cell addresses separated by an appropriate identifier (e.g., A1 . . . B1). If a range is found, then it is returned in step 909, with the method looping for any remaining tokens. Otherwise (no at step 908), the identifier is examined to determine whether it is a cell. A token may be identified as a cell if it is of the appropriate column/row format (e.g., A1). If a cell is found, it is returned at step 911, with the method looping for any remaining tokens.

As shown (conceptually) at step 912, if any ambiguities remain, they may be resolved according to an order of precedence; for example, notebook >groupname> page and the like. At the conclusion of the method, a reference, if it is in proper form, will be successfully identified and may now be processed according to three-dimensional techniques.

Figure 9B:
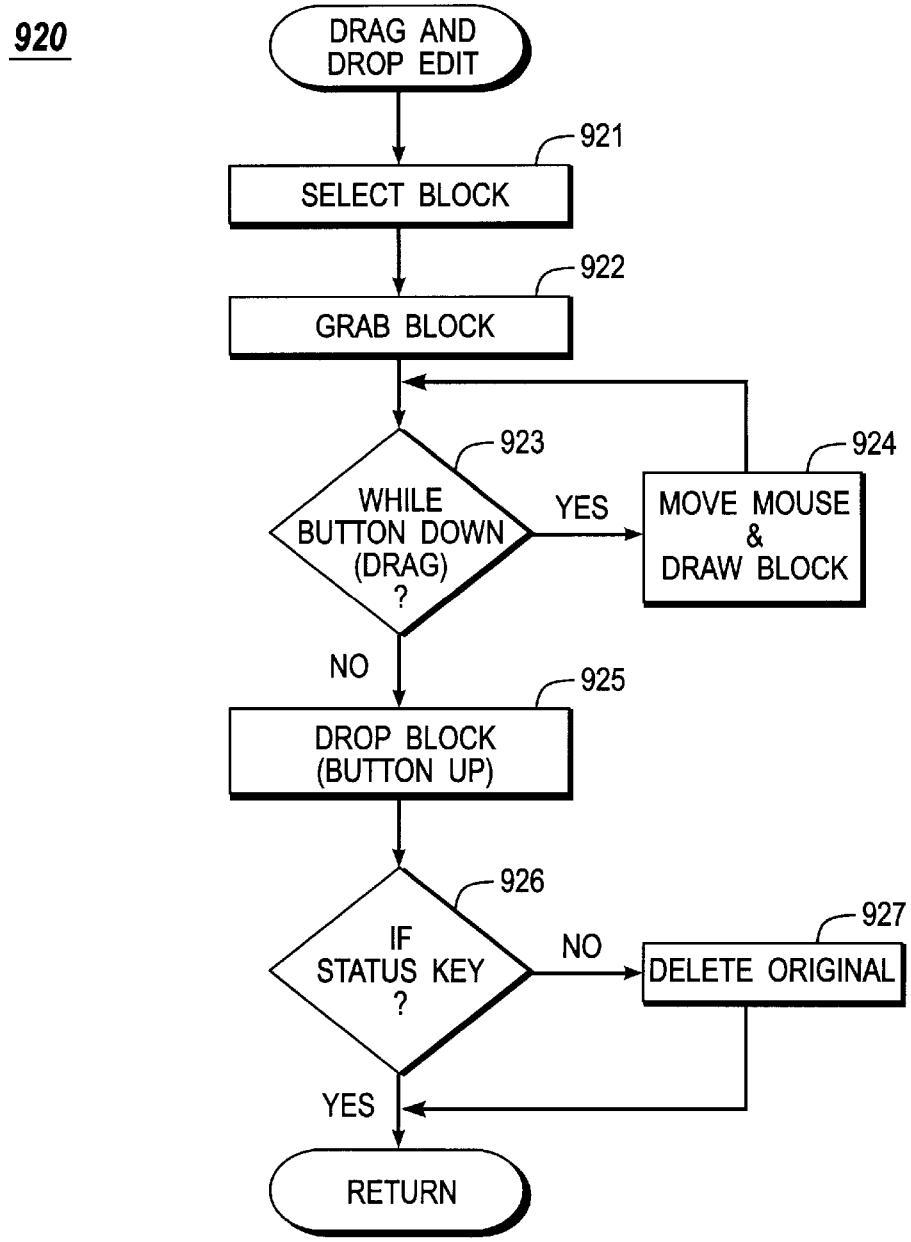
FIG. 9B is a flowchart illustrating a method of the present invention for drag and drop editing.
Figure 9C:
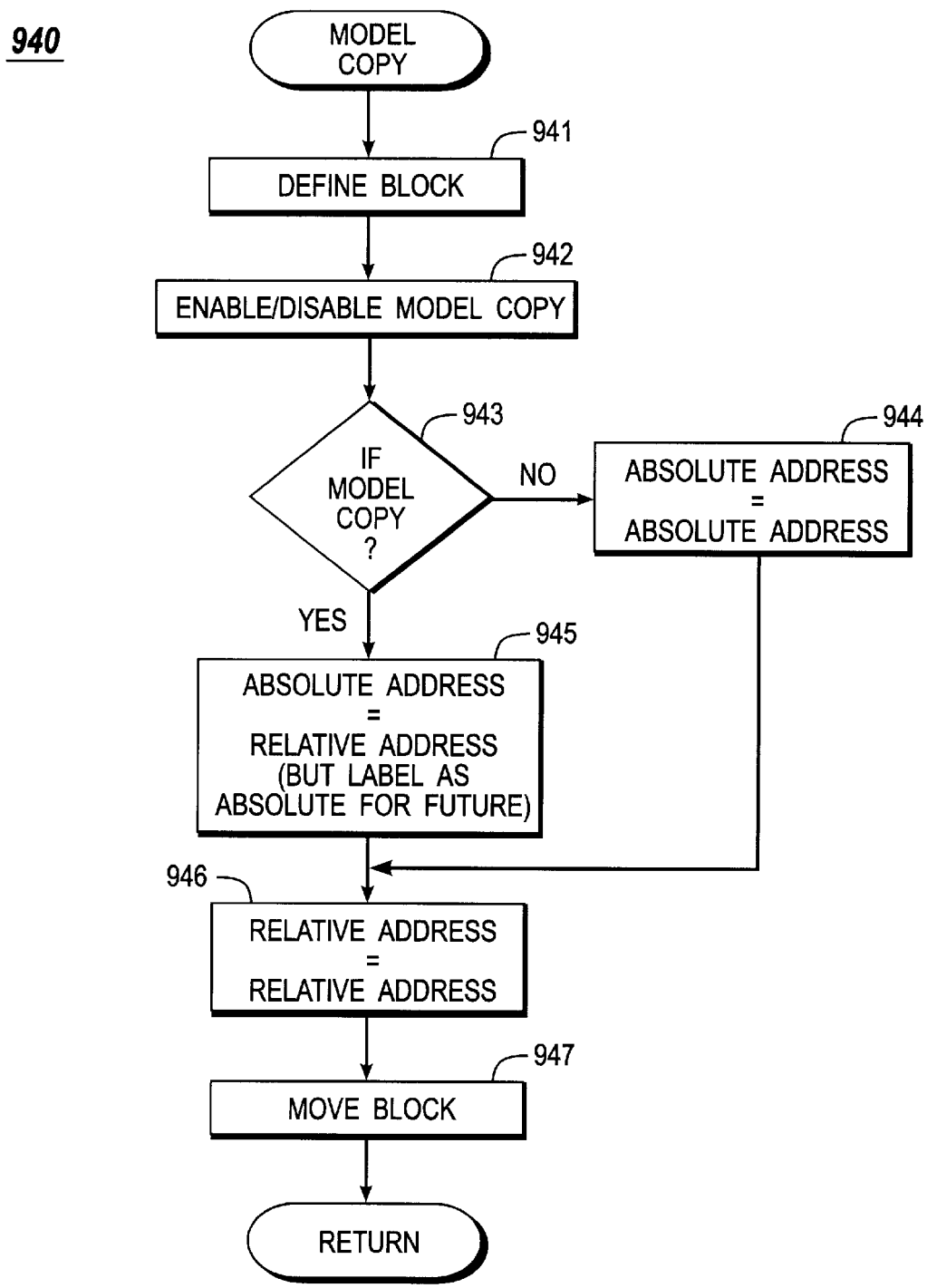
FIG. 9C is a flowchart illustrating a method of the present invention for model copying.

Referring now to FIGS. 9B–C, other methods of the present invention are illustrated. In FIG. 9B, for example, a drag-and-drop edit method 920 of the present invention is shown. Its steps are as follows. In step 901, a block of cells is defined (e.g., by dragging a mouse cursor from one corner of the block to another). After a block has been selected, it is next grabbed with the mouse cursor (i.e., position the mouse cursor within the block and depress a mouse button). In steps 923 and 924, a loop is established to "drag" the block to a new location. In particular, while the mouse button is depressed, any movement of the mouse will cause the block to follow (animated on screen, e.g., by XOR technique). At step 925, the block is "dropped" into place by releasing the mouse button (button up signal). Dropping the block causes information from the source location to be copied into the target location. By coupling the method with a status key (e.g., SHIFT- or CTRL-), the technique supports either "cut" (erase original) or "copy" (leave original) modes of operation. Thus, for example, if a status key is not active as step 926, then in step 927 the original (at the source location) is deleted. Otherwise (yes at step 926), the original remains at the source location as well.

Referring now to FIG. 9C, a model copy method 940 of the present invention is illustrated. In step 941, a block is defined or selected (e.g., dragging a selection). In step 942, model copy is enabled or disabled (as desired); alternatively, model copy may be enabled by default. In step 943 if model copy has been enabled, then in step 945 absolute address references are copied as if they were relative address references, as previously described (with reference to FIGS. 4H–J). However, the address labels will remain absolute, so that they will be treated as absolute for future copying operations. Otherwise (no at step 943), absolute addresses are treated conventionally (i.e., referencing absolute addresses) in step 944. As shown in step 946, relative addresses are not affected, i.e., they continue to be treated relatively. In step 947, the copy operation is performed, employing the addresses as just determined, after which the method concludes.

C. Property Inspection

Figure 10A:
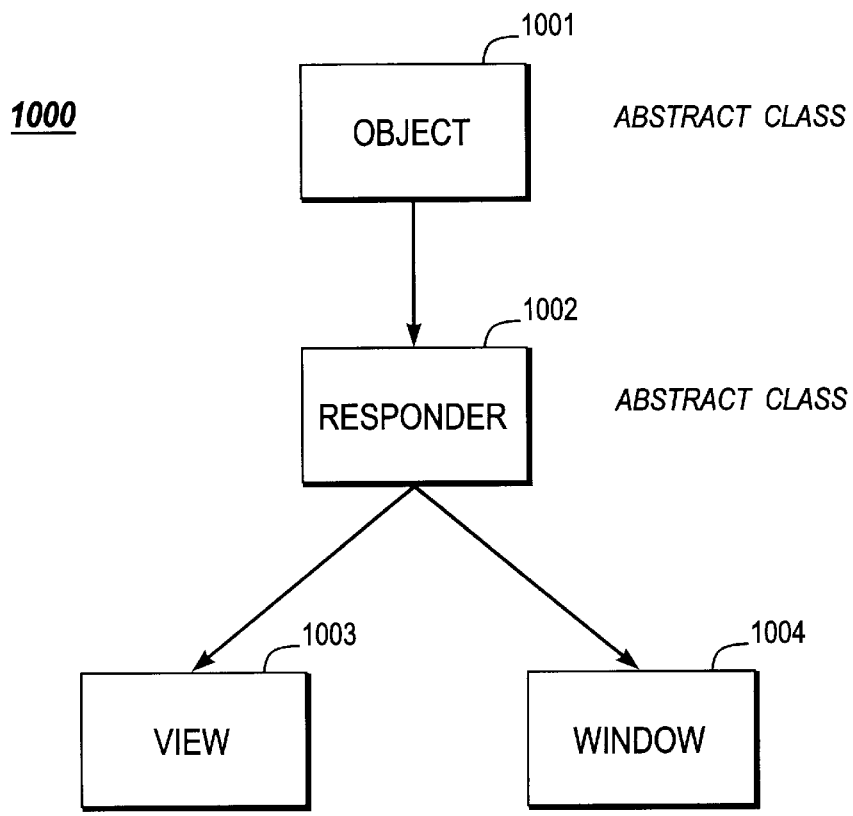
FIG. 10A is a block diagram illustrating a system class hierarchy of the present invention, which is employed for property inspection.
Figure 10B:
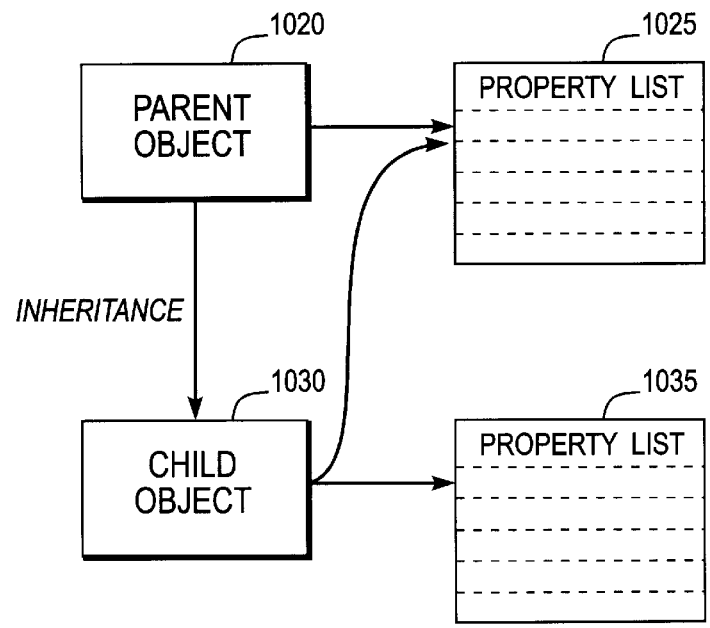
FIG. 10B is a block diagram illustrating the correspondence between a parent object and a child object, and their respective property lists.
Figure 10C:
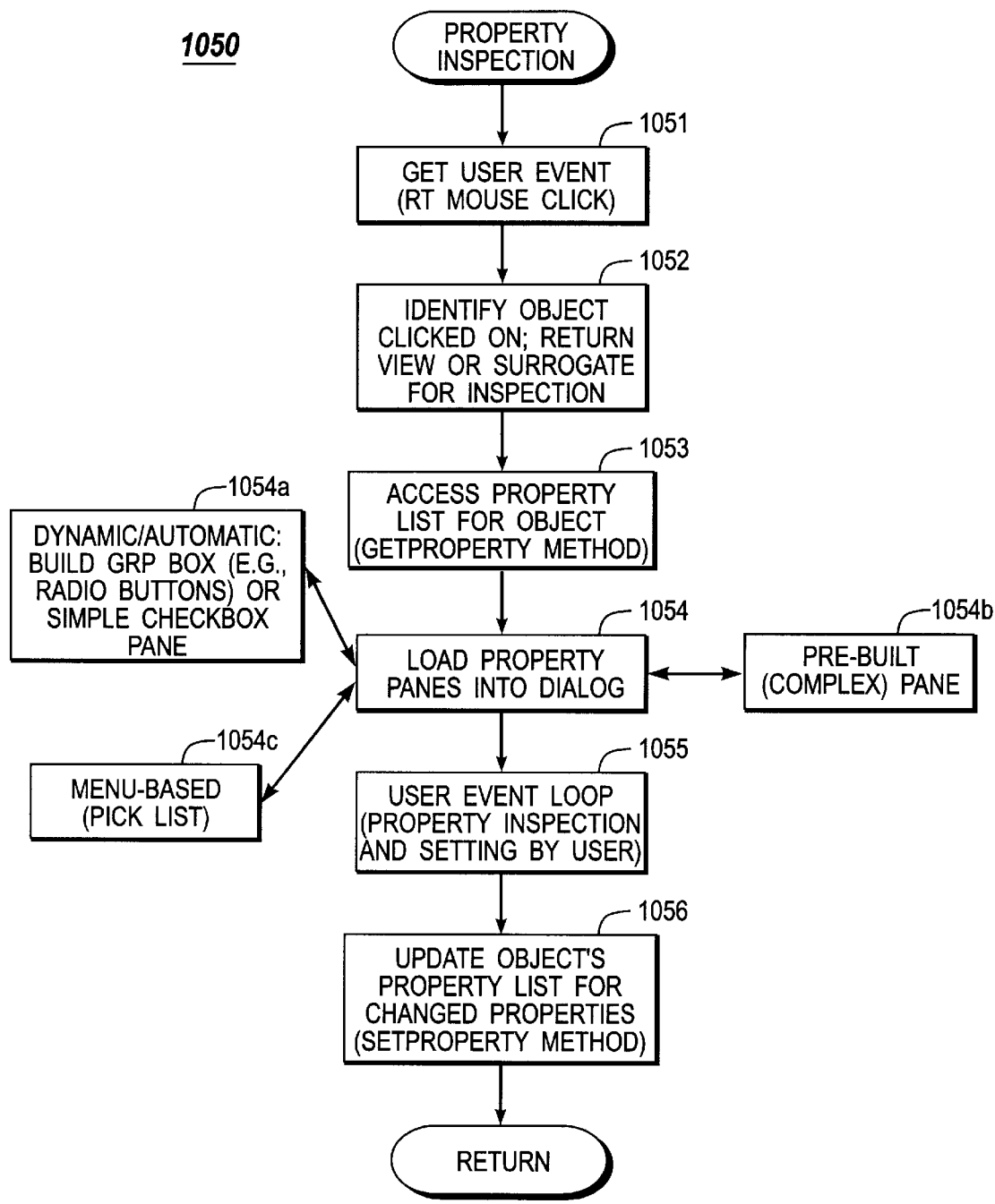
FIG. 10C is a flowchart illustrating a method for inspecting and setting properties of objects, in accordance with the present invention.

Referring now to FIGS. 10A–C, construction and operation of property inspection in accordance with the principles of the present invention will be described. As shown in FIG. 10A, user interface (UI) objects are constructed from a UI object class hierarchy 1000. As shown, class hierarchy 1000 includes as its base class an object class 1001. From object class 1001, a responder class 1002 is derived. As the child of class 1001, responder class 1002 inherits all properties of its parent and adds event handling capability. Both object class 1001 and responder class 1002 are abstract classes, i.e., objects are not instantiated from them directly. From responder class 1002, two child classes are derived: view class 1003 and window class 1004. From view class 1003, all screen objects (e.g., text, graphs, scrollbars, and the like) are created. From window class 1004, container objects are instantiated; in particular, window class 1004 provides container objects which hold the various view objects.

Associated with each class (and thus objects derived from each class) is a ClassInfo structure. ClassInfo, which is itself implemented as a separate class, contains information about a corresponding class and, thus, objects of that class. For example, it contains information about object type, name, number of properties, and the like. Of particular relevance to property inspection are two data members: a pointer to the parent and a property record pointer which points to an array of property records for an object of interest.

Referring now to FIG. 10B, the relationship between parent and child (and hence the importance of the pointer to the parent) is illustrated. In the system of the present invention, an object-oriented mechanism is employed whereby new objects may be created from existing objects (classes). As shown, for example, a child object 1030 may be derived from a parent object 1020. Also shown, each object has its own property record array or list. For example, the parent object 1020 has a property list 1025 describing its properties. Child object 1030, in turn, also has its own property list 1035; child object 1030 still inherits from parent object 1020, however. By means of the parent pointer, the child object 1030 also has direct access to its parent 1020 and, thus, the property list 1025 of the parent. In this manner, when an object is inspected, the system of the present invention may view back across the inheritance hierarchy to fetch all (ancestor) properties for the object, as needed.

The property record, on the other hand, describes an individual property for the object. The property record, which is implemented as a separate class, includes a name ID for the property and a pointer to the property object itself (which may be shared). For example, property record objects may be instantiated from the following exemplary C++ class definition:

```
class_EXPORT_PropRecord
{
public:
    Property * pProp;      // pointer to SHARED (!) property object
    WORD    nameID;        // property name string ID
                           // (PROPSTR.HPP, PROPSTR.CPP)
    WORD    flags;         // optional information about the property
                           // ( HIDDEN, USE MENU, LINK ONLY, etc.)
    inline Property * getProp ( );
    inline LPSTR getName ( );
    inline PROPTYPE getType ( );
    inline WORD getNamesCnt ( );
    inline WORD getNameID ( );
    inline WORD getFlags ( );
};
```

The property object, in turn, includes a type ID for identifying the property and also includes a pointer to a dialog for the property. An property object may be instantiated from the following exemplary C++ class:

```
class_EXPORT_    Property
{
public:
    static DWORD dwPropErr;
    static char far conversionBuffer [MAXPROPSTR];
    PROPTYPE typeID;
    WORD namesCnt;
    LPSTR pDialog;
    Property ( WORD id );
    virtual BOOL stringToValue ( LPSTR, PROPTYPE pt = 0 );
    virtual BOOL valueToString ( LPSTR, PROPTYPE pt = 0 );
/*
Convert the passed binary value to string using the conversionBuffer
*/
    LPSTR convertToString ( LPSTR pS, PROPTYPE pt );
/*
Convert the string in conversionBuffer to binary value pointed by pS
*/
    BOOL convertToBinary ( LPSTR pS, PROPTYPE pt );
```

-continued

```
};
Exemplary property types may include:
    prop__Undefined = 0,
    prop__Text,
    prop__Bool,
    prop__Window,
    prop__Color,
    prop__Bitmap,
    prop__List,
    prop__Word,
    prop__Int,
    prop__Key,
    prop__Double,
    . . .
```

The pointer to the property dialog (LPSTR pDialog), on the other hand, indicates the appropriate dialog to be displayed to the user for the current property; the dialog displays the appropriate information (e.g., pane) for the property which the user may then use for inspecting and setting attributes of that property.

Referring now to FIG. 10C, a method 1050 for property inspection, in accordance with the present invention, is illustrated; additional disclosure is provided for the inspection of an exemplary object: a spreadsheet cell. In step 1051, the user indicates that he or she desires property inspection for an object. In a preferred method of the invention, the user will right-mouse click on the object of interest (as set forth hereinabove). To inspect a spreadsheet cell, for example, the user would position the mouse cursor over the cell and click the right mouse button. In this instance, the notebook which contains that cell will receive (i.e., will be the recipient of) a right-mouse button down message. The event will be processed by routing the message to a RightMouseDown method.

In step 1052, the object which the user clicked on is identified by the RightMouseDown method. Specifically, the method invokes a RouteMouseEvent method which returns the current view object (i.e., the object which the user has clicked on). This is accomplished as follows. Every view object contains a StartInspect method which returns an actual object for inspection. The object which appears on the screen to the user (i.e., view object) is not necessarily the object which will be inspected. For example, it would be computationally too expensive to have each cell of a spreadsheet be its own object. Instead, the present invention embraces the notion of surrogate or imaginary objects which may be inspected (using the properties of the screen or view object selected). In most instances, the StartInspect method will return an object for inspection which is the same as the view object. In those instances where it is not feasible to inspect an object which the user perceives on a screen, however, the method returns a surrogate object whose properties assume the attributes of the screen object.

An additional example illustrates this point. When inspecting a block of cells, for example, StartInspect returns a current block object which is a surrogate object, i.e., it does not have a visible expression on the screen. Instead, it is a substitute object which assumes the characteristics necessary to allow inspection of the screen object of interest. In this manner, it functions as a surrogate for the object which the user observes on the screen. If desired, objects may also be blocked from inspection at this step (e.g., by setting flags); in which case, the method terminates. At the conclusion of step 1052, the object of interest, either actual or surrogate, is ready for inspection.

Next, the user interface for inspection is built by a DoUI method of the present invention. The method proceeds as follows. The first property record for the object is accessed in step 1053. Preferably, DoUI is a virtually defined method, with each object (class) designed to include method steps for accessing the property record according to that object's own particularities. The remaining property records for the object are also located (e.g., by traversing a list of records).

At step 1054, the dialog panes for each property are loaded (e.g., into memory 102, if not already present) for use by a compound dialog box. As previously described, the dialog associated with each property is accessible from the property record (by a pointer to the dialog). At this point, an empty property inspection window is displayed. Into the property inspection window, a corresponding pane for each property is loaded (substep 1054b), thus creating a display hierarchy. Using a getproperty method, each property is initially set to the attribute(s) contained in the retrieved property record; the getProperty method operates essentially the reverse of a setproperty method, which is described in detail hereinbelow. An associated screen button or label is provided for rapidly accessing a desired pane in the inspector window, in much the same fashion as one accesses pages in a notebook with tabs. In this manner, a property inspector is built from a dynamic list of properties (as opposed to a static list of properties which is determined beforehand), each of which may be rapidly accessed by the user.

While the property list loaded into an inspector window for each object is dynamically constructed, the panes supporting each property may be pre-built. For example, the pane supporting a color palette, since it is complex in design, will be built in advance.

However, the method of the present invention may dynamically build individual panes as well. Candidates for dynamic pane building include simple properties, especially those which may have only a Boolean or yes/no value. Referring back to FIG. 7B, for example, inspector 715 includes a snap-to-grid property. Instead of loading a pre-constructed pane for this property, the method of the present invention dynamically constructs an appropriate pane (in this case, a simple check box), as shown in substep 1054a. An automatic list, on the other hand, is typically a simple group box (i.e., one having a plurality of radio buttons), which is preferably constructed dynamically, as shown by the inspector window 650 of FIG. 6H. In either case, the method may build appropriate inspector dialog components on-the-fly by simply examining a particular property and discerning its possible attributes. In a similar manner, "pick" lists of properties may be constructed and displayed, as shown in substep 1054c. A property pick list serves as an index to other property lists or other functions, as desired. By dynamically building inspectors for simpler properties, the method conserves system resources.

Construction of the inspector window is completed by inserting dialog controls (e.g., "OK", "CANCEL", and "HELP") for operating the dialog. In addition, an example window is displayed for indicating various changes to the properties of an object. This is accomplished by sending a message to the inspected object setting forth the current properties in the dialog; the inspected object returns an example or sample object which may then be displayed in the window. After changing a property, the dialog tab or button (e.g., tab 601a of FIG. 6A) corresponding to that property is updated (e.g., different font or screen color) for indicating that a change has been entered.

After constructing the property inspector dialog or window, at step 1055 the method enters a user event loop where the user inspects and sets various properties of the object by accessing the property (through the screen button or tab) and setting a new attribute. At the conclusion of the user event (e.g., by selecting "OK" or "CANCEL"), the user event is terminated.

At step 1056, the property list for the object being inspected is updated for any changes which occurred to the properties during the user event (of step 1055). This is accomplished by calling a setProperty method, which conceptually loops through each pane which has changed and updates the property list, accordingly. By way of illustration, the setProperty method may be defined as:

virtual BOOL setProperty(LPSTR lpPropStr, LPSTR
        lpValueStr, PROPTYPE pt=0);

The method receives the name of a property, either passed as a text string (lpPropStr) or as a handle (pt), and a value for that property, typically passed as a text string (lpValueStr).

Figure 10D:
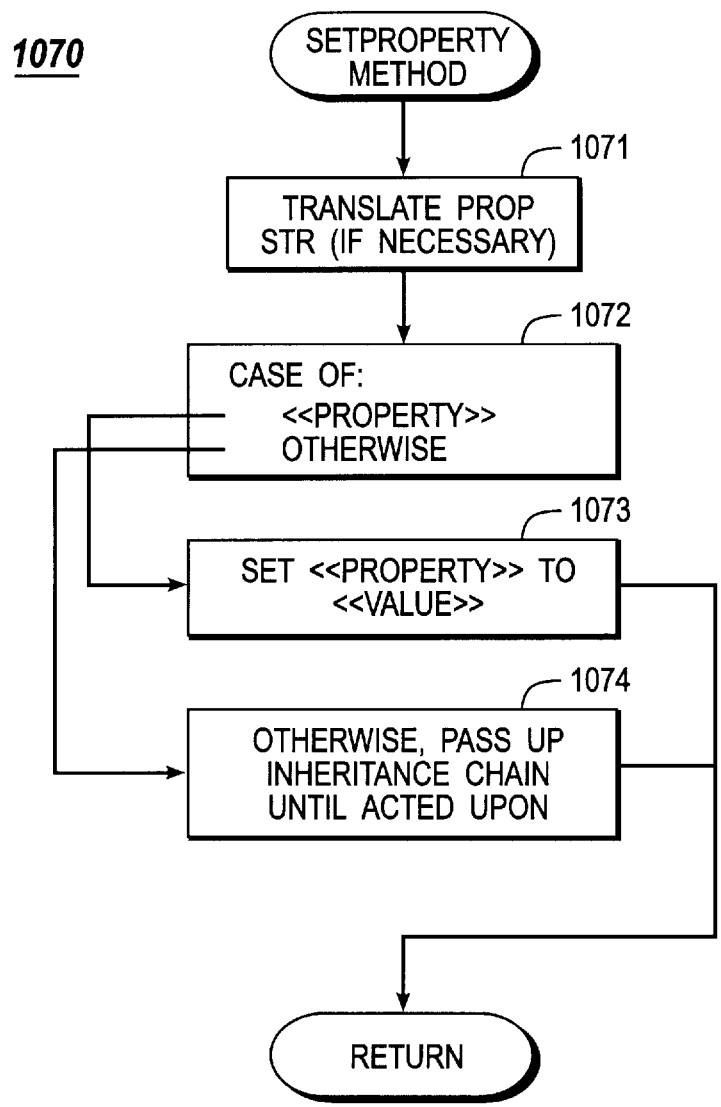
FIG. 10D is a flowchart illustrating a set property method of the present invention (substep from the method of FIG. 10C).

Referring now to FIG. 10D, the general steps of a setproperty method 1070 are illustrated. In step 1071, the property text string is translated; alternatively, the property is referenced directly by passing a handle (i.e., integer or word value). At steps 1072–1073, the property is updated for the property value passed (e.g., by a CASE statement construct). If the property is not acted upon, it may be passed up the object's inheritance chain for action by an ancestor object, at step 1074. In this fashion, the values collected from the various property panes are used by the method to set the properties within the object.

While the foregoing outlines the general steps or framework for setproperty, the method is in fact defined as a virtual method. Thus, each class of objects may assume responsibility for setting its own properties. For an Annotate object (i.e., screen objects found in Graph windows), for example, an exemplary setProperty method may be constructed as follows:

```
BOOL Annotate::setProperty ( LPSTR lpPropstr, LPSTR lpValueStr,
PROPTYPE pt )
{
    WORD w;
    if ((w = info.propIndex (lpPropStr, pt)) < annoEndProps) {
        if (info.ppProps [w].getType() > prop_Compound)
            switch (w) {
                case annoFrame:
                    getFrame (GlobalFrameProp.x,
GlobalFrameProp.y,
                        GlobalFrameProp.w,
GlobalFrameProp.h);
                    break;
            }
        if ((info.ppProps [w].getProp())->stringToValue (lpValueStr,
pt)) {
            BOOL f = TRUE;
            switch (w) {
                case annoFrame:
                    setFrame (GlobalFrameProp.x,
GlobalFrameProp.y,
                        GlobalFrameProp.w,
GlobalFrameProp.h);
                    break;
                case annoHidden:
                    if (GlobalYesNoProp.index)
                        hide (TRUE);
                    else
                        show (TRUE);
                    break;
                case annoShow:
                    if (GlobalYesNoProp.index)
                        show (TRUE);
                    else
                        hide (TRUE);
                    break;
                case annoId:
```

```
                    if (pCW && pCW->infoPtr()->objType ==
to_Dialog)
                        f = ((DialView
*)pCW->getContentView())->setIdx (this, GlobalWordProp.w);
                    else
                        idx = GlobalWordProp.w;
                    break;
                case annoAttach:
                    flags.nochild = !GlobalYesNoProp.index;
                    break;
                case annoPosition:
                    *(WORD *)&flags = (*(WORD *)&flags
                        & -(vfPOSITION | vfLEFTREL |
vfTOPREL | vfRIGHTREL | vfBOTTOMREL
                            | vfTOPTYPE | vfRIGHTTYPE)) |
GlobalPositionProp.flags;
                    flags.bottomType = flags.topType;
                    flags.leftType = flags.rightType;
                    break;
            }
            if (f)
                callConnection (lpPropStr, lpValueStr, pt);
            return f;
        }
        else
            return FALSE;
    }
    else
        return Tracker::setProperty (lpPropStr, lpValueStr, pt);
}
```

As shown, the override method processes properties specific for Annotate (e.g., change frame, ID, position, and the like). In the event that a property is not identified, the property is passed up the inheritance chain for appropriate processing (by a parent's setProperty method). In this manner, an individual object (e.g., an Annotate object) in the system is designed to know how to get (getproperty) and set (setproperty) its own properties.

After the update of step 1056, the method 1050 concludes. At this point, the system is ready for another inspection. Alternatively, the user may undertake other activities, as desired.

Building Spreadsheet Applications

A. Basics

The system of the present invention includes a spreadsheet application development module for building custom applications operative in an electronic spreadsheet. An application is a combination of components which work together to simplify an end user's task. When building an application using the system of the present invention, the user (in a role as developer) can create custom components, including dialog boxes, toolbars, menus, and the like. After creating these components, the user can assemble them into an integrated application notebook which comprises all of the programming logic and user interface components for the spreadsheet application.

For purposes of the following description, it is necessary to differentiate between a developer user ("developer") and an end-user ("user"). A developer, as used herein, refers to the person who is building a spreadsheet application. A user, on the other hand, refers to the person who runs a completed application, that is, one who is interested in using the application to perform tasks.

B. Sample application: Budgeteer

Figure 11A:
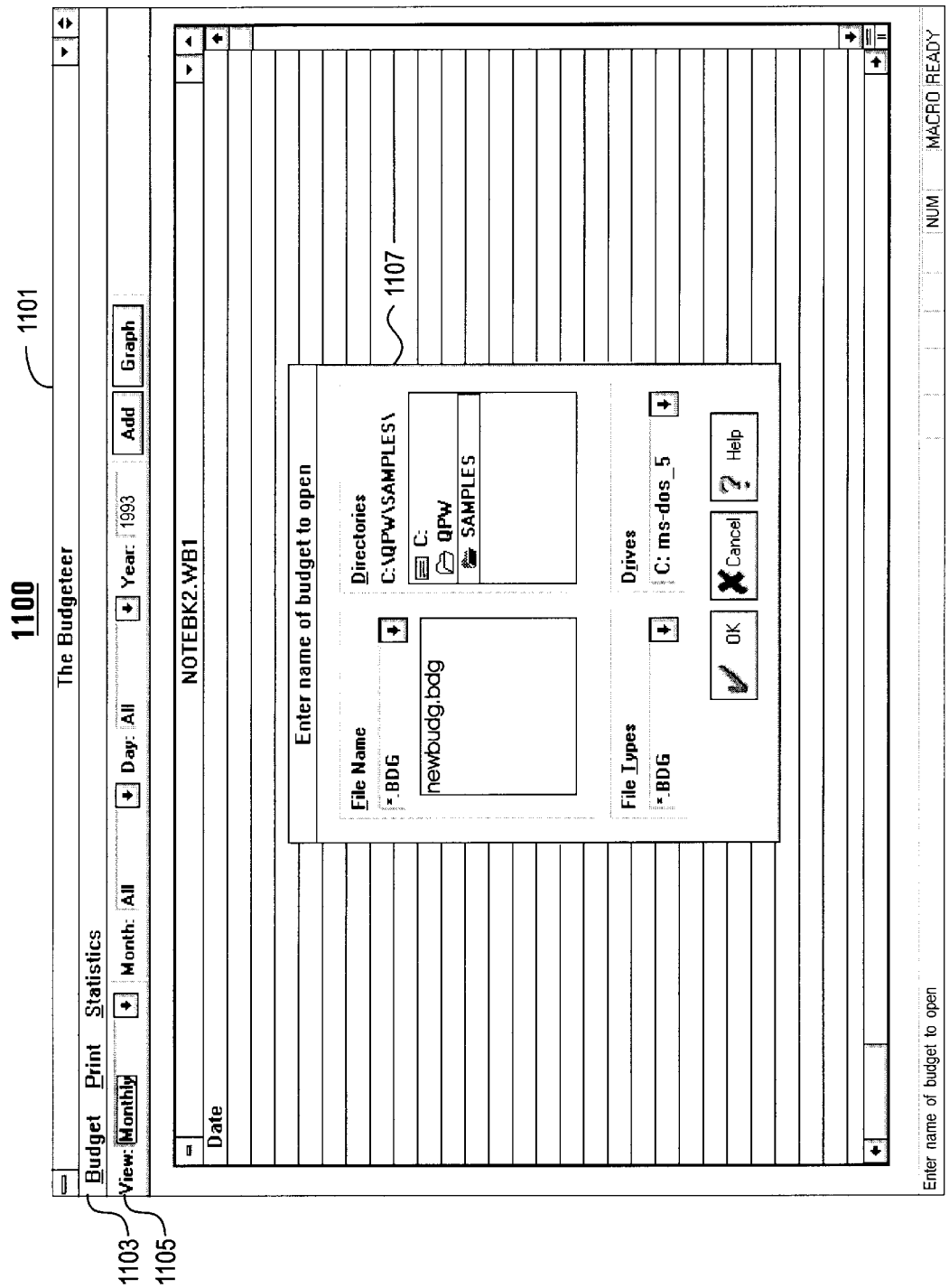
FIG. 11A is a bitmap screenshot illustrating a spreadsheet application, including its major components.

The spreadsheet application development module of the present invention is perhaps best described by introducing an example of a spreadsheet application. FIG. 11A illustrates a sample application 1100, called the Budgeteer. From examining the application, one should note differences between the application's user interface (UI) and that of the system's UI. For instance, the application UI 1100 displays the title "Budgeteer" in the title bar 1101 of the interface. Also, the menu bar 1103 includes menu commands which are entirely new; similarly, a custom toolbar 1105 resides below the menu bar 1103. Finally, the spreadsheet application includes a custom dialog box 1107, as shown on screen.

The Budgeteer application menu bar provides commands to perform global operations like saving budget files, printing, and displaying statistics. For example, with the Budget menu commands one can create a new budget; open an existing budget file; save current data to the budget file; write current data to a different budget file; and creates a new expense column; and exit the application and restores standard system settings. A Print menu is included to print the contents of the active budget file. One can also use Print|Current to print the records currently displaying in the record window, or All to print the contents of all expense databases in the active budget file. A Statistics command displays statistics on the records displaying in the record window, including the total expense cost, average expense cost, greatest cost, and smallest cost.

The toolbar of the Budgeteer application operates as follows. When the Budgeteer is active, the standard system toolbar is replaced by the Budgeteer toolbar 1105, which lets users display the precise view of the data they need. It includes the following commands:

(1) View specifies the database to display in the record window. One can use Month, Day, and Year to search for and display specific records.

(2) Month lets the user display records entered during a specific month. For example, if set to June it will display any records entered for June. If Month is set to All, all months may be viewed.

(3) Day lets one display records entered on a specific day of the week. For example, if it is set to Tuesday it will display any records entered on a Tuesday. If Day is set to All, all days may be viewed.

(4) Year lets the user display records entered during a specific year. For example, if Year is set to 1994 any records entered during 1994 will be displayed. If Year is set to All, all years may be viewed.

(5) Add adds a new record to the expense database being viewed. A new record appears only if it meets the search conditions specified by the Toolbar.

(6) Graph creates a graph using the records in the record window. Each expense is plotted as a separate series.

User operation of the Budgeteer spreadsheet application 1100 is described in full detail in originally-filed Appendix B, (Quattro Pro Windows: Buildings Spreadsheet Applications) now canceled for convenience of patent publication, the disclosure of which is hereby incorporated by reference.

Spreadsheet application construction

A. Design components

The general process of building a spreadsheet application, such as the Budgeteer application, will now be described. In a preferred embodiment, a spreadsheet application is constructed within a notebook. In particular, its major modules are organized by notebook page. For instance, the Budgeteer application can be organized into the following pages.

Exemplary Pages used in the application

Figure 11B:
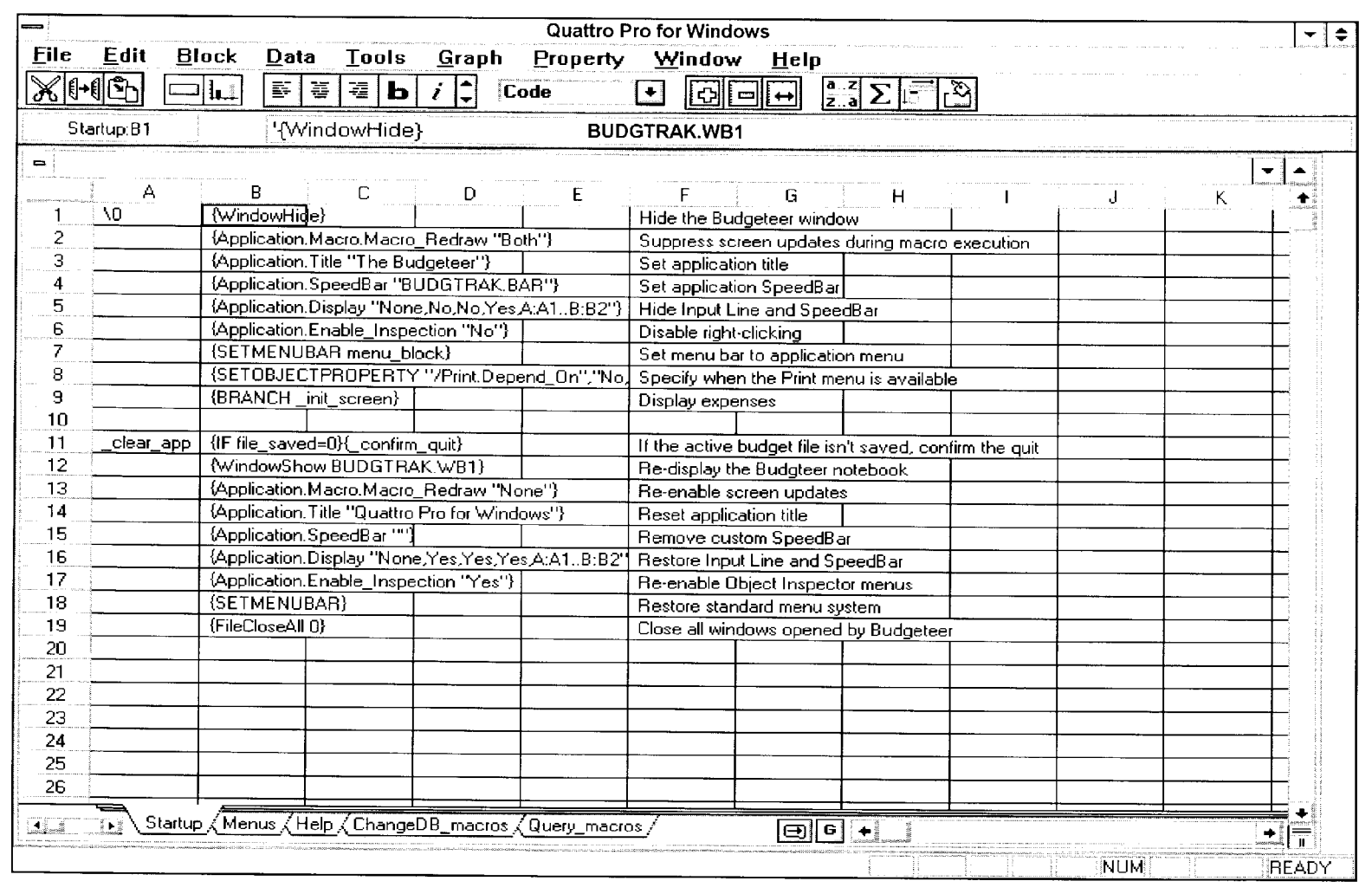

| Page (s) | Purpose |
| --- | --- |
| Startup | This page (shown in FIG. 11B) contains the macro that changes the system UI and runs the Budgeteer. It also contains the macro that closes down the Budgeteer |
| Menus | This page (shown in FIG. 11C) contains the menu block that defines the Budgeteer menu bar. |
| Help | This page contains help messages displayed by the Budgeteer, and developer notes. |
| Task_Macros | These pages contains macros specific to a Budgeteer function. For example, ChangeDB_Macros (shown in FIG. 11D) contains macros to change expense databases; Query_Macros contains the macros to search expense databases. |
| Expense_View | This page is the record window that the user sees. It is in the budget file. |
| Stats | This page is the window that the user sees when he or she chooses Statistics. It is in the budget file. |
| Input | This page contains the form that users manipulate to add records. It is in the budget file. |
| Daily . . . Annually | These pages contain the expense databases when the Budgeteer is running. Each page contains one database (stored in the budget file). |
| Graphs | This page contains the dialog boxes used by the Budgeteer. |

The developer can use macros to assemble these components into an application. One can also use macros to automate system operations, change the system's appearance, and display dialog boxes. Link commands (described below) are also provided to assign actions or connections to controls in a dialog box or a toolbar. A link command can get or change an object's property settings, or run macros.

Specific-purpose user interface components which are provided include menus, dialog boxes, and toolbars. First, menus provide custom lists of operations the user can choose from the menu bar. Next, dialog boxes prompt users for information and let the user make choices. Finally, toolbars give users shortcuts to common application tasks and perform operations that affect the active data; they also display information about the active window or object. The general operation and construction of each will next be described.

Menu commands can initiate actions, run macros, display dialog boxes, or display other menus. To create a menu, the developer describes the menu with a block of labels. The following table lists macro commands provided by a preferred embodiment for modifying menus, menu commands, and the menu bar:

Defining a custom menu

| Macro command | Description |
| --- | --- |
| {DELETEMENU} | Removes a menu from the current menu bar (including submenus like Tools\|Macro). |
| {DELETEMENUITEM} | Removes menu commands from the specified menu. |
| {ADDMENU} | Adds names to the current menu bar. |
| {ADDMENUITEM} | Adds menu commands to the specified |

-continued

Defining a custom menu

| Macro command | Description |
| --- | --- |
| | menu. |
| {SETMENUBAR} | Replaces the active menu bar with the menu described by the block. |
| {SETOBJECTPROPERTY} | changes existing menu commands. |

Figure 11C:
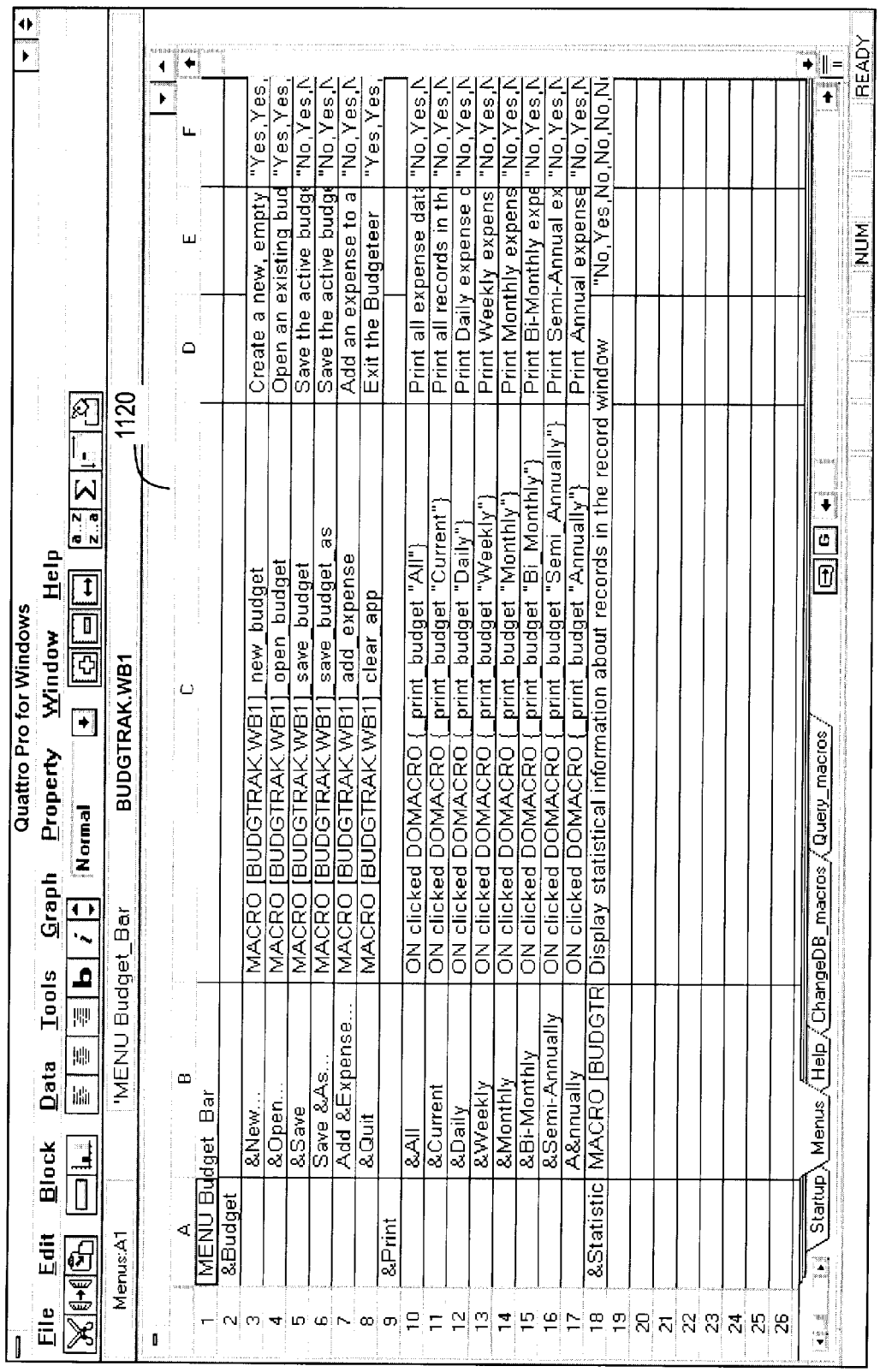
Figure 11D:
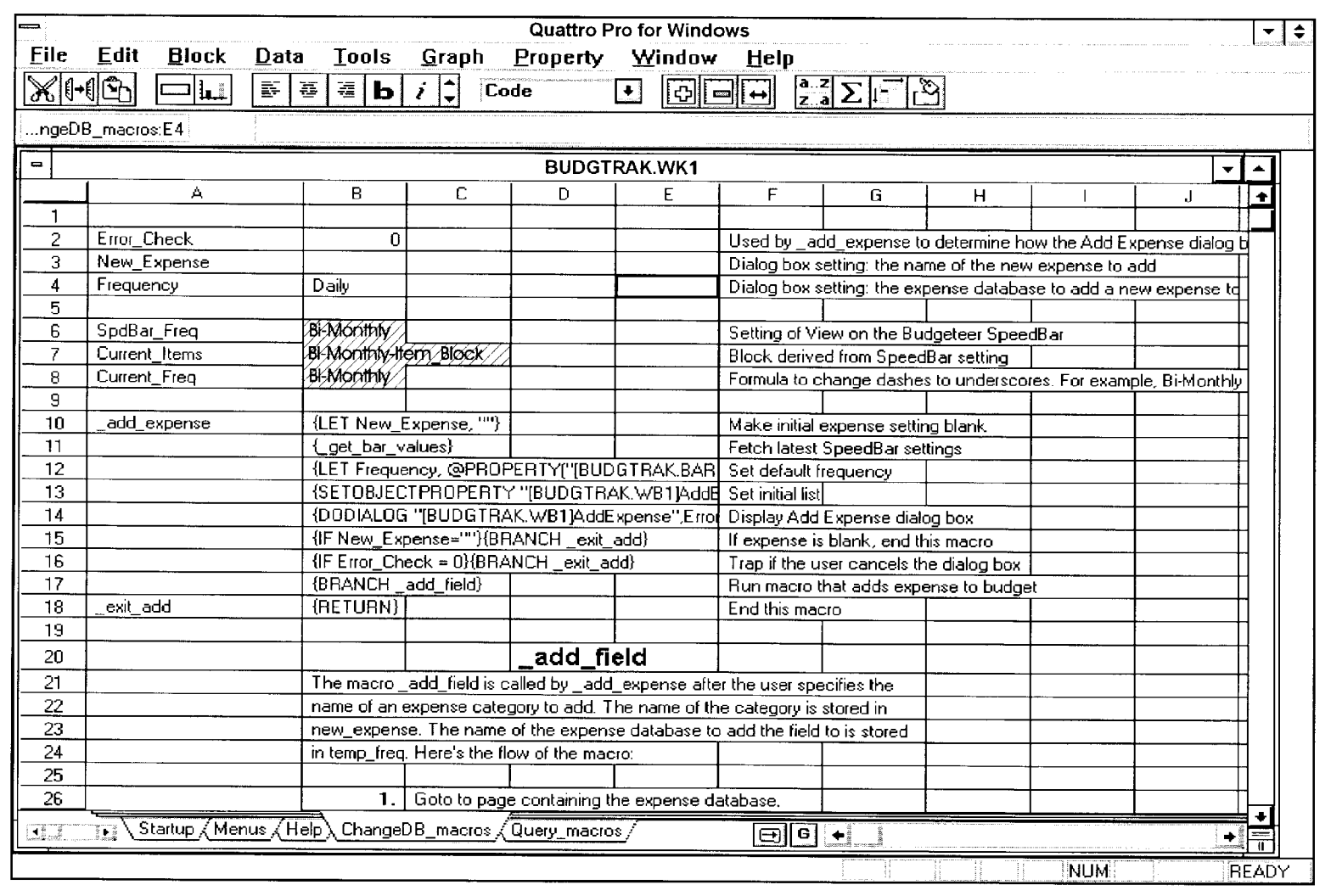

For example, FIG. 11C shows some of the labels that define the Budgeteer's menu bar. The Budgeteer application uses the command {SETMENUBAR} at startup (see FIG. 11B) to replace the standard menu bar with the items described in this block. As seen in column C (1120) of FIG. 11C, each menu command has one or more link commands in its block. These link commands determine what action occurs when the menu command is chosen. Command names that appear in column B appear as items on the menus defined in column A.

Figure 11E:
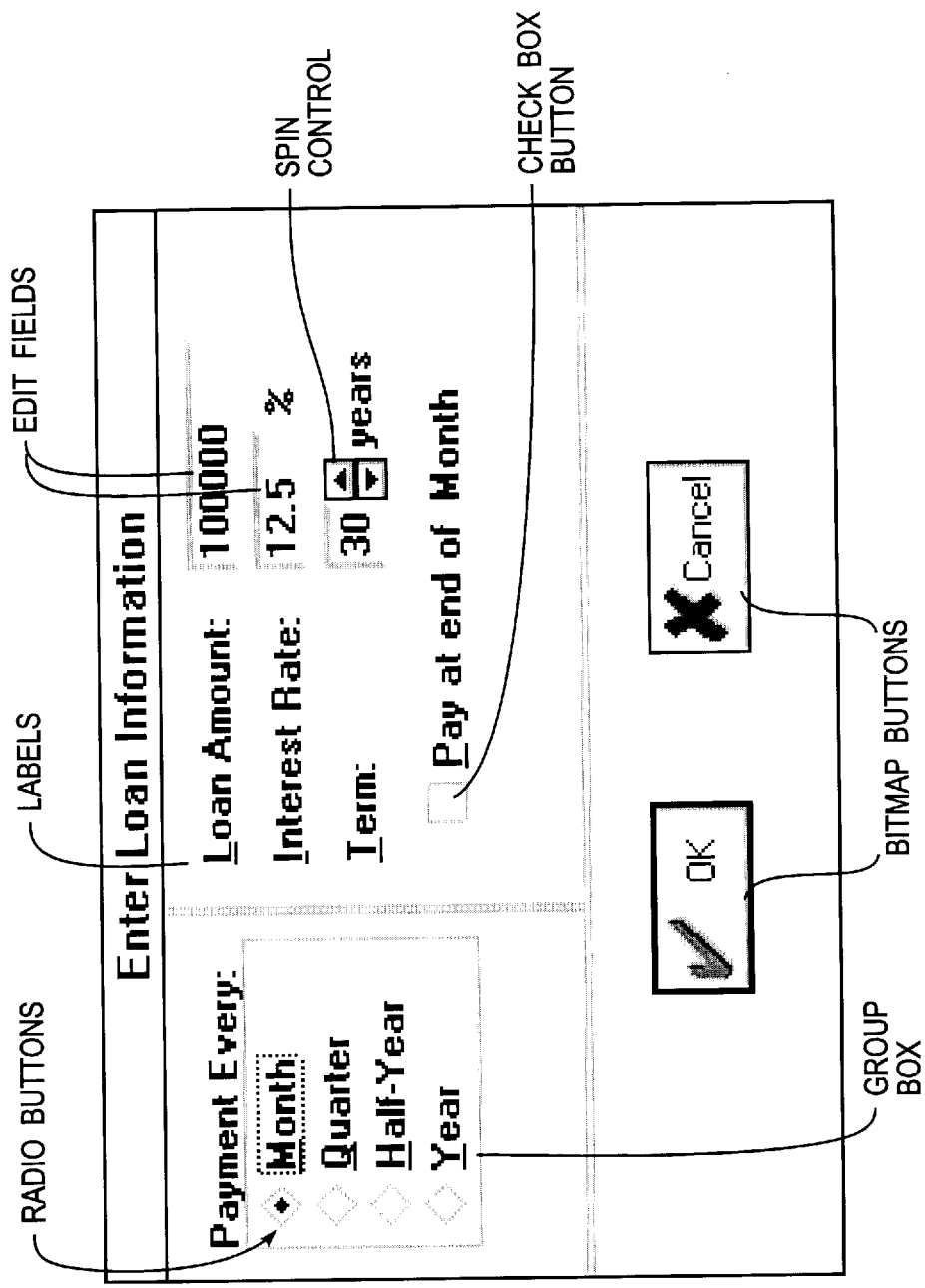
FIG. 11E is a bitmap screenshot illustrating a sample dialog box created with the dialog builder of the system of the present invention.
Figure 11F:
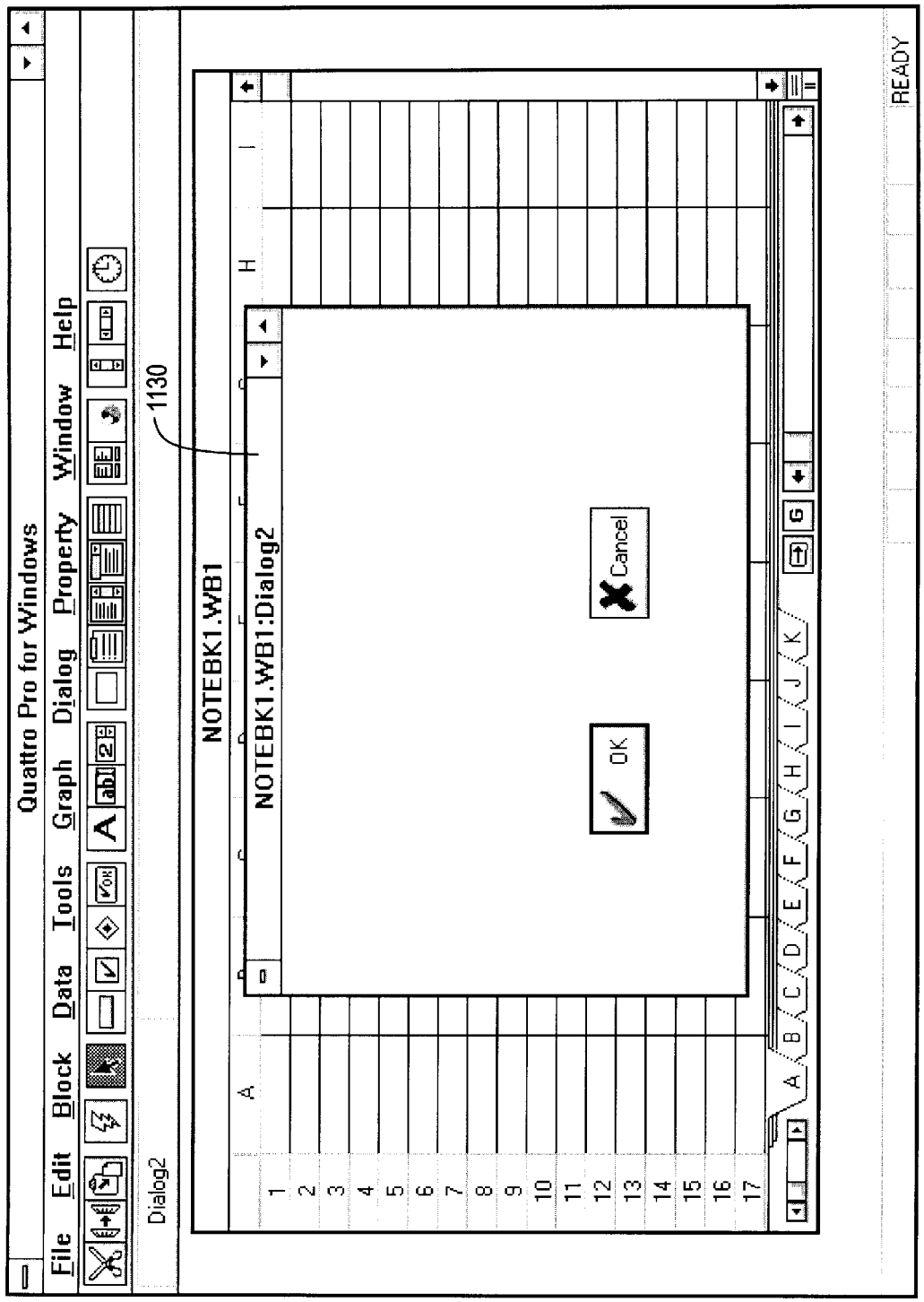
FIG. 11F is a bitmap screenshot illustrating initial layout of a dialog box (empty dialog box) within a dialog window.

Spreadsheet applications of the present invention employ dialog boxes for displaying information and receiving user input. A dialog box is a box of options that a developer creates to prompt the application user for information. As shown in FIG. 11E, a dialog box can contain various controls, such as check boxes and edit fields. Upon selection of a Tools|UI Builder command by the developer, the system displays an empty dialog box 1130 within a dialog window, as shown in FIG. 11F. By default, new dialog boxes contain an OK button and a Cancel button, to provide a consistent way for the user to close the dialog box. Also, a default name is automatically assigned. When one is creating a dialog box in a dialog window, it looks slightly different from ho it will appear to the user in a completed application. FIG. 11G shows a dialog box 1150a as the user sees it and as the developer creates it (dialog 1150b).

The dialog window is the dialog box in an editable form; it contains all the Windows user interface elements for a window: a window border, a menu-control box, and Minimize and Maximize buttons. In the dialog window, the name of the dialog box (e.g., LOANPMT.WB1:LoanData) appears in the title bar. The developer uses this name in a macro to display the dialog box or change its property settings. This name is different from the title of the dialog box ("Enter Loan Information"), which is what the user sees when the application runs. In contrast, toolbars do not have titles, but they do have names (which, like dialog box names, appear in the title bar).

Figure 11H:
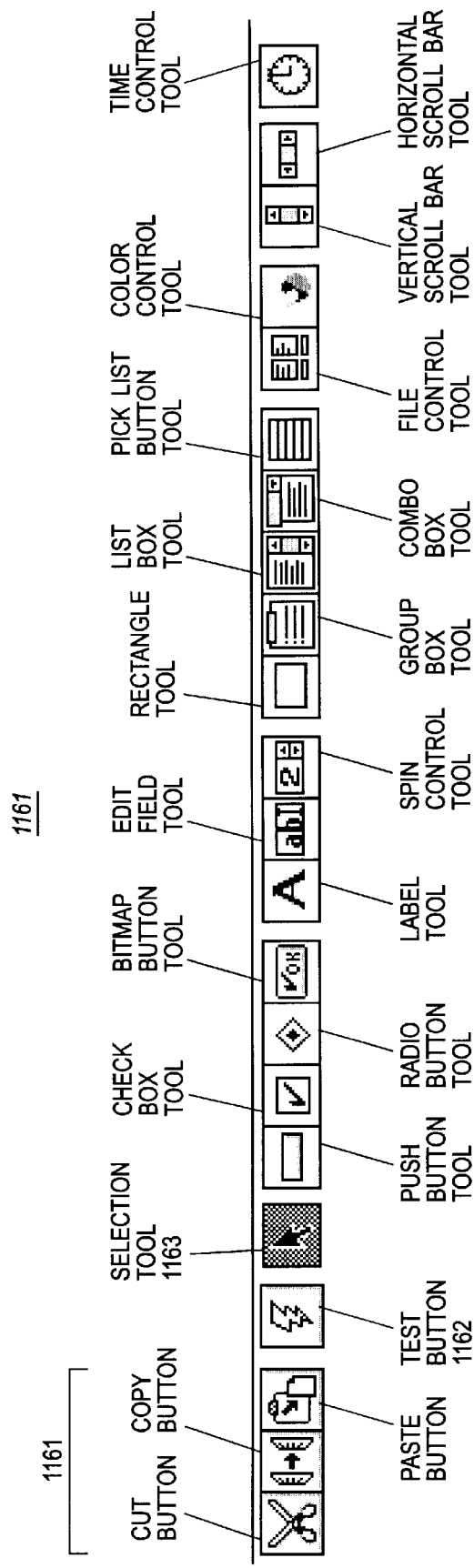
FIG. 11H is a bitmap screenshot illustrating a toolbar of the system of the present invention for use in the dialog window.

The system of the present invention includes a dialog window toolbar 1160, shown in FIG. 11H, which contains tools that are specifically designed to help the developer build dialog boxes and toolbars. It includes tools which let the developer quickly create, copy, move and test controls. Controls are elements the developer puts in a dialog box to gather information from the user or to perform a desired action.

The Cut, Copy, and Paste buttons 1161 are shortcuts for Edit|Cut, Edit|Copy, and Edit|Paste, respectively. The developer can copy a control to the Windows Clipboard to duplicate it or to move it to another dialog box or toolbar. The Test button 1162 tests the operation of a dialog box (or toolbar). In Test mode, the dialog box controls behave exactly as they will when the application runs. The Selection tool 1163 lets the developer select a control in the dialog window to move it, resize it, change its properties, and so forth. The developer can select several controls at a time to move or size them together. The remaining tools on the toolbar let the developer add controls to a dialog box; each functions as shown in FIG. 11H. A more detailed description of each appears in originally-filed Appendix B, now canceled for convenience of patent publication, the disclosure of which has been incorporated by reference.

The general steps for creating a custom dialog box (or toolbar) may be summarized as follows. First, the developer chooses a Tools UI Builder command; a dialog window appears. Next, a name for the dialog box is entered. Later, the developer may use this name in a macro to make the dialog box appear. As the third step, the developer enters a title for the dialog box; the title is what the user will see. Any desired controls are added to the dialog box. The developer customizes each control, as necessary. The dialog box can also be resized, if desired. A command to invoke the dialog is created by inserting in the notebook a {DODIALOG} command (described below); the command calls the dialog box and passes initial defaults to it. The developer adds a link command to each control, as desired. A link command is a command which indicates what should happen when a user manipulates that control in a specific manner. By selecting the Test button, the developer may test the operation of each control during dialog box construction. Finally, the dialog box is saved by saving its notebook.

The system of the present invention offers a variety of different controls. Each control is best suited for presenting (or receiving) a certain type of information. A control displays a setting and provide a way for users to change that setting. The following is a summary description of the exemplary controls provided by the system of the present invention.

(1) Push Button. A push button usually performs a specific action when the user clicks it. The developer determines what that action is.

(2) Check Box. Check boxes present a Yes/No choice to the user. The user checks the check box to accept the choice. Check boxes act as toggles; when checked again, they "uncheck" —the choice is no longer accepted.

(3) Radio Button. Radio buttons (also called option buttons) are usually grouped to give the user a mutually-exclusive list. When a user clicks a radio button, its diamond darkens to indicate that it is chosen.

(4) Label. A label clarifies for the user what a specific control does.

(5) Edit Field. An edit field is where a user types specific information.

(6) Spin Control. A spin control lets the user click an arrow to increase or decrease the value it displays. (The user can also type a value instead.)

(7) Rectangle. A rectangle embellishes a dialog box or groups two or more controls together.

(8) Group Box. A group box usually contains other controls such as radio buttons or check boxes. It looks like a rectangle with a title at the top.

A more detailed description of each control is set forth in originally-filed Appendix B, now canceled for convenience of patent publication, the disclosure of which has been incorporated by reference. For a general discussion of constructing controls operative in a windows environment, see the above-referenced Programming Windows.

After a custom dialog box has been created, it can be displayed by using the macro command {DODIALOG}. Macros are the primary method employed within the system for tying all of the application components together. In addition to the {DODIALOG} macro command, which displays dialog boxes, macros are commonly used in an application to automate tasks, duplicate keyboard and mouse actions, change the active menus, affect the screen display, select, reposition, and resize objects, and prompt users for input. FIG. 11I illustrates a typical macro for displaying a dialog box (e.g., the dialog shown in FIG. 11E). In the macro, information the user enters the dialog box is passed to the Budgeteer application. The macro will next be described in greater detail.

B. {DODIALOG} command

The process of displaying the dialog box via a macro command and storing the user's choices in cells in the notebook will now be described. The macro will send initial values to each control in the dialog box. If the user changes a setting in the dialog box, that change will be sent back to a cell in the notebook when the user closes the dialog box.

For the Budgeteer sample application, the developer can set up an area that will send default settings to the dialog box in cells A2, A3, and A4, respectively, by entering the following: Amount:, Term:, and Due Date:. The initial defaults are entered as follows. In cells B2, B3, and B4, the values of 20000, 4, and "15th of month are entered respectively. This will set the default loan amount at 20,000, the default term at 4 years, and the default payment date to the 15th of the month.

Next, a cell is set to display the amount of the monthly payment. The formula in this cell will use values the user enters in the dialog box. In cell A6, Payment: is entered; in cell B6, @PMT(B2, 0.125/12,B3*12) is entered. The result displayed in cell B6 is 531.60 (the cell's format will be set to Currency and recalculate, if necessary). This payment amount is based on the loan amount in cell B2 and the term in cell B.

The {DODIALOG} command is employed in a macro for displaying the dialog box and sending the user's choices back to the notebook. The {DODIALOG} command contains several arguments, as shown in FIG. 11I. The first argument is the name of the notebook that contains the dialog box desired together with the name of the dialog box. The name of the notebook is optional if the dialog box is stored in the active notebook. The second argument specifies a cell that will store a value indicating how the user closed the dialog box. If the dialog box was canceled, 0 is stored in the cell; if the user closed the dialog box by pressing Enter or OK, 1 is stored. The third argument specifies a block that (1) contains initial values for the dialog box controls and (2) receives final values from the dialog box controls when the user closes the dialog box. Each cell in the block (starting at the upper left cell and proceeding row-wise to the lower right cell) sets the initial value of one control. If the user cancels the dialog box, the values in this block remain unchanged.

To display the LOANDB dialog box 1170 of FIG. 11J, for instance, the user enters the following in cell A8:

{DODIALOG "LOANDB",A1,B2 . . . B4}

The notebook after adding this DODIALOG command is shown in FIG. 11K. The command displays the LOANDB dialog box and passes the initial values in cells B2 through B4 to the dialog box controls (20000 for the loan amount, 4 for the term, and 15th for the monthly due date). It also sends a value of 0 to cell A1 if the user cancels the dialog box; otherwise, it sends a value of 1.

C. Linking commands to controls

Link commands of the present invention will now be described in detail. To make a dialog box dynamic (i.e., so that the user's changes are immediately reflected in the notebook), the system of the present invention allows link commands to be added to each control. Link commands are statements which are attach to each control to indicate what should happen when the user changes the control.

The {DODIALOG} command brings changed values back to the notebook when the user closes the dialog box. A link command, on the other hand, is a dynamic link—one which does not require the dialog box to be closed in order to see the calculated loan payment. Link commands usually specify at least three things: an event, an action, and an object. Hence, link commands may be thought of as statements which specify "when A happens, do B to C." The event indicates what occurrence should trigger the link command; the action indicates what should happen; and the object is what should be acted upon. In other words, when the user changes a setting, the system sends the new value back to a specific cell in the notebook. Thus, link commands are statements a developer attaches to a control to indicate what should happen when the user changes or selects the control.

Figure 12A:
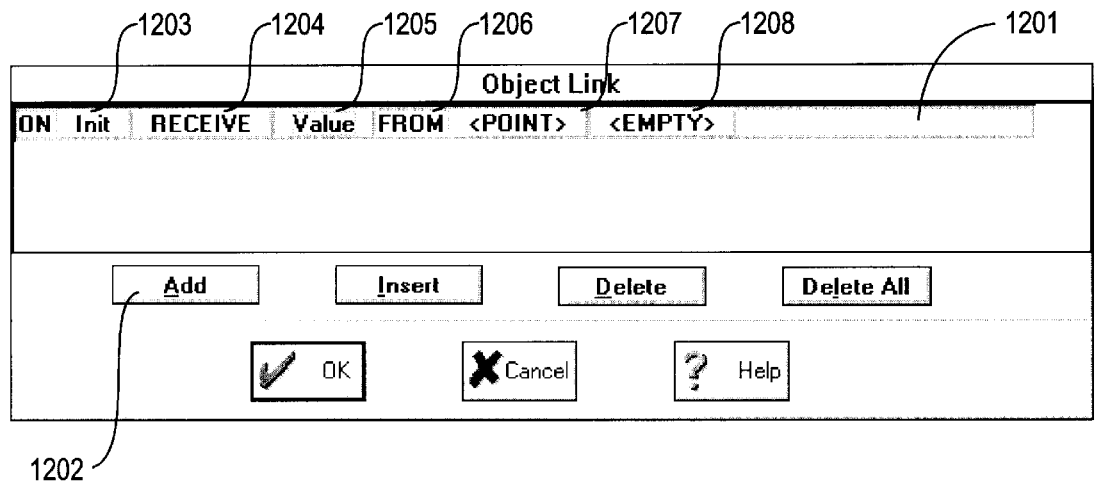
FIGS. 12A–C are screen bitmaps illustrating an Object Link dialog box of the present invention, for creating links between objects.

For the LOANDB dialog box example, for instance, a link command may be added to the edit field to make it write changes back to cell B2 immediately. This is added as follows. In the LOANDB dialog box, the Loan Amount edit field is selected. Then, the developer invokes a Dialog|Links command. An Object Link dialog box 1201 appears, as shown in FIG. 12A. The developer then selects Add 1202 to start the link definition. Next, the developer specifies what "event" will trigger the command (i.e., a "when" statement); a link command runs in response to some event that occurs in a dialog box (or toolbar). In a preferred embodiment, an event pick list button is provided for selecting among a plurality of events; it is available upon selection of Init button 1203. In an exemplary embodiment, the following events are detected.

| Event | Will trigger the link command when . . . |
| --- | --- |
| Init | The dialog box is about to be displayed. One can trap this to set initial settings. |
| Init Complete | Available only when adding a link command to the dialog box itself; this event occurs immediately after all controls have run all link commands that respond to Init. |
| OKExit | The user closes the dialog box. The link command runs before the dialog box closes. |
| CancelExit | The user cancels the dialog box. The link command runs before the dialog box closes. |
| Clicked | The user clicks the control. |
| Right_bdown | The user right-clicks the control. |
| Left_bdown | The user points to the control while holding down the left mouse button. Releasing the button generates a Clicked event. |
| Doubleclick | The user double-clicks the control. |
| Valuechanged | The user changes the value of the control. This event occurs anytime the value is changed (by the user, by a link command, or by a macro command). |
| key:keystroke | The user presses the key keystroke. When one chooses key from the event pick list, it flashes to indicate that a key needs to be pressed to generate the event. The key displays after key: in the pick list button when it is set. For example, key:Ctrl+F5 indicates that the link command is triggered by Ctrl+F5. |
| Activate | The user has chosen the control for manipulation. For example, clicking an |

-continued

| Event | Will trigger the link command when . . . |
|---|---|
| | edit field generates this event. One can use Valuechanged to trap the final result. |
| Deactivate | The user has chosen another control, leaving this control inactive. |
| Enter | The user has pressed Enter (edit fields only). |
| Lineup | The user increases the scroll bar's value by clicking a scroll arrow (available only on scroll bar controls). |
| Linedown | The user decreases the scroll bar's value by clicking a scroll arrow (available only on scroll bar controls). |
| Pageup | The user increases the scroll bar's value by clicking it between a scroll arrow and the scroll box (available only on scroll bar controls). |
| Pagedown | The user decreases the scroll bar's value by clicking it between a scroll arrow and the scroll box (available only on scroll bar controls). |
| Thumb | The user clicks or drags the scroll bar's scroll box (scroll bar controls only). |
| Editdynamic | The user is inserting or deleting characters in the combo box's edit field (combo box controls only). |
| Trigger | This event cannot be generated by any user action; it is used to set link commands that can be run only by other link commands. One can use the link command TRIGGER to generate this event. |
| Alarm | The time of day specified in the timer's Alarm Time property has been reached (time controls only). |
| Timer | The amount of time indicated in the timer's Timer Interval property has elapsed (time controls only). |

Figure 12B:
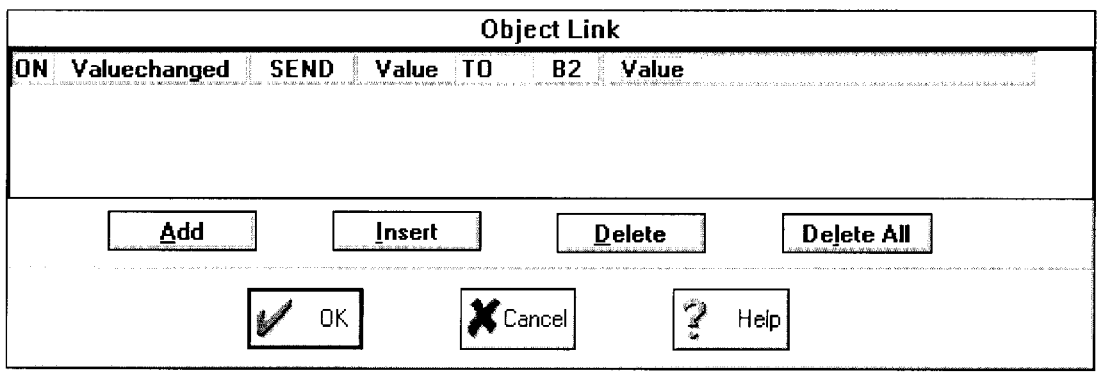

The action that should occur in response to the event is specified next (i.e., a "what" statement). The user may toggle the second button 1204 from RECEIVE (shown) to SEND; send causes the change to be sent back to the notebook. The third button 1205 specifies Value—what to send. The user toggles the fourth or TO/FROM button 1206 to select TO (i.e., send the value "to" a target). The Object pick list button 1207 is where the object to be acted upon is specified. By choosing <POINT>, the developer may point to an intended target in the spreadsheet. For the instant example, cell B2 is selected; this is where the developer desires the value to be sent. The last button 1208 is set to Value to indicate what is to happen to the cell—set its value. The completed Link dialog box appears as shown in FIG. 12B. The user closes the dialog by choosing OK.

Figure 12C:
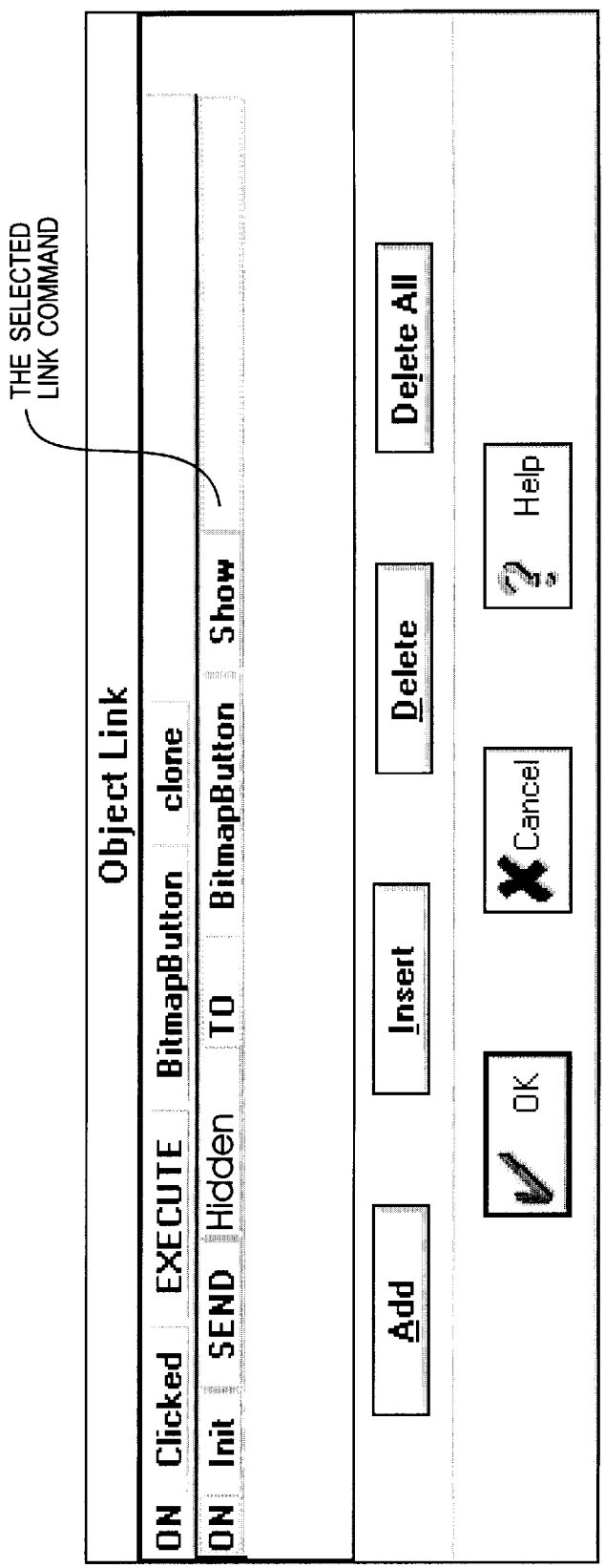

A similar process may be followed to add link commands to other controls. To add a link to the spin control in the LOANDB dialog box, the developer selects the spin control, chooses Dialog|Links, then Add. Next, the developer sets the first button (the event) to Valuechanged. Then he or she sets the second button (the action) to SEND, leaving the third button set to Value. Then, the fourth button is set (the object) to POINT for selecting cell B. Next, the fifth button is set to Value. Finally, the user clicks OK to return to the LOANDB dialog box. For the group box in the LOANDB dialog box, the first button is set (the event) to Valuechanged and the second button (the action) to SEND. The third button is set to Value, and the fourth button (the object) to POINT for selecting cell B4. The fifth button is set to Value. Finally, OK is selected to complete the dialog. A summary of the functions of the Object Links dialog box is illustrated in FIG. 12C.

Control properties

Each control stores one setting; the user manipulates the control (by clicking a scroll arrow, typing text, and so on) to change that setting. There are several ways to set a control's value: (1) through initial settings one will pass using a {DODIALOG} command; (2) by a user changing a setting from within the dialog box; (3) through the {SETOBJECTPROPERTY} command; and (4) through link commands from any dialog control. For example, the following macro command uses the Value property to enter "Spanish" into an edit field:

{SETOBJECTPROPERTY "Dialog1:EditField3.Value", "Spanish"}

The macro command {DODIALOG} displays a specified dialog box. As shown in FIG. 13, the macro that displays the dialog box of FIG. 11E uses the settings within the dialog box to calculate a loan payment. Cell D6 contains the {DODIALOG} command. The {DODIALOG} command in this figure is:

{DODIALOG "LoanData", Result, B1 . . . B5}

This command displays the LOANDATA dialog box, places the result of how the user closed the dialog box in the cell named Result, and passes the values in cells B1 through B5 to the controls in the dialog box, in order.

If a control's Process Value property is set to No, it will not receive an initial value from the block specified in the {DODIALOG} command. For example, if a user's dialog box has six controls, but he or she has set the Process Value property of the third control to No, the setting block should be only five cells long. The values in the first two cells will be passed to the first two controls. However, the value in the third cell will go to the fourth control, and the values in the fourth and fifth cells will go to the fifth and sixth controls, respectively. Controls that do not have a Process Value property will receive no value from a {DODIALOG} command.

By default, the order in which the controls are created is the order in which a developer passes each control's value (through the {DODIALOG} command). In other words, the first cell in the specified block sends its value to the first control a developer created no matter where it is positioned within the dialog box. For example, the last argument in the command {DODIALOG "LoanData", Result, B1 . . . B5} specifies that cells B1 through B5 contain initial values for the controls in the dialog box. Cell B1 contains the initial value for the first control a developer created, cell B2 contains the value for the second one, and so on. The order may be changed to match the order of the values in the setting block, if desired.

Dialog controls are provided with a variety of properties that can be used to temporarily hide or disable them. One can use these properties in conjunction with link commands to hide unneeded controls or reveal special settings.

| Properties to hide or disable dialog controls | |
|---|---|
| Property | Purpose |
| Grayed | Specifies whether the control can be used. When set to Yes, the control appears dimmer to indicate it is unavailable. |
| Disabled | Specifies whether the control can be used, like Grayed, but does not dim the control when it is set to Yes. |
| Depend On | Specifies the areas of the system in which the control is enabled (discussed |

Properties to hide or disable dialog controls

| Property | Purpose |
| --- | --- |
| | next). |
| Enabled | The opposite of Disabled (setting this property to No disables the control). It is used by link commands and does not appear in a control's Inspector. |
| Hidden | Setting this property to Yes hides the control when the dialog box displays. (The control still appears in the dialog window while the developer is editing.) |
| Show | The opposite of Hidden (setting this property to No hides the control). It is used by link commands and does not appear in the control Inspector. |

Some dialog controls have an Attach Child property that makes controls dragged on top of them become attached. The control on top is then a child of the control beneath it, which is the parent. Grouping controls provides many advantages to the developer. Moving the parent control moves any attached elements. Copying the parent control copies any attached elements. Hiding the parent control hides any attached elements. Disabling the parent control disables any attached elements. Resizing the parent control resizes any attached elements proportionally.

Child controls cover the parent control only; controls partially covering one another will not attach. Here is an example of grouping controls together: First, a developer chooses Tools|UI Builder to display a new dialog window. Next, he or she uses the Rectangle tool to create a rectangle that is big enough to contain the OK button. Next he or she moves the OK button into the rectangle. The OK button is now attached to the rectangle. Then the developer moves the rectangle; the OK button stays with the rectangle. Next he or she right-clicks the rectangle, chooses Disabled, and sets it to Yes. Then he or she chooses the Test button to test the dialog box's operation. Next, he or she clicks the OK button; nothing happens, since the rectangle (its parent control) is disabled. Finally, the developer clicks the Cancel button to exit Test mode and return to the dialog window.

To prevent an object from becoming a parent control, its Attach Child property is set to No. This does not affect controls already attached. All controls in a dialog window are child controls of the dialog box (or Toolbar), which is the parent control. Therefore one can disable all controls in a dialog box by right-clicking the dialog box and setting Disabled to Yes.

Attached controls can be nested (for example, moving a parent control on top of another control to attach them). The attached controls still stay associated with the original parent control, not that control's new parent. Moving a parent control moves any child controls with it. (Moving child controls does not affect the parent.) One can use a child control's Position Adjust property to specify how it moves (or resizes) when the parent control containing it is resized.

By default, a child control moves when a handle on the left or top side of its parent control is dragged. If a developer right-clicks a child control, then chooses Position Adjust, and checks Depend on parent, each edge of the child control is locked into place so that when the parent control is resized, the child control resizes proportionally.

When a handle of the parent control is dragged while Position Adjust is enabled, an edge of the child control is pushed or pulled. Dragging a corner handle affects two sides of the child control. For example, dragging the lower right handle would affect the bottom and right edges of the child control. If the edge of a child control is pushed toward or pulled away from an edge of the child control that's locked, the child control is resized. Arrows point to the edge being pushed. One can use the check boxes in the Position Adjust dialog box to unlock edges of the child control. If an edge of the child control is pushed toward or pulled away from an unlocked edge, the child control moves instead of resizing. Arrows point to the edge being pushed.

The following section gives information specific to each control type. To change some aspect of a control, the developer can right-click it to reach its Inspector dialog. The Inspector lists properties specific to that type of control. The following properties are common to push buttons, check boxes, radio buttons:, and bitmap buttons:

| Property | Description |
| --- | --- |
| Draw to Right | Determines whether the button appears to the right of the title (Yes) or to the left (No). |
| Label Text | Contains the text appearing on the push button (or bitmap button), next to the check box button, or next to the radio button. To follow Windows conventions, when a push button leads to another dialog box, one should end its text with an ellipsis ( . . . ). |
| Text Draw Flags | Determine where the text appears in relation to its background (for check boxes and radio buttons) or in relation to the button itself (for push buttons and bitmap buttons). This property has the same options as a label's Text Draw Flags property. |
| Button Type | Specifies the button's behavior. For example, to change a push button into a check box button, one sets Button Type to Check Box. Two special button types (OK Exit Button and Cancel Exit Button) change the button into a push button that closes the dialog box. |
| Default Button | Specifies whether this button is automatically clicked when the user presses Enter in a dialog box or Toolbar. A button configured this way is called the default button. A button defined as the default button appears in the dialog box, with a thick black border. Only one push button in the dialog box can have this property set to Yes; by default, it is the OK button. |

A push button runs a specified command when the user clicks it. To have a macro run when the user clicks a push button, one adds a DOMACRO link command to the push button. To run a macro that is stored in the notebook when the user clicks the push button, the developer adds a DOMACRO link command that contains a {BRANCH}. To make a push button close the dialog box, the developer uses the Button Type property.

Check boxes present a Yes/No option to the user. The text that appears in this button is stored in its Label Text property. The value of a check box is Yes when it is checked, No when it is unchecked.

Radio buttons, when placed in a group box with other radio buttons, present a list of mutually exclusive choices to the user—only one radio button can be chosen at a time. When the user chooses one of the radio buttons, it darkens to indicate that it is chosen. To automatically fill a group box with radio buttons, paste a block stored in the Clipboard into a group box; one radio button is created for each row of the block. By default, a radio button's Process Value property is set to No, and the group box containing it has Process Value set to Yes. When its Process Value property is set to Yes, a radio button has a value of Yes when chosen, No when not chosen.

A label is simply descriptive text that one can place beside another control to describe the control's purpose to the user. Labels do not have a value. Resizing a label does not increase the text size; it makes a larger background to display the text on. One can also use Text Draw Flags to wordwrap the label text so that it fits in the label background.

An edit field is where a user types specific information. A developer can use the Field Type property to restrict the type of information an edit field accepts.

| Field type | Result |
|---|---|
| Integer | Restricts user entry to integers. This adds three properties to the edit field Inspector (which is renamed Edit Integer). Minimum defines the lowest acceptable value users can enter. Maximum defines the highest acceptable value a user can enter. Default defines the initial value of the edit field. |
| String | Accepts any text a user enters (including numbers); this is the default edit field type. |
| Real | Accepts any number or formula. |
| Block | Accepts only cell addresses or block coordinates. |
| Hidden | Accepts any text, but displays a pound sign (#) for each character instead of the actual character. This is handy when users are entering passwords. |

Edit fields have additional properties a developer can set to customize their appearance and behavior.

| Property | Description |
|---|---|
| Allow Point Mode | When set to Yes, lets a user point to cells and blocks in the notebook (all Field Types except Integer). |
| Show Frame | When set to No, removes the default frame from the edit field. |
| Edit Length | Sets the maximum number of characters a user can type into the edit field. |
| Terminate Dialog | When set to No, keeps the dialog box from activating its default button when the user presses Enter in an edit field. This is important in Toolbars, since activating the default button would close the Toolbar. |
| Convert Text | Lets the user enter escape sequences into the edit field: Entering \t inserts a tab character for lining up columns of text within the edit field; entering \n (or \r ) places the remaining text on a new line. \\ Inserts a backslash (\) into the text. |

A spin control is an edit field with two arrows on its edge. The user can either click an arrow to increase or decrease the spin control's value, or type the value. The value of a spin control is always an integer. A spin control will accept three properties control, as follows:

| Property | Description |
|---|---|
| Minimum | Smallest integer that the control will accept |
| Maximum | Largest integer that the control will accept |

| Property | Description |
|---|---|
| Default | The initial value of the control when the dialog box displays |

Spin controls have additional properties to customize their appearance and behavior.

| Property | Description |
|---|---|
| Show Frame | When set to No, removes the default frame from the spin control. |
| Edit Length | Sets the maximum number of characters a user can type into the spin control. |

A rectangle can be used to visually organize controls in a dialog box. To change how a rectangle appears, the developer right-clicks it and choose Rectangle Style.

| Option | Description |
|---|---|
| Plain | Draws the rectangle as a solid box without a frame. |
| Framed | Draws a frame around the rectangle (the default). To set the color of this frame, one uses the Frame Color property. |
| Beveled Out | Displays a slightly raised rectangle. |
| Beveled In | Displays a slightly recessed rectangle. |
| Transparent | Displays a clear, unfilled rectangle. This is handy for grouping controls together without displaying the rectangle they are attached to. |

To change a rectangle's color, one right-clicks the rectangle, and chooses Fill Color.

A group box usually contains other controls such as radio buttons or check boxes. It looks like a rectangle with a title at the top. When a group box contains radio buttons, its value is the title of the radio button chosen; otherwise, it does not have a value. Initially, the Process Value of a group box is set to Yes, and the Process Values of radio buttons within the group box are set to No.

In addition to the Value property, the group box has a property called Selected that indicates numerically which of its radio buttons is chosen, starting from the top left radio button (0) and proceeding to the bottom right button. For example, the group box shown at left has Selected set to 1. If Right was chosen, Selected would be 0. Left and Down would set Selected to 2 and 3, respectively.

A list box presents the user with a list of items to choose from. Whichever item the user picks becomes the value of the list box. There are two ways to specify the items that appear in a list box: (1) Using the Clipboard. A developer can copy a block to the Clipboard, then select the list box and choose Edit|Paste. Each row of the block becomes one item in the list; and (2) Using the List property. If a developer's list is already in a block in the notebook, he or she can right-click the list box, choose List, type or point to the block coordinates, and choose OK. List box properties change the way items appear.

| Property | Description |
| --- | --- |
| Number Of Columns | Specifies how many columns of items appear in the list box. The default is one column. |
| Ordered | Sorts items in ascending order when set to Yes. (Resetting Ordered back to No does not restore the original order.) |

The list box property Selected indicates numerically which of its items is chosen, starting from the top item (0) and proceeding row by row to the bottom right. For example, if the first item was chosen, Selected is set to 0; the fifth item would set Selected to 4. The text of the item chosen is stored in the Selection Text property.

Combo boxes (also called drop-down list boxes) are a special type of list box that lets the user add items to the list. They consist of an edit field, a down arrow button, and a list box (which appears only when the user clicks the down arrow or presses Down in the edit field). The value of the combo box is the value of its edit field. Combo boxes have an Ordered and List property identical to those properties in a list box. One can also use the Clipboard to specify the list that a combo box displays.

A pick list button displays a list of choices when the user points to it and holds down the left mouse button. If the list is empty, the user can double-click the pick list button and type a setting. The value of a pick list is whichever item the user selects (the value is initially set to the first item in the pick list). Choosing an item from the list changes the value of the list. By default, a pick list button does not resize when a user chooses an item too large to display on the button's face. A developer can set Resize to Yes to make it expand or shrink depending on the size of the item the user picks.

Scroll bars let the user pick a value from a fixed range of values. One can use a vertical scroll bar or a horizontal one. The value of a scroll bar is an integer from a fixed range of integers. The next table lists the options one can set for horizontal and vertical scroll bars to restrict the range of values they accept and to specify how manipulating the scroll bar changes its value.

| Option | Description |
| --- | --- |
| Min | A horizontal bar's value when its scroll box is as far left as possible; vertical bars are set to this value when their scroll box is at the top of the scroll bar. |
| Max | A horizontal bar's value when its scroll box is as far right as possible; vertical bars are set to this value when their scroll box is at the bottom of the scroll bar. |
| Line | The amount the scroll bar's value changes when a user clicks a scroll arrow. |
| Page | The amount the scroll bar's value changes when a user clicks above or below the scroll box on a vertical scroll bar, or to the left or right of the scroll box on a horizontal scroll bar. |
| Time | The amount of time in milliseconds that the system waits before moving the scroll box in response to a user action (clicking a scroll bar, holding down the mouse button while pointing to a scroll arrow, and so on). |

A time control shows the user the current time. A developer can use time controls to display the current time in a dialog box or toolbar. To add a clock, one first creates a time control in the dialog window. Then, he or she can right-click the time control and set Show Time to Yes. The timer changes into a small digital clock. Finally, he or she right-clicks the timer and sets Timer On to Yes. This enables the clock. Time controls do not have a value. A developer can use a time control to run link commands at regular intervals or at a certain time of day. This is handy for creating toolbar controls that periodically retrieve current values from the active window.

There are two ways to configure a time control for generating regular events: as a Timer and as an Alarm. As a Timer, it generates the Timer event at regular intervals (for example, every two seconds). Two properties of the time control are used to specify the number of milliseconds to wait between Timer events, as shown in the following formula:

$$\text{Wait} = \text{Units in Milliseconds} \times \text{Interval in Units}$$

Units in Milliseconds is set to 1000 by default, so a developer can use the Interval in Units property to specify how many seconds to wait between Timer events. To make a timer, one Right-clicks the time control, choose Units in Milliseconds and enter how many milliseconds it takes for one unit to elapse. Then he or she can right-click the time control, choose Interval in Units and enter how many units to wait before generating a Timer event. And finally, he or she can right-click the time control, choose Timer On and set it to Yes.

As an Alarm, the time control generates the Alarm event at a certain time of day (for example, at 5:00). The Toolbar is opened; for example, an alarm set for 3:00 will not generate an Alarm event if the Toolbar is not onscreen at 3:00. To make a time control an Alarm, the developer first right-clicks the time control, chooses Alarm On and sets it to Yes. Then he or she right-clicks the time control, chooses Alarm Time and enters the time that the Alarm event should be generated. A time control can have both of these functions enabled simultaneously. For example, one could have a timer generate Timer events every two seconds and send out an alarm event at 5:00 to signal the end of the work day.

Link command advanced examples

Now with an understanding of control properties, the reader may better understand advanced examples of using link commands.

EXAMPLE 1

A link command that runs a macro

Figure 14A:
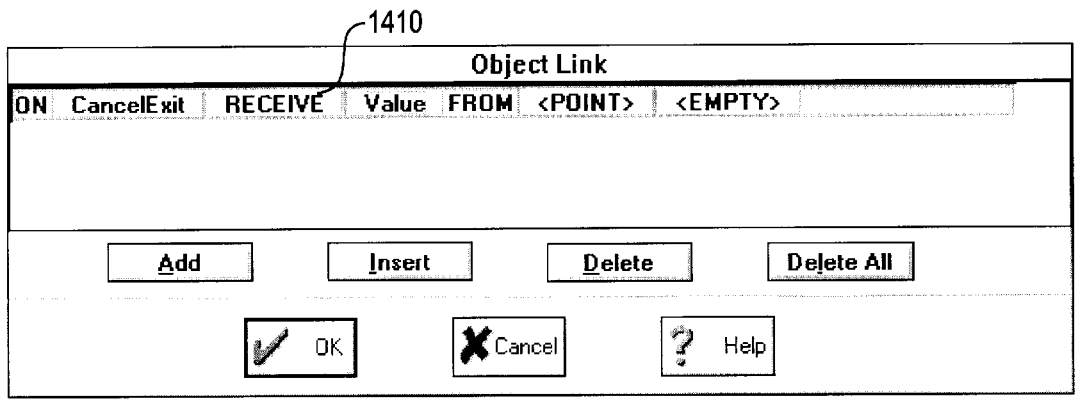
FIGS. 14A–H are bitmap screenshots illustrating additional uses for the Object Link dialog box, for creating more complex links.

The following example shows how to create a link command that generates a warning beep when the user cancels the dialog box. As before, the developer begins by choosing Tools|UI Builder to display a new dialog window, choosing Dialog|Links, and choosing Add to create a new link command. Next, the developer selects the CancelExit event from the event pick list button (Init button). CancelExit appears on the pick list button. This specifies that the link command will run when the user cancels the dialog box, as shown in FIG. 14A.

Figure 14B:
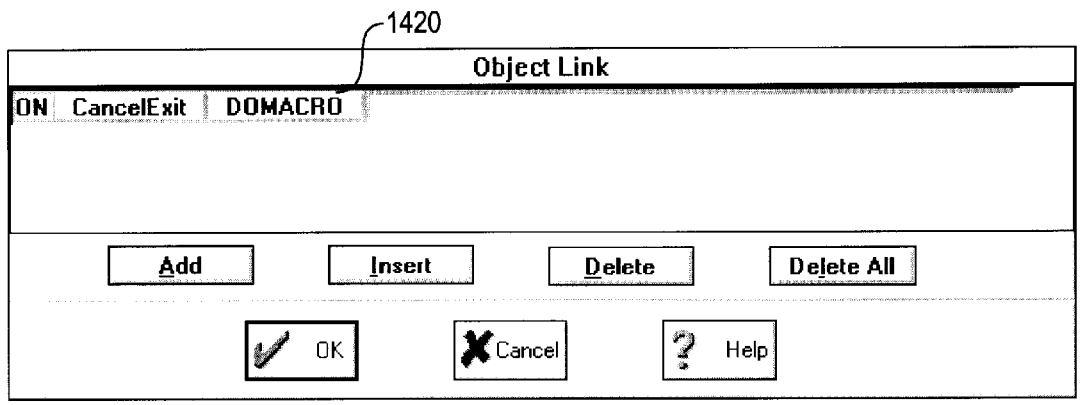
Figure 14C:
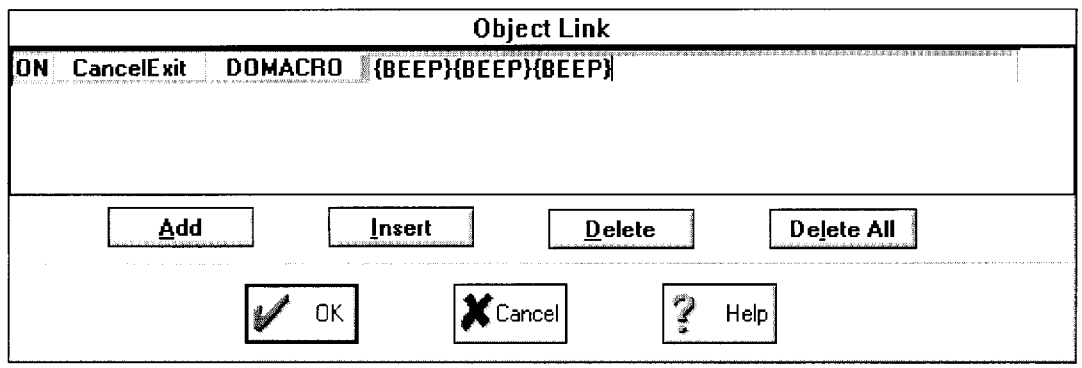

The developer next specifies what action should occur when the user cancels the dialog box. For this examples the link command will run a macro including the command {BEEP} which sounds the computer's speaker. This is done as follows. DOMACRO is specified as the action by selecting it from the action pick list button 1410 (which initially displays RECEIVE). Now, DOMACRO appears on the pick list button, as shown by the button 1420 of FIG. 14B. One will notice that the remaining pick list buttons are replaced by an edit field. The developer proceeds to enter {BEEP} {BEEP} {BEEP} in the edit field, which specifies that the link command should beep three times when the user cancels the dialog box. The Links dialog box now appears as shown in FIG. 14C.

After completing the link command definition, the developer chooses OK to save the link command and return to the dialog window. Then he or she can choose the Test button from the Toolbar to test the dialog box's operation.

EXAMPLE 2

A link command that changes a notebook's zoom factor

There are two link commands that change properties in another object: SET and SEND. The object to change is specified by the object pick list button. In an exemplary embodiment, the object pick list contains the following choices:

| Command | Function |
| --- | --- |
| <POINT> | Lets the developer click (point to) the object he or she wants to affect. He or she can point to a dialog box, dialog controls, or notebook blocks. The object's name will appear on the pick list button. |
| <ENTER> | Lets the developer type text that identifies the object, using the same syntax he or she uses to identify an object in @PROPERTY or a macro command. |
| Active_Notebook | Changes a property of the active notebook |
| Active_Page | Changes a property of the active page. |
| Active_Block | Changes a property of the active block. |
| Active_Object | Changes a property of a selected object. The developer double-clicks the pick list button to the right of the object pick list button, and types the name of a property to use. |
| Application | Changes properties of the application. |

In some situations, <EMPTY> appears on the pick list button to the right of the object pick list button. <EMPTY> indicates that the property (or action, or event) to specify there must be typed. To specify the property, one double-clicks <EMPTY>, types the property name, and presses Enter.

The following example shows how to create a scroll bar that changes the active notebook's zoom factor, using a SEND link command. First, the developer should create a new dialog window, then create a vertical scroll bar control. He or she can drag a bottom handle of the scroll bar to make it longer. To restrict the scroll bar's value to integers between 25 and 200, the developer should right-click the scroll bar, choose Parameters, set Min to 25 and set Max to 200. Then he or she should choose OK to save the restrictions. The Zoom Factor property now accepts values between 25 and 200.

Next, the developer begins the link command definition by choosing Dialog Links and then Add. To run a link command whenever the scroll bar's value changes, the developer selects Valuechanged from the event pick list button (which initially displays Init on it). To send the value of the scroll bar to the notebook property Zoom Factor, SEND is selected from the action pick list button (which initially displays RECEIVE on it. When SEND is the link command, the pick list button to the right of the action pick list button specifies which property setting to send. By pointing to the property pick list button (Value appears on it) and holding down the left mouse button, one can view a pick list having all the scroll bar properties. For the instant example, it is already set to Value (the property setting the developer wants to send). To change a property of the active notebook, the developer selects Active_Notebook from the object pick list button (which initially displays <POINT>).

Figure 14D:
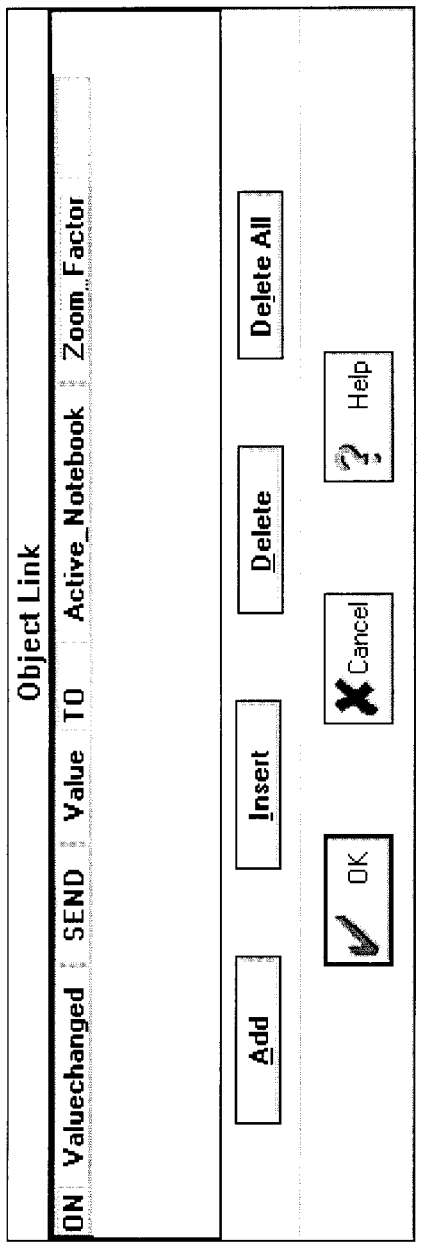

The pick list button to the right of an object pick list button specifies the property to change. By pointing to it and holding down the left mouse button, the developer may display all the properties of a notebook. For the instant example, the developer selects Zoom_Factor. The link command for changing the zoom factor of the notebook is now ready. The corresponding Object Link dialog appears as shown in FIG. 14D. The developer can test the dialog box's operation by invoking the Test button from the Toolbar. Upon dragging the scroll box down, the zoom factor of the notebook increases.

EXAMPLE 3

A link command that resets the zoom factor to 100%

The following example expands on the previous example by adding a push button that resets the zoom factor back to 100 using a SET link command. In the dialog window created in the previous example, the developer chooses the Push Button tool and clicks somewhere in the dialog box. Next he or she double-clicks the button, types Reset, and presses Enter. Link command definition is begun by choosing Dialog¦Links and Add.

Figure 14E:
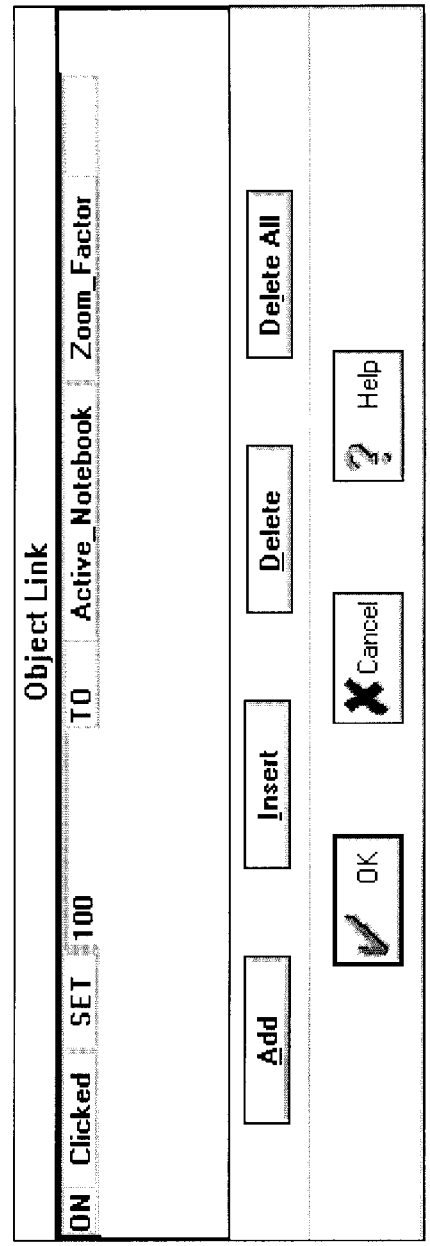

To make the link command run whenever the user clicks the button, the developer selects Clicked from the event pick list button. The developer next selects SET as the action (by selecting it from action pick list button). The SET link command sets a specific property to a specific setting (instead of copying a setting, like SEND does). An edit field appears next to the pick list button. Then, the developer enters 100 into the edit field. This specifies that the setting to send to the other object is 100. Next, the developer points to the object pick list button (<POINT>appears on it) and selects Active_Notebook. This specifies that the property this command should set is in the active notebook. The developer then selects Zoom_Factor from the last pick list button, which specifies that the Zoom Factor should be set to 100 when the user clicks this button. The link command will now set the notebook's Zoom factor to 100%. The corresponding Object Link dialog appears as shown in FIG. 14E. The link command may be tested as before (by choosing the Test button from the Toolbar).

EXAMPLE 4

A link command that reads the alignment of a specific cell

The RECEIVE link command is structured like SEND, but it copies a property setting from the other object to a property in the object containing the link command. RECEIVE link commands are useful for getting information when the dialog box initially appears. This example shows how to create an edit field that gets the alignment of a specific notebook cell.

First, the developer chooses Tools¦UI Builder to create a new dialog window. Then he or she chooses the Edit Field tool and click in the dialog window to create an edit field; then he or she can drag a right handle of the edit field to make it wider. Next, the developer chooses Dialog¦Links, then Add to create a link command. To change a property of a specific cell, one enters POINT mode by selecting the object pick list button (which displays <POINT>).

Figure 14F:
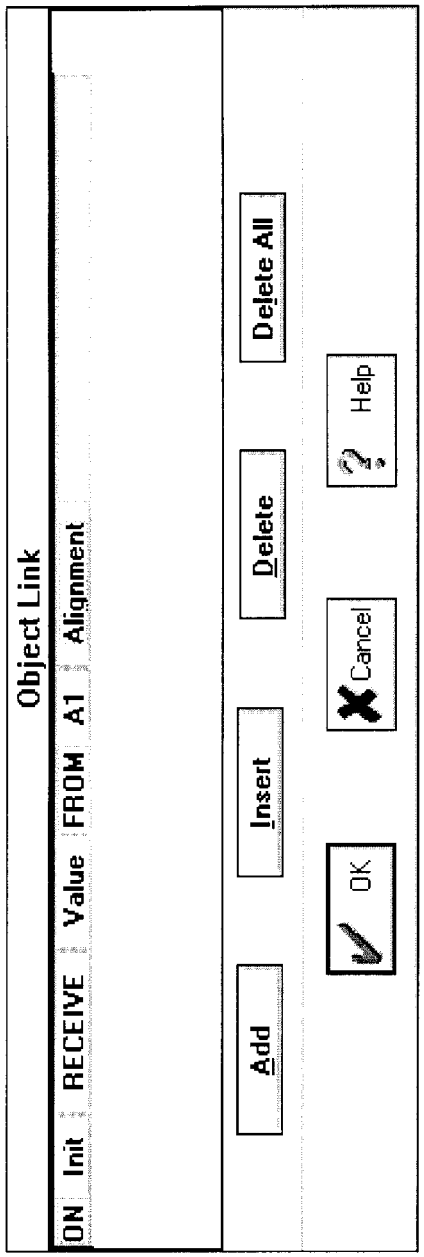

For this example, the developer selects cell A1 of the active notebook page; A1 displays on the object pick list button. The property setting to receive is stored in the Alignment property, thus the developer selects Alignment from the object pick list button. The corresponding link command dialog appears as shown in FIG. 14F. The developer may proceed to test the link as before.

EXAMPLE 5
A link command that displays another dialog box

Link commands can make objects perform actions; for example, a link command can activate a control or make a dialog box appear. In a preferred embodiment, an EXECUTE link command is employed to make dialog controls and dialog boxes perform actions. The following table lists exemplary actions that link commands can perform on another dialog box or dialog control.

| Action | Definition |
| --- | --- |
| Clone | Duplicates the object. |
| Delete | Removes the object (equivalent to Edit\|Clear). |
| Execute | If the object is a dialog box, Execute displays it. If the object is a button, Execute makes the button act as though it was clicked. Other dialog controls are unaffected. |
| Move_top | Moves the object in front of any objects covering it. |
| Move_bot | Moves the object behind any objects it is covering. |
| Activate | Activates a control for manipulation. |
| Deactivate | Deactivates the control. |

The following example shows how to employ EXECUTE to display another dialog box. First, the developer chooses Tools|UI Builder to display a new dialog box. Then he or she right-clicks the dialog box and set Name to "Warning". Next, he or she creates a label by double-clicking the label and entering "Lose Your Changes?". The label is positioned (dragged) to just above the OK and Cancel buttons.

The developer proceeds to activate the notebook window and select Tools|UI Builder to display another new dialog window. The developer selects the OK Button (in the new dialog window, not the Warning dialog window) and chooses Dialog|Links and chooses Add to create the link command. The event of Clicked is selected from the event pick list button. This specifies that the link command runs when the user clicks the button.

Figure 14G:
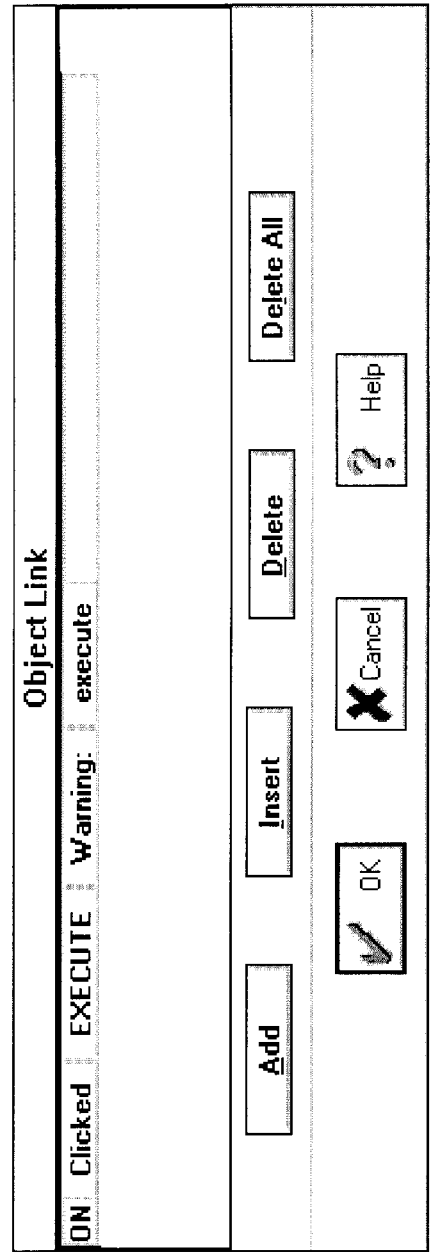

Next, the developer points to the action pick list button (RECEIVE appears on it) and selects EXECUTE. From the object pick list button, the developer selects <POINT>and then clicks in the other dialog window (the one previously named Warning). "Warning:" now appears on the pick list button, as shown in FIG. 14G.

In an EXECUTE command, the action to perform is specified using the pick list button to the right of the object pick list button. The developer selects EXECUTE from this pick list (clone appears on it) to specify that the Warning dialog box should appear when the user clicks the OK button in this dialog box. FIG. 14G shows the completed object Link dialog. The developer can test the dialog box's operation as before. Upon selecting the OK button (which normally closes the dialog box), the Warning dialog box appears first.

EXAMPLE 6
A link command that simulates events

The following example illustrates use of a TRIGGER command, which is provided to "fool" another object into thinking that a certain event occurred. The object then runs any link commands that normally respond to the event.

First, the developer chooses Tools|UI Builder to create a new dialog window and selects Dialog|Links. After choosing Add to create a link command, the developer sets the event pick list button to Clicked, the action pick list button to DOMACRO, and enter {BEEP}{BEEP} in the edit field provided. The developer selects the Push Button tool, clicks in the dialog window to create a push button, double-clicks the push button, types Beeper, and presses Enter to rename the button.

Figure 14H:
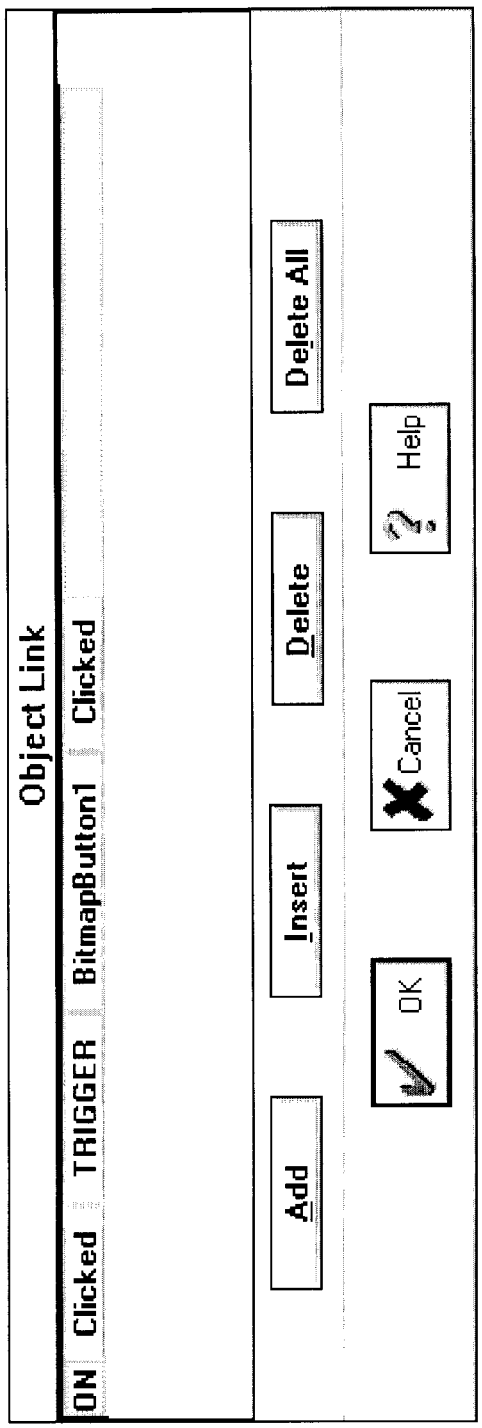

The developer next chooses Dialog|Links and then Add to create a link command for the push button. The event is set to Clicked and the action is set to TRIGGER. In point mode, the OK button in the dialog window is selected. The pick list button to the right of the object pick list button now contains a pick list of events to emulate. The developer sets this pick list button to Clicked. The link command dialog appears as shown in FIG. 14H. The developer may test its operation, as before. In operation, two beeps sound because the push button's link command makes the link command in the OK button run. Since TRIGGER runs only link commands, the dialog box does not close.

Connecting controls to cells or other controls

The system of the present invention includes a Dialog|Connect command as a quick way to link a control to another control or to a notebook cell. This command exchanges settings by creating a link command in the selected object. One uses Dialog|Links to modify "connected" link commands.

To connect a control, first the developer selects the control he or she wants to connect. Next, he or she can choose Dialog|Connect, then select the cell (or control) he or she wants to link to. The linked object's name or address appears in the Target edit field; the control's name appears in Source. Next, if it is desired to send changes in the control's value to the target cell or control immediately, one should check Dynamic Connection; otherwise, the target object will be updated only when the dialog box is closed. Finally, he or she will select OK to save the connection and return to the dialog window.

This example connects a scroll bar to a notebook cell. First the developer selects cell A1 of the notebook and enters 16. This will be the initial value for the scroll bar. Next he or she will choose Tools|UI Builder, then create a vertical scroll bar. Next, he or she chooses Dialog|Connect, clicks cell A1, then chooses OK. To test the link, he or she chooses the Test button. The scroll box on the scroll bar will jump to a new position after receiving its initial value from cell A1. Then, the developer can drag the scroll box; the value stored in cell A1 changes. Then he or she selects OK to exit Test mode. To delete a "connected" link, one chooses Dialog|Links, select the correct link, then click Delete.

Dialog box examples

The following examples illustrate adding controls and link commands to dialog boxes, including illustration of the Dialog|Connect command.

EXAMPLE 1
Connecting a color control to an edit field

The following example shows how to create a color control that initially gets its value from an edit field. While the dialog box appears, changing the color control's setting also sends the color control's new value to the edit field.

First, the developer chooses Tools|UI Builder to create a new dialog box. Then he or she can drag the lower right corner of the window to enlarge it. Next, he or she may use the Color Control tool to create a color control in the upper left corner of the window, then use the Edit Field tool to create an edit field next to the color control, and resize the edit field so it is wider. The developer may then select the color control and then choose Dialog|Connect. Next he or she may choose Target, point to the edit field in the dialog box, then select OK to create the link between these controls.

The developer may then choose the Test button from the Toolbar to test the dialog box's operation. The color control is initially set to black (0,0,0) because the current value of the linked edit field does not make sense to the color control. The developer clicks the small white rectangle of the color control; 255,255,255 displays in the edit field. Then, the developer may choose RGB to make the edit fields in the color control have values identical to the value of the linked edit control.

EXAMPLE 2
Connecting a file control to an edit field

Figure 15:
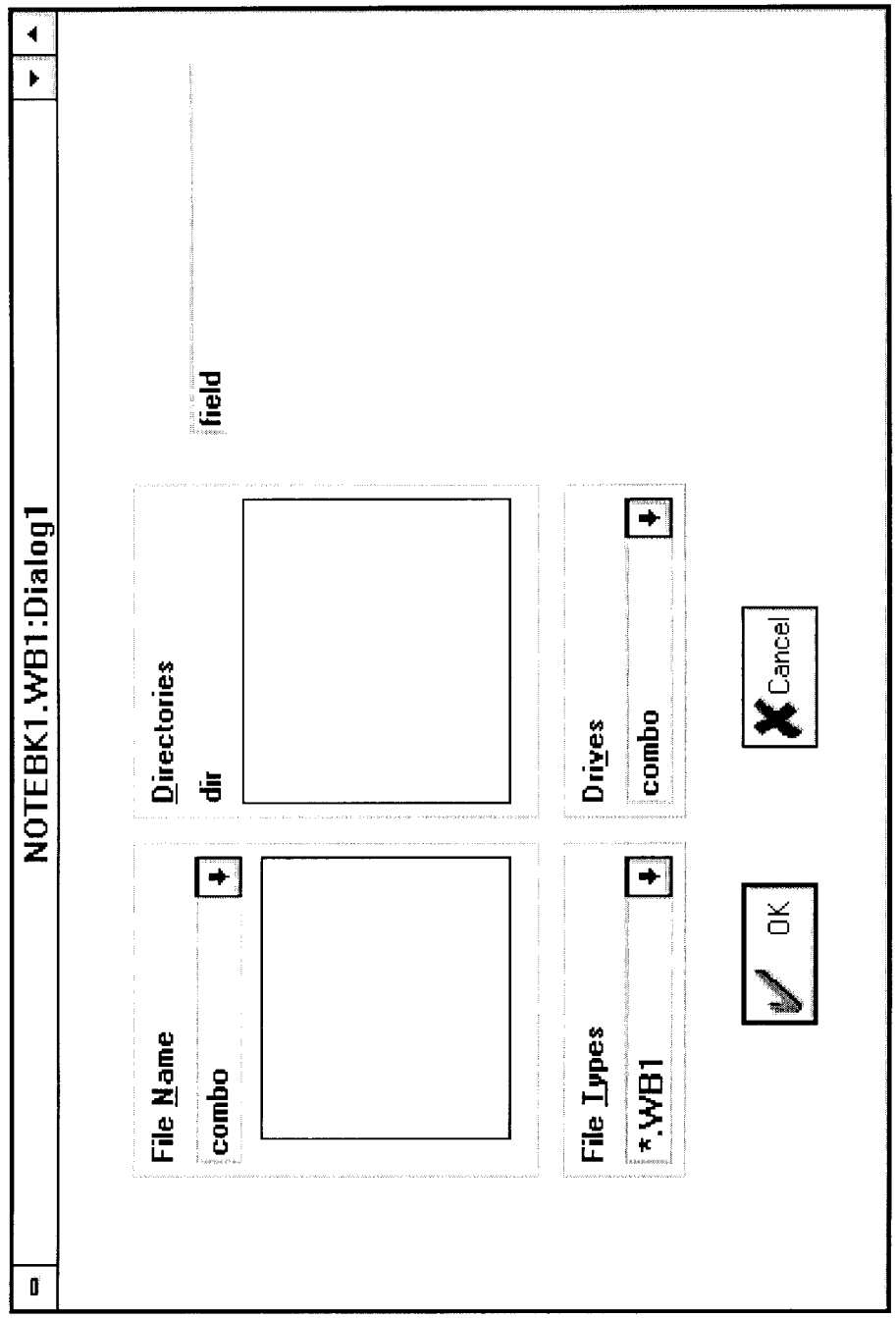
FIG. 15 is a bitmap screenshot illustrating the dialog window after placement of a file control and an edit field.

The following example shows how to create a file control that gets its value from an edit field. First, the developer chooses Tools|UI Builder to display a new dialog window; it may be enlarged by dragging the lower right corner of the window. Next, the developer selects a File Control tool from the dialog Toolbar and clicks in the upper left corner of the window to create the file control. To create an edit field, the developer chooses the Edit Field tool from the Toolbar and clicks in the dialog window to the right of the file control. He or she then drags a handle on the right side of the edit field to widen it. The dialog window appears as shown in FIG. 15.

The developer next chooses Dialog|Connect, selects Target, and then clicks the file control. He or she can then choose OK to create the link between the controls. Now whenever the dialog box displays, the edit field is set to the value of the file control. While the dialog box appears, changing the edit field's setting also sends the edit field's new value to the file control.

Internal Operation
A. Overview

Figure 16A:
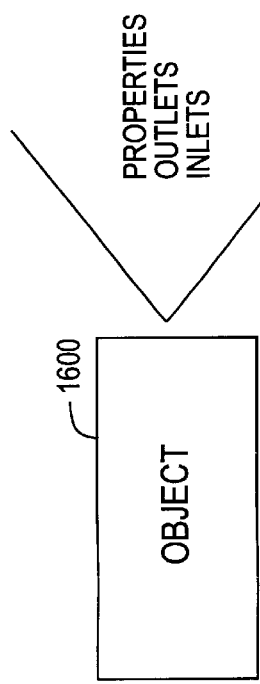
FIGS. 16A–B are block diagrams illustrating the relationship of an object (e.g., button object) and inlets, outlets, and properties.
Figure 16B:
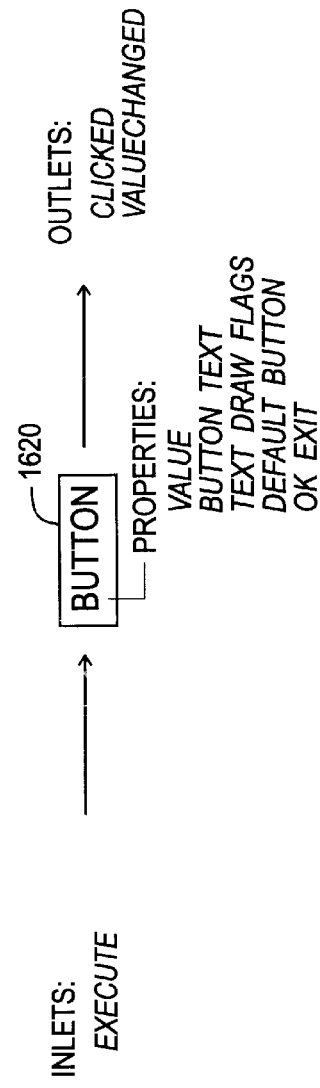

As shown in FIG. 16A, an object 1600 has properties, outlets, and inlets associated with it. (Properties have already been described above). Outlets are events of an object which links may be connected to. As shown in FIG. 16B, for instance, a button object 1620 may include a "Clicked" outlet. A link may be connected to the button object's outlet so that when the button is clicked a link is executed (for performing a particular action). Thus, an outlet may be viewed as an event or action "coming out" of an object. When an outlet event occurs, the object may send a property, receive a property, get a property, execute an inlet, trigger an event, and/or execute a macro.

An inlet, on the other hand, is essentially the reverse of an outlet. An inlet is an action executed for an object, that is, causing the object to undertake a particular action. For instance, an inlet may be executed for an object to instruct the object to move (e.g., change its position in the Z-order).

Figure 16C:
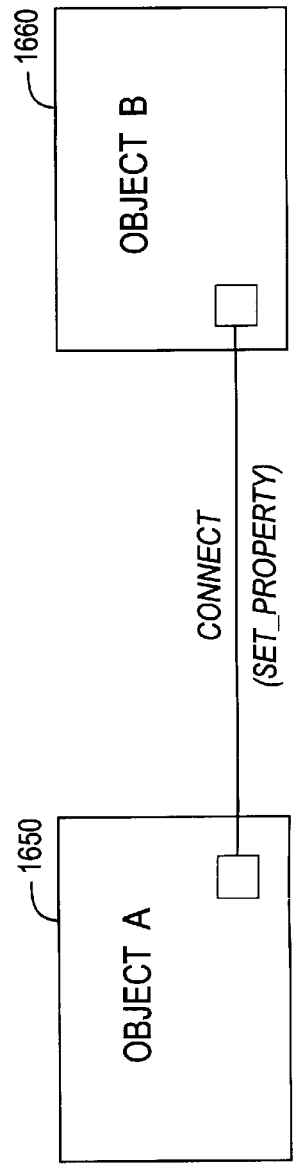
FIG. 16C is a block diagram illustrating connection of properties of two objects, using link commands of the present invention.

As shown in FIG. 16C, a link of the present invention may be employed to connect properties of two or more objects (e.g., object 1650 connected to object 1660). In particular, a property of one object may be connected to a corresponding property of the other object. Suppose, for instance, that object 1650 is an edit field having a value of "James Smith" (i.e., edit_field.value="James Smith"). If the value property of object 1650 is connected to the value property of object 1660, then object 1660 (e.g., another edit field) will automatically express the value of "James Smith". If the value of object 1650 is changed, say, to "Bill Smith", then the object 1660 will be updated automatically to express the new value of "Bill Smith".

Every object includes a list of links (for that object). When a first object is connected to a second object, the second object will point back into the list of links of the first object. In this instance, the first object is the owner of the list; however, the links are visible from both objects. When an event (outlet) occurs in the system, such as a "MouseButtonDown" event, the system checks whether there exists a link associated with this outlet. If a link exists, then it is executed. When an inlet is executed, the target object is called and passed a message indicating the desired action (e.g., inactivate).

For connection of properties between objects, when the property of one object is set (i.e., its set property method is invoked), the system checks whether a link exists which connects the property to that of another object. In this manner, a plurality of objects may be connected so that a change in the property of one of the objects will automatically propagate to the corresponding properties of other objects. For instance, a scrollbar object may be connected to a plurality of spreadsheet cell objects so that a change (in value) in the scrollbar is automatically propagated as a change (in value) of the linked spreadsheet cells, thus providing a "live" link between spreadsheet cells and UI objects.

Attached hereto is an Appendix A containing commented source C++ source listings, providing a description of the invention suitable for use in a general purpose digital computer system, such as an IBM-compatible personal computer. An appropriate development system for compiling and linking the code is available from Borland International. The reader may wish to reference the source of Appendix A when reading the following description of the construction and operation of exemplary C++ classes which may be employed for making the present invention.

B. The Object class

Object is the base class for almost everything in the UI. From this class are derived things as different as windows, files, lists, links, dialogs, menus, views, commands, and the like. Object is an abstract class. Therefore, objects are not directly instantiated from it. Rather, one uses classes derived either directly from Object or from one of its existing subclasses.

The UI can dynamically instantiate objects of any subclass of Object. Accordingly, the system must keep information about each of these classes, and be able to retrieve this information at runtime. This is achieved through another class called ClassInfo, that contains such data as the object name, size, and type, and provides methods to retrieve information about the object. This class is embedded as a static field in each class derived from Object.

C++ instantiations of classes derived from Object (now simply called Objects) share several capabilities:
(1) they can have "properties";
(2) they can have "inlets", and "outlets";
(3) they can be linked to one or several other Objects;
(4) they know how to save and load themselves to and from a disk file; and
(5) they can handle messages through a message procedure.

Each of these points will now be discussed in further detail.
1. Properties

Properties describe the state of an Object. For instance, a class implementing a graphic object might have properties such as fill color, background color, line style, and the like. The property names are seen in property menus when the mouse is over the object and the right mouse button is clicked. An Object may have any number of properties. It inherits the properties of all its ancestors but can override some of them, generally to use them for different purposes.

The properties consist of a name, a type, and a value. The name identifies the property. Property names for all properties used by any Object are stored in a table (PropNames[ ]). For performance considerations, properties can also be referred to by their index in this table. The type describes what kind of value the property handles. More precisely, the type refers to a specific class of object, derived from Property that contains provision for managing such a kind of value. The value can be of any type (e.g., Boolean, byte, integer, string, structured type, Object, and the like) but should have an external representation as a string using a specific syntax.

2. Inlets and outlets

Inlets can be considered as being "input" events to Objects. A specific Object knows and can handle a particular set of inlets. It also inherits the inlets of all its ancestors but can override some of them. An example would be pageup and pagedown inlets for an object that implemented a vertical scroll bar. Each inlet has a name and an ID (also called type). All inlet names are defined in the same table as property names (PropNames[ ]).

In a similar way, outlets are "output" events from Objects. They are "sent" by an Object (generally through a link) to indicate a specific event. Each Object has a particular set of outlets it can send and it inherits the outlets of all its ancestor. An example would be clicked and doubleclicked outlets for the class that implemented a button control. Like inlets, outlets have a name and an ID.

The following is an exemplary list of properties, outlets, and inlets for controls in dialogs. Only the non-inherited or changed properties/outlets is shown for each object.

(1) Label:
PROPERTIES:
| | |
|---|---|
| Value: | Text property - the text in the Label |
| Font: | The label font typeface, point size, bold, italic property |
| Text Draw Flags: | Text formatting property which allows word break, multi line, center, align, and the like formatting of the label text |

(2) Button:
PROPERTIES:
| | |
|---|---|
| Value: | Button state as Boolean property |
| Button Text: | Button text for non bitmap buttons |
| Text Draw Flags: | Text formatting property which allows word break, multi line, center, align etc. formatting of the button text |
| Default Button: | If set hitting Enter in the dialog box will activate this button |
| OK exit: | IF set dialog will terminate with OK Exit when button activated otherwise Cancel Exit |
| Button Type: | Push button, check box, radio button or exit push button values are allowed (latest will terminate the dialog according to the state of the OK exit property) |

OUTLETS:
| | |
|---|---|
| Clicked: | if left mouse button was pressed and released above the button |
| Valuechanged: | if button state is changed |

INLETS:
| | |
|---|---|
| Execute: | Initiate same action if clicked on with the mouse |

(3) ColorCtrl:
PROPERTIES:
| | |
|---|---|
| Value: | RGB color value as Color property |

OUTLETS:
| | |
|---|---|
| Clicked: | clicked on sample rect, entered value into editfield |
| ValueChanged: | any time stored color value is changed |
| Dynamic: | slider moved |

(4) FileCtrl:
PROPERTIES:
| | |
|---|---|
| Value: | File name as Text Property |

OUTLETS:
| | |
|---|---|
| Clicked: | Filename selected from file list, file name editfield enter if no wild characters in name |
| Dynamic: | File list keyboard navigation or tracking |
| ValueChanged: | Every time file name changes |

(5) ListBox:
PROPERTIES:
| | |
|---|---|
| Value: | Currently selected text as Text property. |
| List: | name of system list or range reference in the user version. If list is named it will be fetched at INIT time. |
| Ordered: | If set list will be in alphabetical order |
| Number of Columns: | Number of columns, text will be arranged in a rowwise order |
| Selection Text: | Allows to change the currently selected line. |
| Add Line: | Write only property to add text at the current selection |
| Delete Line: | Write only property to delete this line if present or the current selection if the passed property is 0 long |
| Selected: | Ordinal number of selected line (OxFFFF if none) |

OUTLETS:
| | |
|---|---|
| Clicked: | Left mouse down and up, enter |
| Dynamic: | Keyboard navigation, tracking with mouse |
| ValueChanged: | Every time selection changes |

(6) EditText:
PROPERTIES:
| | |
|---|---|
| Value: | Edited string as Text Property |
| Edit Length: | Maximum length of edited string |
| Allow Point Mode: | If set point mode is allowed |
| Show Frame: | Draw frame or not |
| Terminate Dialog: | Activates default push button in dialog if Enter was hit |
| Convert Text: | Convert escape combinations to characters and vice versa (\t to tab, \r to carriage return, etc.) |

OUTLETS:
| | |
|---|---|
| Clicked: | On Enter pressed, deactivated |
| Dynamic: | Character insert, delete from UI action |
| ValueChanged: | Every time edited text changes |

(7) EditField:
PROPERTIES:
| | |
|---|---|
| Value: | Edited string as Text Property |
| Field Type: | Type of editfield; Numeric (integer number), String, Real (float number), Range (range reference), Keystroke (Only limited selection of keys accepted) |
| Integer min: | Minimum value of integer number |
| Integer max: | Maximum value of integer number |
| Integer default: | Default value of integer number |
| Real min: | Minimum value of real number |
| Real max: | Maximum value of real number |
| Real default: | Default value of real number |
| Key choices: | String of allowed characters |

(8) ComboBox:
PROPERTIES:
| | |
|---|---|
| Value: | Text in editfield as Text property |
| List: | Name of system list or range reference in the user version. If list is named it will be fetched at INIT time. |
| Allow Point Mode: | If set point mode is allowed from editfield |
| Add Down Button: | Adds or removes arrow button |
| History list: | Listbox will preserve the edited values from the editfield |
| List Length: | Length of history list |
| Terminate Dialog: | Activates default push button in dialog if Enter was hit |
| No Edit: | Edifield is not editable if set |

OUTLETS:

-continued

| | |
|---|---|
| Clicked: | Value selected from listbox or enter hit in editfield or deactivate |
| Dynamic: | Keyboard navigation or mouse tracking in listbox, character insert or delete from UI in editfield |
| ValueChanged: | Every time editfield text changes |
| EditDynamic: | Editfield character insert or delete from UI |
| (9) TimerCtrl: | |
| PROPERTIES | |
| Value: | — |
| Show Time: | Show time (draw it) |
| Interval: | Interval of clicks in milliseconds |
| Time: | Current time as Time Property (hour, minute, second) |
| Timer On: | Timer on/off |
| Alarm Time: | Alarm time as Time property of alarm time (when alarm will be triggered) |
| Alarm On: | Alarm on/off |
| OUTLETS: | |
| Timer: | Timer event |
| Alarm: | Alarm event (time reached alarm value) |
| (10) GroupBox: | |
| PROPERTIES: | |
| Value: | Text of the selected radiobutton as Text property |
| Group Text: | Text of group box title |
| Selected: | Ordinal number of selected radiobutton |
| OUTLET: | |
| ValueChanged: | When radiobutton selection changes |
| (11) Scroller: | |
| PROPERTIES: | |
| Value: | Position of thumb as Word property |
| Parameters: | Minimum, maximum position, line and page advance value, repeat time in millisecond for line and page down |
| OUTLETS: | |
| Clicked: | Thumb moved to new location, line-page up or down |
| Dynamic: | Thumb movement from UI |
| PageDown: | page down event |
| PageUp: | page up event |
| LineDown: | line down event |
| LineUp: | line down event |
| ValueChanged: | Every time position of thumb changes |

3. Links

Objects are linked to other Objects using Link objects. This capability is provided by the Object class itself and, thus, is inherited by all objects derived from it. Class Link is itself derived from Object. Links are used for different purposes such as transferring properties between Objects, sending messages to objects, executing macros, and the like. Each Object contains a pointer to a list of Links (Object::pLinks). This pointer is NULL if the Object is not linked to any other Object. Objects provide a set of methods to manage their list of links to other objects, allowing to add, remove, execute or fix links.

4. Saving and loading objects

Objects have the ability to save and load themselves to and from a file. This is done through a set of methods (e.g., Object::save, Object::preSave, Object::load, and Object::aftload). When saving Objects into a file, pointers between Objects (e.g., pointers to links) are converted into a form that can survive inside the file and be restored later. For that purpose Objects can receive an "id" that is stored in its Object::id field. An id identifies a specific instantiation of an Object.

When saving an Object into a file, the Object::preSave method is called first to give a unique id to the Object's list of link objects and then is called recursively on every object that those links point to. As a result the whole hierarchy of linked objects is assigned ids. Then this method adds the ids to a list maintained by the file in which the objects are to be stored. The Object::save method is then called to save not only the Object itself, but also the whole hierarchy of Objects created through the link objects, which includes the list of Link Objects itself.

When loading, Object::load is called first to load and recreate all the Objects that have been formerly saved into the file, and to construct an id list for this file. Then Object::aftLoad is used to restore all pointers between Objects using the id list. Class Object implements a basic version of those methods that work for an Object that contains only a pointer to a list of links. If a subclass add pointers to other Objects (for example a Window Object might use pointers to its child windows), these methods must be overridden so that they include provision for saving and restoring all pointed out Objects. An additional method, Object::clone, is provided to create a copy of an object, but instead of copying the pointer to the list of links it converts the pointer to an id.

5. Messages

Objects share the ability to handle messages through a Object::msg( ) method. This method accepts the same kind of parameters as a MS-Windows window procedure:

LONG msg (WORD wMsg, WORD wParam, LONG lParam)

The msg( ) procedure may be implemented in a fashion similar to a MS-Windows window procedure: a switch/case statement that processes all messages a particular Object handles.

The msg( ) procedure of the Object base class preferably processes very few messages (e.g., UIB_GETTITLE, UIB_GETTARGET and THN_PROPERTY). Derived classes will generally override the method, add processing code for other messages, calling Object::msg( ) for the message they do not handle.

C. ClassInfo

ClassInfo class is used to describe each class that is derived form Object. Each object of such a class contains a embedded ClassInfo static object, in it Object::info data member. ClassInfo objects contain such information as the user name of the Object it describes, the Object parent, type and size, its property, inlet and outlet lists, and the like. It also includes methods to retrieve and manipulate this information.

One ClassInfo static object exists for each class derived from Object (i.e., for each type of Objects). Each subclass of Object also includes a type identifier. A GetInfoFromType( ) procedure is employed to retrieve the pointer to the static ClassInfo object for a given Object type. Consequently, given an object type, information about the corresponding Object class may be determined, including how to instantiate a new object of this class.

To achieve conversion between Object types and ClassInfo objects, the Object type may be parsed at compile time, with a table of pointers to the static ClassInfo objects created. This table is used at run time by procedure GetInfoFromType( ). ClassInfo static objects contain a pointer to the Object name, pObjName. This is actually the "user name" for a specific class of Object (unless it is a named object), i.e., the name the user will see in property and link menus (the menus that allow to edit object's properties and set up links between objects).

ClassInfo objects also contain pointers to lists of properties and inlets and outlets for the Objects they describe. These pointers can be NULL if there is no property, inlet or outlet for a given Object. The lists comprise static tables of PropRecord, PropInlet, and PropOutlet objects which respectively describe a property, inlet or outlet.

A ClassInfo object also contains a pointer to the ClassInfo object embedded in the immediate ancestor of the Object it describe. This allow the C++ class hierarchy under class Object to be known at runtime. The tree of ClassInfo objects is an exact image of this hierarchy, which is important because each class of Object inherit the properties, inlets and outlets of all its ancestor. The ClassInfo class provides methods to retrieve one or all properties, inlets and outlets of an Object, that search the entire class hierarchy above this Object's class. ClassInfo objects also contain flags giving additional information about the Object, and in particular of what base class it inherits.

D. PropRecord, InletRecord, OutletRecord

These classes are used to build table of properties, inlets and outlets. They basically contain the type and pointer to the name for a property, and the ID and pointer to the name for an inlet or outlet.

E. Link

The behavior of Objects such as dialogs and controls is communicated to another dialog or control by using another type of object called Link. Class Link is derived from class Object. Links are used for such different purposes as transferring properties between objects, sending messages to objects, executing macros, and the like. Each object contains a pointer to a list of Link objects (Object::pLinks). This pointer is null if not linked to any other object.

Since the Link class is directly derived from Object itself, it inherits behavior from Object. In particular, Links know how to save and load themselves to and from a disk file. This is useful to save a set of Objects that are interconnected by links (for example, a dialog box and its controls).

Links establish a relationship between a source object and a destination object. This relationship will result in a specific action when the source object emits a particular outlet. Performing this action is "executing" the link. As part of their data members, Links have pointers to their source and destination objects, and memorize the outlet which they will react on.

1. Different types of Links

There are several types of links, using the same Link class for their implementation. All execute a specific action when their source object send a particular outlet. All but one (the MACRO link) involve a source and a destination object.

Link objects can be created and connected to their source and destination objects by using a menu link string as was mentioned above. In addition links can be set up by using methods defined in class Object. These methods are named connect<link type>. For example to set up a SEND link you would use the method called connectSend. The link string can be set up in the dialog builder to establish links between controls in a dialog, or in a menu item to set up links between a menu item and another object. The syntax of the link string is as follows:

```
ON <outlet> SEND<property> TO <object.property>
    FROM
ON <outlet> RECEIVE <property> FROM <object.property>
    FROM
ON <outlet> EXECUTE <object.inlet>
ON <outlet> SET <value> TO <object.property>
ON <outlet> POSTEXEC <object.inlet>
ON <outlet> TRIGGER <object.inlet>
ON <outlet> MACRO <macro string>
CONNECT <property> WITH <object.property>
```

These two link strings are short forms for the longer link strings listed below them:
    COMMAND <object.inlet>
is the same as:
    ON CLICKED EXECUTE <object.inlet>
The string:
    COMMAND <macro string>
is the same as:
    ON CLICKED MACRO <macro string>

As can be seen, there are several types of links, and they use the same Link class for their implementation. All execute a specific action when their source object sends a particular outlet. All but one (the MACRO link) involve a source and a destination object. Link commands can send or receive property settings from the linked object. The following list summarizes these types:

(1) ACTIVE (or SEND): On a specific outlet of its source Object, this link gets the value of a property of its source Object and sets a property of its destination Object to the value, i.e. the SEND command copies the setting of a property in the element to the linked object's property. For example, if the element is an edit field, the following link command fills the active block with the edit field's value:
    ON Dynamic SEND Value TO Active Block Value (2) PASSIVE (or RECEIVE): On a specific outlet of its source Object, this link gets the value of a property of its destination Object and sets a property of its source Object to the value, i.e. the RECEIVE command is like SEND, but the linked object copies a setting into the element's property instead. For example, the following link command sets the element's value to the current block's fill mixture:
    ON Init RECEIVE Value FROM Active Block Shading-
        .Intensity (3) SET: On a specific outlet of its source Object, this link sets a property of its destination Object to a predetermined value, i.e., the SET command functions like SEND, but has only one property which specifies the property set by the link command. For example, the following link command hides the Cancel button:
    ON Clicked SET Yes TO BitmapButton2 Hidden (4) EXECUTE: On a specific outlet of its source Object, this link executes its destination Object, sending it a specific inlet. Executing an Object means sending a THN_EXECUTE message to its msg( ) method, with dwParam being the inlet ID and lParam a pointer to the source Object.

(5) POSTEXEC: On a specific outlet of its source Object, this link posts a WM_POSTEXEC message to the MS-Windows frame window of the program, with wParam being a specific inlet and lParam a pointer to the destination Object. This is similar to an EXECUTE link, except that the execution will be delayed until MS-Windows dispatches the message.

(6) LINK_MACRO: This link does not involve a destination Object. On a specific inlet of its source Object, it simply executes a given macro string.

(7) LINK_TRIGGER: On a specific outlet of its source object this link executes all links of its destination Object (i.e., that have its destination Object as a source Object) that react to a given outlet. This is accomplished by calling the destination object's callConnect method.

(8) LINK_CONNECT: Connects the value properties of two controls so that if the value property of one control changes, the value property of the other control is updated to the same value. This link only works with objects descended from the Annotate class, hence the reason it works only between controls.

Every link command responds to an event that triggers it. This can be the click of a user's mouse or the link command of another object. Most objects seen by the user are derived from Annotate and they therefore inherit the same outlets. These outlets are commonly used in links and are listed below:

| Event | Definition |
|---|---|
| Alarm | Available only when linking a timer, the time of day specified in the timer's Alarm Time property has been reached. |
| Timer | Available only when linking a timer; the amount of time indicated in the timer's Timer Interval property has elapsed. |
| Init | The dialog box is about to display. |
| Exit | The dialog box is about to close. |
| Clicked | The element was clicked. |
| Right_bdown | The element was right-clicked. |
| Left_bdown | The user pointed to the element and is holding down the left mouse button. Releasing the button generates a Clicked event. |
| Doubleclick | The element has been double-clicked. |
| Valuechanged | The element's value changed. This event does not occur until the user completes the change by pressing Enter or releasing the mouse button. For example, dragging a scroll box does not generate Valuechanged until the drag is done. |
| Dynamic | The element's value is changing. This is similar to Valuechanged, but is generated while the value changes. For example, dragging a scroll box generates a series of Dynamic events as the scroll box moves. Dialog elements generate a Dynamic event under different circumstances: (1) scroll bar: while the scroll box moves; (2) edit field: when a character is inserted or deleted; (3) spin control: when the value changes; (4) list box: when item is highlighted, but not chosen; (5) color control: when the value changes, and (6) file control: when the value changes. |
| Editdynamic | Characters are being inserted or deleted in a combo box's edit field. |
| Check | The dialog box is about to close. Used to check values and verify pieces of information critical to the dialog box's function. |
| key:keystroke | The key keystroke was pressed. For example, key:CR indicates that the link command is triggered by Enter. |
| Activate | The element has been chosen for manipulation. For example, clicking an edit field generates this event. Valuechanged is used to trap the final result or Dynamic to trap edits as the user makes them. |
| Deactivate | The user has chosen another control, leaving the element inactive. |
| Lineup | Available only when linking a scroll bar, the user increased the scroll bar's value by clicking a scroll arrow. |
| Linedown | Available only when linking a scroll bar, the user decreased the scroll bar's value by clicking a scroll arrow. |
| Pageup | Available only when linking a scroll bar, the user increased the scroll bar's value by clicking it between a scroll arrow and the scroll box. |
| Pagedown | Available only when linking a scroll bar, the user decreased the scroll bar's value by clicking it between a scroll arrow and the scroll box. |
| Thumb | Available only when linking a scroll bar, indicates the user clicked a scroll bar's scroll box. |
| Trigger | This event cannot be generated by any user action; use it to set up internal link interactions. |
| Init Complete | Available only when linking a dialog box, this event occurs just after all dialog box elements have received an Init event. |

2. Data member and methods

Recall that Links have a pointer to their source object (Link::pSrc), a pointer a their destination Object (Link::pDst) and memorize the outlet which they react on (outletID) as part of their data members. Data members also include the link type (linkType) and, depending on this type, property names, value, inlet, outlet and macro string to be used during execution.

Among their methods, Links provide a overridden implementation of Object's presave( ), save( ), load( ), aftLoad( ) and clone( ). Operator == is overridden so that two links can be easily compared. Links are considered equal when they have the same type, the same source and destination object, the same outlet to react on and perform the same action when executing. The Link::Execute( ) method provides the code for executing the link, whatever its type. Link::Reverse( ) will exchange source and destination object in a link.

3. Converted Links

Links are said "converted" when their destination pointer does not point to an Object but to an Object name. This is used when the destination Object has been deleted, or when the link is saved on a file that does not contain the destination Object. This way, the destination pointer ia able to be restored when the destination Object is recreated or when the link is reloaded from the file.

Link class provides methods for converting and fixing links, namely Link::convert( ) and Link::fix( ). The Link::converted( ) method allows checking of whether the link is converted or not. Other methods check if the link is converted before executing any action, and eventually try to fix or convert it.

F. Property

The Property class is a pure base class for a set of subclasses that implement each type of property. It is not derived from any class. As seen above, properties are closely related to Objects, and are things that have a name, a type and a value. What the property objects provide is essentially a way of converting property values from their binary representation to a string representation and vice versa.

The binary representation of the property value is used to store the property in the data members of the Objects that have this property. This value can be of any type, ranging from an integer or string to a complex structure of even a class. For example, a color selection control Object in a dialog could use a RGB structure to store the value of its color property.

The string representation of the property value is an external form, sometimes visible from the user, and used to exchange property values between Objects. This string respects a syntax that is specific to the property. The color property, for example, may use a string like "100/150/50" to express its red, green, and blue components.

Typically, one Property derived class exists for each type of property, and for each class there is one global (static) instantiation. These global property objects are used by any Object when it needs to convert property values to strings and vice versa.

The Property class provides essentially two virtual methods for converting property strings to values and vice versa: stringToValue( ) and valueToString( ). These are pure virtual methods that must be defined by the subclasses. Some properties can accept and return binary values instead of strings, allowing faster conversion when transferring values between Objects. These properties are declared in a table (BinaryProps[ ]).

G. Responder

The Responder class is directly derived from Object. It defines a general scheme for a great range of Objects that must handle events (e.g., from the keyboard, mouse, timer, and the like) and may respond to them. Responder is the base class for three important classes: Window, an encapsulation of the MS/Windows windows, View, a base class for everything that appears in the window client areas, and Program, the application program itself.

Responder class provide methods that handle events from the mouse or the keyboard: keyDown( ), keyup( ), MouseDown( ), MouseUp( ), MouseDragged( ), and the like. The Object derived from Responder class can be chained together, using pointer pNextResponder. By default all events are simply passed along to the next responder. A class that wants to handle a particular type of event must override the corresponding method.

Originally-filed Appendix B (now canceled for convenience of patent publication, the disclosure of which has been incorporated by reference) contains a user/reference manual (Quattro® Pro for Windows: *Building Spreadsheet Applications*) further describing a commercial embodiment of the present invention. The manual is available directly from Borland International.

While the invention is described in some detail with specific reference to a single preferred embodiment and certain alternatives, there is no intent to limit the invention to that particular embodiment or those specific alternatives. The true scope of the present invention is not limited to any one of the foregoing exemplary. embodiments but is instead defined by the following claims.

What is claimed is:

1. In a computer system having a memory and a storage device for storing data in a plurality of cell objects, a method for linking user interface objects to other objects, the method comprising:

(a) providing a plurality of user interface objects, each user interface object being associated with at least one event;

(b) defining for each object in the system a set of properties and a set of link objects, each link object for storing information for characterizing a link between a source object and a destination object, and wherein at least some objects maintain lists of links for determining what objects they are linked to;

(c) in response to user input, linking an event of a particular user interface object to a particular property of at least one other object through use of a particular link object, wherein said link object stores information characterizing a particular linkage between the objects; and (e) upon occurrence of the linked event associated with the particular user interface object, determining all other objects linked to the particular user interface object and triggering an automatic change in value to the property of said at least one other object being linked.

2. The method of claim 1, wherein said user interface objects include selected ones of an edit field, scroll bar, and screen button.

3. The method of claim 1, wherein said properties of an object include displayed attributes of the object.

4. The method of claim 1, wherein events for a user interface object include events triggered as a result of action performed by the object.

5. The method of claim 1, wherein events for user interface object include events triggered as a result of input from user.

6. The method of claim 1, wherein said change in value to the property of said at least one object linked comprises a change in value to a property of said at least one object being linked other than an object's value.

7. The method of claim 1, wherein said linking an event of a particular user interface object to a particular property of at least one object includes:

displaying a dialog listing events which can occur at said particular user interface object.

8. The method of claim 1, wherein step (e) includes:

upon occurrence of the linked event associated with the particular user interface object, determining all objects which have been linked to the event.

9. The method of claim 1, wherein properties for objects comprise attribute values other than values stored by the objects.

10. In a computer system having a memory and a storage device for storing data in a plurality of objects, a method for linking properties of objects together, the method comprising:

(a) providing a plurality of objects, each object having a set of display properties affecting how the object is displayed (b) displaying a dialog for connecting a particular property of one object to respective properties of an arbitrary number of other objects;

(c) in response to user input, linking the particular property of said one object to a corresponding property for each of the other objects; and (e) upon occurrence of a change in value to particular property of said one object, automatically propagating changes to values of the corresponding property for each of the other objects.

11. The method of claim 10, wherein said one object comprises a user interface control.

12. The method of claim 10, wherein said occurrence of a change in value to particular property of said one object occurs as a result of user input.

13. The method of claim 10, further comprising:

(f) selecting a property of a first object to monitor;

(g) linking a corresponding property of at least one second object to that of the first object; and (h) upon change in value of the property of the first object, propagating said change to the property of all said at least one second object.

14. In a computer system, a method for linking objects together comprising:

storing a plurality of objects;

storing for each object in the system a set of properties, inlets, and outlets, wherein inlets for an object include actions which may be performed by the object, and wherein outlets for an object include events which may occur at the object;

storing a set of link objects, each link object for storing information for characterizing a link between a source object and a destination object;

storing for each object a list of other objects linked to said each object;

receiving input for changing at least one object; and using said link objects, updating a change in the one object to other objects which are linked to said one object.

15. The method of claim 14, wherein said plurality of objects include user interface objects for receiving user input.

16. The method of claim 14, wherein said properties of an object include display attributes of the object.

17. The method of claim 14, wherein said objects include user interface objects.

18. The method of claim 14, wherein events for an object include events triggered as a result of actions performed by the object.

19. The method of claim 14, wherein events for an object include events triggered as a result of input from a user.

* * * * *